(12) United States Patent
Huang et al.

(10) Patent No.: US 12,089,169 B2
(45) Date of Patent: Sep. 10, 2024

(54) CONTROL RESOURCE POWER HEADROOM REPORTING

(71) Applicant: QUALCOMM Incorporated, San Diego, CA (US)

(72) Inventors: Yi Huang, San Diego, CA (US); Seyedkianoush Hosseini, San Diego, CA (US); Peter Gaal, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 17/696,695

(22) Filed: Mar. 16, 2022

(65) Prior Publication Data

US 2022/0330174 A1    Oct. 13, 2022

Related U.S. Application Data

(60) Provisional application No. 63/171,550, filed on Apr. 6, 2021.

(51) Int. Cl.
*H04W 72/04*    (2023.01)
*H04W 24/10*    (2009.01)
(Continued)

(52) U.S. Cl.
CPC ....... *H04W 52/365* (2013.01); *H04W 52/146* (2013.01); *H04W 52/325* (2013.01); *H04W 72/20* (2023.01)

(58) Field of Classification Search
None
See application file for complete search history.

(56) References Cited

U.S. PATENT DOCUMENTS

| 8,996,055 B2* | 3/2015 | Wang | H04W 52/58 455/69 |
| 9,419,768 B2* | 8/2016 | Kim | H04L 5/00 |

(Continued)

FOREIGN PATENT DOCUMENTS

| CN | 102238610 A | 11/2011 |
| EP | 2472942 A1 | 7/2012 |

OTHER PUBLICATIONS

International Search Report and Written Opinion—PCT/US2022/020809—ISA/EPO—Jul. 5, 2022.

*Primary Examiner* — Tuan A Tran
(74) *Attorney, Agent, or Firm* — Guang Yu Zhang; Holland & Hart LLP

(57) ABSTRACT

Methods, systems, and devices for wireless communications are described. Multiple component carriers may be configured for communications between communication devices, where uplink data channel resources may be scheduled on a component carrier of the component carriers. A communication device may report, over the uplink data channel resources to another communication device, a first report for available transmission power for uplink data transmissions over the component carrier and a second report associated with available transmission power for uplink control transmissions over a second component carrier. The other communication device may use the second report to determine the available transmission power for uplink control transmissions over the second component carrier. The other communication device may schedule communication resources based on the determined available transmission power for uplink control transmissions.

30 Claims, 15 Drawing Sheets

(51) Int. Cl.
*H04W 52/14* (2009.01)
*H04W 52/32* (2009.01)
*H04W 52/36* (2009.01)
*H04W 72/20* (2023.01)

(56) References Cited

U.S. PATENT DOCUMENTS

| | | | | |
|---|---|---|---|---|
| 9,521,626 | B2* | 12/2016 | Zhao | H04W 24/10 |
| 9,560,685 | B2* | 1/2017 | Kim | H04W 74/0833 |
| 9,603,098 | B2* | 3/2017 | Ryoo | H04W 76/27 |
| 9,629,106 | B2* | 4/2017 | Kim | H04L 5/0053 |
| 9,686,706 | B2* | 6/2017 | Kim | H04W 72/0473 |
| 9,843,992 | B2* | 12/2017 | Thangarasa | H04W 76/19 |
| 9,955,431 | B2* | 4/2018 | Narasimha | H04L 5/001 |
| 10,142,940 | B2* | 11/2018 | Ryoo | H04W 52/34 |
| 10,389,422 | B2* | 8/2019 | Muruganathan | H04B 7/0617 |
| 10,412,689 | B2* | 9/2019 | Rahman | H04W 56/0005 |
| 10,834,682 | B2* | 11/2020 | Ryoo | H04W 52/34 |
| 10,986,583 | B2* | 4/2021 | MolavianJazi | H04W 52/365 |
| 11,265,920 | B2* | 3/2022 | Jin | H04W 74/006 |
| 11,290,968 | B2* | 3/2022 | MolavianJazi | H04W 52/143 |
| 11,388,716 | B2* | 7/2022 | Huang | H04W 24/10 |
| 11,395,273 | B2* | 7/2022 | Niu | H04W 72/20 |
| 11,539,473 | B2* | 12/2022 | Chin | H04W 72/21 |
| 11,540,227 | B2* | 12/2022 | MolavianJazi | H04W 52/242 |
| 11,622,337 | B2* | 4/2023 | Xiong | H04W 52/346 455/522 |
| 11,844,087 | B2* | 12/2023 | Kim | H04W 74/0833 |
| 11,849,484 | B2* | 12/2023 | Loehr | H04L 1/1822 |
| 2015/0087296 | A1* | 3/2015 | Kim | H04W 52/04 455/422.1 |
| 2016/0270094 | A1 | 9/2016 | Dinan | |
| 2018/0146440 | A1* | 5/2018 | Hosseini | H04W 72/12 |
| 2020/0404657 | A1* | 12/2020 | Huang | H04W 52/325 |

* cited by examiner

CONTROL RESOURCE POWER HEADROOM REPORTING

CROSS REFERENCE

The present Application for Patent claims the benefit of U.S. Provisional Patent Application No. 63/171,550 by HUANG et al., entitled "CONTROL RESOURCE POWER HEADROOM REPORTING," filed Apr. 6, 2021, assigned to the assignee hereof, and expressly incorporated by reference herein.

FIELD OF TECHNOLOGY

The following relates to wireless communications, including control resource power headroom reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Carrier aggregation may be used to increase a throughput of communications between base stations and UEs. Carrier aggregation may enable a base station to schedule communication resources for a UE over multiple component carriers.

SUMMARY

The described techniques relate to improved methods, systems, devices, and apparatuses that support control resource power headroom reporting. Control resource power headroom reporting may include transmitting a report of an amount of uplink transmission power at a user equipment (UE) available for transmitting over the component carriers. Multiple component carriers may be configured for communications between communication devices, where uplink data channel resources may be scheduled on a component carrier of the component carriers. A communication device may report, over the uplink data channel resources to another communication device, a first report for available transmission power for uplink data transmissions over the component carrier and a second report associated with available transmission power for uplink control transmissions over a second component carrier. The other communication device may use the second report to determine the available transmission power for uplink control transmissions over the second component carrier. The other communication device may schedule communication resources based on the determined available transmission power for uplink control transmissions.

A method for wireless communication at a UE is described. The method may include receiving a first message indicating a set of multiple component carriers are configured for the UE, receiving a second message scheduling uplink data channel resources of a first component carrier of the set of multiple component carriers, and transmitting, over the uplink data channel resources, a combined report including a first report of available transmission power for uplink data transmissions over the first component carrier and a second report that is associated with available transmission power for uplink control channel resources over a second component carrier of the set of multiple component carriers.

An apparatus for wireless communication at a UE is described. The apparatus may include a processor, memory coupled with the processor, and instructions stored in the memory. The instructions may be executable by the processor to cause the apparatus to receive a first message indicating a set of multiple component carriers are configured for the UE, receive a second message scheduling uplink data channel resources of a first component carrier of the set of multiple component carriers, and transmit, over the uplink data channel resources, a combined report including a first report of available transmission power for uplink data transmissions over the first component carrier and a second report that is associated with available transmission power for uplink control channel resources over a second component carrier of the set of multiple component carriers.

Another apparatus for wireless communication at a UE is described. The apparatus may include means for receiving a first message indicating a set of multiple component carriers are configured for the UE, means for receiving a second message scheduling uplink data channel resources of a first component carrier of the set of multiple component carriers, and means for transmitting, over the uplink data channel resources, a combined report including a first report of available transmission power for uplink data transmissions over the first component carrier and a second report that is associated with available transmission power for uplink control channel resources over a second component carrier of the set of multiple component carriers.

A non-transitory computer-readable medium storing code for wireless communication at a UE is described. The code may include instructions executable by a processor to receive a first message indicating a set of multiple component carriers are configured for the UE, receive a second message scheduling uplink data channel resources of a first component carrier of the set of multiple component carriers, and transmit, over the uplink data channel resources, a combined report including a first report of available transmission power for uplink data transmissions over the first component carrier and a second report that is associated with available transmission power for uplink control channel resources over a second component carrier of the set of multiple component carriers.

Some examples of the method, apparatuses, and non-transitory computer-readable medium described herein may further include operations, features, means, or instructions for determining that the first component carrier including the uplink data channel resources may be a secondary cell and the second component carrier may be a primary cell based on the first message, and that the uplink control channel resources may be scheduled for the primary cell based on the second message.

Some examples of the method, apparatuses, and non-transitory computer-readable medium described herein may further include operations, features, means, or instructions for determining the first report of available transmission power for uplink data transmissions over the secondary cell based on a data transmission over the uplink data channel resources in the secondary cell and determining the second report that may be associated with available transmission power for uplink control transmissions over the primary cell based on a control transmission over the uplink control channel resources in the primary cell.

In some examples of the method, apparatuses, and non-transitory computer-readable medium described herein, an estimate of available transmission power for uplink data transmissions over the primary cell may be obtainable from the second report.

In some examples of the method, apparatuses, and non-transitory computer-readable medium described herein, transmitting the combined report may include operations, features, means, or instructions for transmitting a third report of available transmission power for uplink data transmissions over the primary cell, the third report being determined based on a virtual data transmission over virtual data channel resources in the primary cell.

Some examples of the method, apparatuses, and non-transitory computer-readable medium described herein may further include operations, features, means, or instructions for receiving a third message configuring a mode that enables uplink control channel resources to be scheduled on one or more secondary cells of the set of multiple component carriers and determining, based on activation of the mode, that the first component carrier including the uplink data channel resources may be a primary cell and the second component carrier may be a secondary cell based on the first message and that the uplink control channel resources may be scheduled for the secondary cell based on the second message.

Some examples of the method, apparatuses, and non-transitory computer-readable medium described herein may further include operations, features, means, or instructions for determining the first report of available transmission power for uplink data transmissions over the primary cell based on a data transmission over the uplink data channel resources in the primary cell and determining the second report that may be associated with available transmission power for uplink control transmissions over the secondary cell based on a control transmission over the uplink control channel resources in the secondary cell.

In some examples of the method, apparatuses, and non-transitory computer-readable medium described herein, a first estimate of available transmission power for uplink control transmissions over the primary cell may be obtainable from the first report, and a second estimate of available transmission power for uplink data transmissions over the secondary cell may be obtainable from the second report.

In some examples of the method, apparatuses, and non-transitory computer-readable medium described herein, transmitting the combined report may include operations, features, means, or instructions for transmitting, based on the mode being activated, a third report of available transmission power for uplink control transmissions over the primary cell, the third report being determined based on a first virtual data transmission over virtual control channel resources in the primary cell, and a fourth report of available transmission power for uplink control transmissions over the secondary cell, the fourth report being determined based on a second virtual data transmission over virtual data channel resources in the secondary cell.

Some examples of the method, apparatuses, and non-transitory computer-readable medium described herein may further include operations, features, means, or instructions for determining the third report based at least in part on a quantity of resource blocks associated with the virtual control transmission, a format associated with the virtual uplink control channel, a duration of the virtual control transmission, a subcarrier spacing associated with the virtual uplink control channel, an open loop power control parameter associated with the uplink control channel, a path loss associated with the virtual uplink control channel, a power control adjustment state index associated with the virtual uplink control channel, or any combination thereof.

Some examples of the method, apparatuses, and non-transitory computer-readable medium described herein may further include operations, features, means, or instructions for determining that the first component carrier including the uplink data channel resources may be a primary cell and the second component carrier may be a secondary cell based on the first message, and that communication resources may be not scheduled for the secondary cell based on the second message.

In some examples of the method, apparatuses, and non-transitory computer-readable medium described herein, transmitting the combined report may include operations, features, means, or instructions for transmitting a third report of available transmission power for uplink control transmissions over the primary cell, where the first report of available transmission power for uplink data transmissions over the primary cell may be determined based on a data transmission over the uplink data channel resources in the primary cell, the second report that may be associated with available transmission power for uplink control transmissions over the secondary cell may be determined based on a virtual data transmission over virtual uplink data channel resources in the secondary cell, and the third report may be determined based on a virtual control transmission over virtual control channel resources in the primary cell.

Some examples of the method, apparatuses, and non-transitory computer-readable medium described herein may further include operations, features, means, or instructions for receiving a third message configuring a mode that enables uplink control channel resources to be scheduled on one or more secondary cells of the set of multiple component carriers and determining, based on activation of the mode, that the first component carrier including the uplink data channel resources may be a secondary cell and the second component carrier may be a primary cell based on the first message and that communication resources may be not scheduled for the primary cell based on the second message.

In some examples of the method, apparatuses, and non-transitory computer-readable medium described herein, transmitting the combined report may include operations, features, means, or instructions for transmitting, based on the mode being activated, a third report of available transmission power for uplink data transmissions over the primary cell, where the first report of available transmission power for uplink data transmissions over the secondary cell may be determined based on a data transmission over the uplink data channel resources in the secondary cell, the second report that may be associated with available transmission power for uplink control transmissions over the secondary cell may be determined based on a virtual control transmission over virtual uplink control channel resources in the secondary cell, and the third report may be determined based on a virtual data transmission over virtual data channel resources in the primary cell.

In some examples of the method, apparatuses, and non-transitory computer-readable medium described herein, an estimate of available transmission power for uplink control transmissions over the primary cell may be obtainable from the third report.

In some examples of the method, apparatuses, and non-transitory computer-readable medium described herein, transmitting the combined report may include operations, features, means, or instructions for transmitting, based on the mode being activated, a fourth report of available transmission power for uplink control transmissions over the primary cell, where the fourth report may be determined based on a second virtual data transmission over virtual data channel resources in the primary cell.

Some examples of the method, apparatuses, and non-transitory computer-readable medium described herein may further include operations, features, means, or instructions for receiving a third message configuring a mode that enables uplink control channel resources to be scheduled on one or more secondary cells of the set of multiple component carriers and determining, based on activation of the mode, that the first component carrier including the uplink data channel resources may be a primary cell and the second component carrier may be a secondary cell based on the first message and communication resources may be not scheduled for the secondary cell based on the second message.

In some examples of the method, apparatuses, and non-transitory computer-readable medium described herein, transmitting the combined report may include operations, features, means, or instructions for transmitting, based on the mode being activated, a third report of available transmission power for uplink control transmissions over the primary cell, where the first report of available transmission power for uplink data transmissions over the primary cell may be determined based on a data transmission over the uplink data channel resources in the primary cell, the second report that may be associated with available transmission power for uplink control transmissions over the primary cell may be determined based on a virtual control transmission over virtual uplink control channel resources in the primary cell, and the third report may be determined based on a virtual data transmission over virtual data channel resources in the secondary cell.

In some examples of the method, apparatuses, and non-transitory computer-readable medium described herein, an estimate of available transmission power for uplink control transmissions over the secondary cell may be obtainable from the third report.

In some examples of the method, apparatuses, and non-transitory computer-readable medium described herein, transmitting the combined report may include operations, features, means, or instructions for transmitting, based on the mode being activated, a fourth report of available transmission power for uplink control transmissions over the secondary cell, where the fourth report may be determined based on a second virtual control transmission over virtual control channel resources in the secondary cell.

A method for wireless communication at a network device is described. The method may include transmitting a first message indicating a set of multiple component carriers are configured for a UE, transmitting a second message scheduling uplink data channel resources in a first component carrier of the set of multiple component carriers, and receiving, over the uplink data channel resources, a combined report including a first report of available transmission power for uplink data transmissions over the first component carrier and a second report that is associated with available transmission power for uplink control channel resources over a second component carrier of the set of multiple component carriers.

An apparatus for wireless communication at a network device is described. The apparatus may include a processor, memory coupled with the processor, and instructions stored in the memory. The instructions may be executable by the processor to cause the apparatus to transmit a first message indicating a set of multiple component carriers are configured for a UE, transmit a second message scheduling uplink data channel resources in a first component carrier of the set of multiple component carriers, and receive, over the uplink data channel resources, a combined report including a first report of available transmission power for uplink data transmissions over the first component carrier and a second report that is associated with available transmission power for uplink control channel resources over a second component carrier of the set of multiple component carriers.

Another apparatus for wireless communication at a network device is described. The apparatus may include means for transmitting a first message indicating a set of multiple component carriers are configured for a UE, means for transmitting a second message scheduling uplink data channel resources in a first component carrier of the set of multiple component carriers, and means for receiving, over the uplink data channel resources, a combined report including a first report of available transmission power for uplink data transmissions over the first component carrier and a second report that is associated with available transmission power for uplink control channel resources over a second component carrier of the set of multiple component carriers.

A non-transitory computer-readable medium storing code for wireless communication at a network device is described. The code may include instructions executable by a processor to transmit a first message indicating a set of multiple component carriers are configured for a UE, transmit a second message scheduling uplink data channel resources in a first component carrier of the set of multiple component carriers, and receive, over the uplink data channel resources, a combined report including a first report of available transmission power for uplink data transmissions over the first component carrier and a second report that is associated with available transmission power for uplink control channel resources over a second component carrier of the set of multiple component carriers.

Some examples of the method, apparatuses, and non-transitory computer-readable medium described herein may further include operations, features, means, or instructions for transmitting, to the UE, a first indication of a first capability for estimating available transmission power for uplink control channel resources based on an available transmission power for uplink data channel resources and transmitting, to the UE, a second indication of a second capability for estimating available transmission power for uplink data channel resources based on an available transmission power for uplink control channel resources; or both.

Some examples of the method, apparatuses, and non-transitory computer-readable medium described herein may further include operations, features, means, or instructions for determining whether to schedule second uplink control channel resources in the first component carrier or the second component carrier based on the combined report and transmitting a third message scheduling the second uplink control channel resources in the first component carrier based on the second report indicating an amount of available transmission power for uplink control channel resources in the second component carrier that may be below a first threshold, a delay associated with scheduling uplink control channel resources in the second component carrier exceeding a second threshold, or both.

Some examples of the method, apparatuses, and non-transitory computer-readable medium described herein may further include operations, features, means, or instructions for configuring the first component carrier as a secondary cell and the second component carrier as a primary cell, where the first message may be based on the configuring and allocating the uplink control channel resources for the UE on the primary cell, where the second message may be based on the allocating.

In some examples of the method, apparatuses, and non-transitory computer-readable medium described herein, the first report of available transmission power for uplink data transmissions over the secondary cell may be based on a data transmission over the uplink data channel resources in the secondary cell, and the second report that may be associated with available transmission power for uplink control transmissions over the primary cell may be based on a control transmission over the uplink control channel resources in the primary cell.

In some examples of the method, apparatuses, and non-transitory computer-readable medium described herein, estimating, based on the second report, available transmission power for uplink data transmissions over the primary cell.

In some examples of the method, apparatuses, and non-transitory computer-readable medium described herein, receiving the combined report may include operations, features, means, or instructions for receiving a third report of available transmission power for uplink data transmissions over the primary cell, the third report being based on a virtual data transmission over virtual data channel resources in the primary cell.

Some examples of the method, apparatuses, and non-transitory computer-readable medium described herein may further include operations, features, means, or instructions for configuring the first component carrier including the uplink data channel resources as a primary cell and the second component carrier as a secondary cell, where the first message may be based on the configuring, allocating the uplink control channel resources for the UE on the secondary cell, where the second message may be based on the allocating, and transmitting a third message configuring a mode that enables uplink control channel resources to be scheduled on one or more secondary cells of the set of multiple component carriers.

In some examples of the method, apparatuses, and non-transitory computer-readable medium described herein, the first report of available transmission power for uplink data transmissions over the primary cell may be based on a data transmission over the uplink data channel resources in the primary cell, and the second report that may be associated with available transmission power for uplink control transmissions over the secondary cell may be based on a control transmission over the uplink control channel resources in the secondary cell.

In some examples of the method, apparatuses, and non-transitory computer-readable medium described herein, estimating, based on the first report, available transmission power for uplink control transmissions over the primary cell and estimating, based on the second report, available transmission power for uplink data transmissions over the secondary cell.

In some examples of the method, apparatuses, and non-transitory computer-readable medium described herein, receiving the combined report may include operations, features, means, or instructions for receiving, based on the mode being activated, a third report of available transmission power for uplink control transmissions over the primary cell, the third report being based on a first virtual data transmission over virtual control channel resources in the primary cell, and a fourth report of available transmission power for uplink control transmissions over the secondary cell, the fourth report being based on a second virtual data transmission over virtual data channel resources in the secondary cell.

Some examples of the method, apparatuses, and non-transitory computer-readable medium described herein may further include operations, features, means, or instructions for configuring the first component carrier including the uplink data channel resources as a primary cell and the second component carrier as a secondary cell, where the first message may be based on the configuring and allocating no communication resources for the UE on the secondary cell, where the second message may be based on the allocating.

In some examples of the method, apparatuses, and non-transitory computer-readable medium described herein, receiving the combined report may include operations, features, means, or instructions for receiving a third report of available transmission power for uplink control transmissions over the primary cell, where the first report of available transmission power for uplink data transmissions over the primary cell may be based on a data transmission over the uplink data channel resources in the primary cell, the second report that may be associated with available transmission power for uplink control transmissions over the secondary cell may be based on a virtual data transmission over virtual uplink data channel resources in the secondary cell, and the third report may be based on a virtual control transmission over virtual control channel resources in the primary cell.

Some examples of the method, apparatuses, and non-transitory computer-readable medium described herein may further include operations, features, means, or instructions for configuring the first component carrier including the uplink data channel resources as a secondary cell and the second component carrier as a primary cell, where the first message may be based on the configuring, allocating no communication resources for the UE on the primary cell, where the second message may be based on the allocating, and transmitting a third message configuring a mode that enables uplink control channel resources to be scheduled on one or more secondary cells of the set of multiple component carriers.

In some examples of the method, apparatuses, and non-transitory computer-readable medium described herein, receiving the combined report may include operations, features, means, or instructions for receiving, based on the mode being activated, a third report of available transmission power for uplink data transmissions over the primary cell, where the first report of available transmission power for uplink data transmissions over the secondary cell may be based on a data transmission over the uplink data channel resources in the secondary cell, the second report that may be associated with available transmission power for uplink control transmissions over the secondary cell may be based on a virtual control transmission over virtual uplink control channel resources in the secondary cell, and the third report may be based on a virtual data transmission over virtual data channel resources in the primary cell.

In some examples of the method, apparatuses, and non-transitory computer-readable medium described herein, estimating, based on the third report, available transmission power for uplink control transmissions over the primary cell.

In some examples of the method, apparatuses, and non-transitory computer-readable medium described herein, receiving the combined report may include operations, features, means, or instructions for receiving, based on the mode being activated, a fourth report of available transmission power for uplink control transmissions over the primary cell, where the fourth report may be based on a second virtual data transmission over virtual data channel resources in the primary cell.

Some examples of the method, apparatuses, and non-transitory computer-readable medium described herein may further include operations, features, means, or instructions for configuring the first component carrier including the uplink data channel resources as a primary cell and the second component carrier as a secondary cell, where the first message may be based on the configuring, allocating no communication resources for the UE on the secondary cell, where the second message may be based on the allocating, and transmitting a third message configuring a mode that enables uplink control channel resources to be scheduled on one or more secondary cells of the set of multiple component carriers.

In some examples of the method, apparatuses, and non-transitory computer-readable medium described herein, receiving the combined report may include operations, features, means, or instructions for receiving, based on the mode being activated, a third report of available transmission power for uplink control transmissions over the primary cell, where the first report of available transmission power for uplink data transmissions over the primary cell may be based on a data transmission over the uplink data channel resources in the primary cell, the second report that may be associated with available transmission power for uplink control transmissions over the primary cell may be based on a virtual control transmission over virtual uplink control channel resources in the primary cell, and the third report may be based on a virtual data transmission over virtual data channel resources in the secondary cell.

In some examples of the method, apparatuses, and non-transitory computer-readable medium described herein, estimating, based on the third report, available transmission power for uplink control transmissions over the secondary cell.

In some examples of the method, apparatuses, and non-transitory computer-readable medium described herein, receiving the combined report may include operations, features, means, or instructions for receiving, based on the mode being activated, a fourth report of available transmission power for uplink control transmissions over the secondary cell, where the fourth report may be based on a second virtual control transmission over virtual control channel resources in the secondary cell.

A method for wireless communication at a user equipment (UE) is described. The method may include receiving a first message indicating a set of multiple component carriers are configured for the UE, receiving an indication that one or more secondary cells of the set of multiple component carriers are enabled for scheduling uplink control channel resources, receiving a second message scheduling uplink data channel resources of a first component carrier of the set of multiple component carriers, and transmitting, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

An apparatus for wireless communication at a UE is described. The apparatus may include a processor, memory coupled with the processor, and instructions stored in the memory. The instructions may be executable by the processor to cause the apparatus to receive a first message indicating a set of multiple component carriers are configured for the UE, receive an indication that one or more secondary cells of the set of multiple component carriers are enabled for scheduling uplink control channel resources, receive a second message scheduling uplink data channel resources of a first component carrier of the set of multiple component carriers, and transmit, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

Another apparatus for wireless communication at a UE is described. The apparatus may include means for receiving a first message indicating a set of multiple component carriers are configured for the UE, means for receiving an indication that one or more secondary cells of the set of multiple component carriers are enabled for scheduling uplink control channel resources, means for receiving a second message scheduling uplink data channel resources of a first component carrier of the set of multiple component carriers, and means for transmitting, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

A non-transitory computer-readable medium storing code for wireless communication at a UE is described. The code may include instructions executable by a processor to receive a first message indicating a set of multiple component carriers are configured for the UE, receive an indication that one or more secondary cells of the set of multiple component carriers are enabled for scheduling uplink control channel resources, receive a second message scheduling uplink data channel resources of a first component carrier of the set of multiple component carriers, and transmit, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

Some examples of the method, apparatuses, and non-transitory computer-readable medium described herein may further include operations, features, means, or instructions for receiving a third message scheduling the uplink control channel resources on the second component carrier based on the one or more secondary cells being enabled for scheduling uplink control channel resources and determining that the first component carrier including the uplink data channel resources may be a primary cell and the second component carrier may be a secondary cell based on the first message and that the uplink control channel resources may be scheduled for the secondary cell based on the third message.

Some examples of the method, apparatuses, and non-transitory computer-readable medium described herein may further include operations, features, means, or instructions for determining the first parameter indicating available transmission power for uplink data transmissions over the primary cell based on a data transmission over the uplink data channel resources in the primary cell and determining the second parameter indicating available transmission power for uplink control transmissions over the secondary cell based on a control transmission over the uplink control channel resources in the secondary cell.

In some examples of the method, apparatuses, and non-transitory computer-readable medium described herein, the combined report further includes a third parameter indicating available transmission power for uplink control transmissions over the primary cell, the third parameter indicating being determined based on a virtual control transmission over virtual uplink control channel resources in the primary cell, and a fourth parameter indicating available transmission power for uplink data transmissions over the secondary cell, the fourth parameter indicating being determined based on a virtual data transmission over virtual uplink data channel resources in the secondary cell.

Some examples of the method, apparatuses, and non-transitory computer-readable medium described herein may further include operations, features, means, or instructions for determining the third parameter based on a quantity of resource blocks associated with the virtual control transmission, a format associated with a virtual uplink control channel, a duration of the virtual control transmission, a subcarrier spacing associated with the virtual uplink control channel, an open loop power control parameter associated with the virtual uplink control channel, a path loss associated with the virtual uplink control channel, a power control adjustment state index associated with the virtual uplink control channel, or any combination thereof.

Some examples of the method, apparatuses, and non-transitory computer-readable medium described herein may further include operations, features, means, or instructions for receiving a third message scheduling the uplink control channel resources on the first component carrier based on the one or more secondary cells being enabled for scheduling uplink control channel resources and determining that the first component carrier including the uplink data channel resources may be a secondary cell and the second component carrier may be a primary cell based on the first message and that communication resources may be not scheduled for the primary cell based on the second message and the third message.

In some examples of the method, apparatuses, and non-transitory computer-readable medium described herein, the combined report further includes a third parameter indicating available transmission power for uplink data transmissions over the primary cell and the first parameter indicating available transmission power for uplink data transmissions over the secondary cell may be determined based on a data transmission over the uplink data channel resources in the secondary cell, the second parameter indicating available transmission power for uplink control transmissions over the secondary cell may be determined based on a virtual control transmission over virtual uplink control channel resources in the secondary cell, and the third parameter indicating may be determined based on a virtual data transmission over virtual uplink data channel resources in the primary cell.

In some examples of the method, apparatuses, and non-transitory computer-readable medium described herein, the combined report further includes a fourth parameter indicating available transmission power for uplink control transmissions over the primary cell and the fourth parameter indicating may be determined based on a virtual control transmission over virtual uplink control channel resources in the primary cell.

Some examples of the method, apparatuses, and non-transitory computer-readable medium described herein may further include operations, features, means, or instructions for receiving a third message scheduling the uplink control channel resources on the first component carrier based on the one or more secondary cells being enabled for scheduling uplink control channel resources and determining, based on the carrier switching being configured, that the first component carrier including the uplink data channel resources may be a primary cell and the second component carrier may be a secondary cell based on the first message and communication resources may be not scheduled for the secondary cell based on the second message and the third message.

In some examples of the method, apparatuses, and non-transitory computer-readable medium described herein, the combined report further includes a third parameter indicating available transmission power for uplink control transmissions over the primary cell and the first parameter indicating available transmission power for uplink data transmissions over the primary cell may be determined based on a data transmission over the uplink data channel resources in the primary cell, the second parameter indicating available transmission power for the uplink control transmissions over the primary cell may be determined based on a virtual control transmission over virtual uplink control channel resources in the primary cell, and the third parameter indicating may be determined based on a virtual data transmission over virtual uplink data channel resources in the secondary cell.

In some examples of the method, apparatuses, and non-transitory computer-readable medium described herein, the combined report further includes a fourth parameter indicating available transmission power for uplink control transmissions over the secondary cell and the fourth parameter indicating may be determined based on a second virtual control transmission over virtual uplink control channel resources in the secondary cell.

A method for wireless communication at a network device is described. The method may include transmitting a first message indicating a set of multiple component carriers are configured for a UE, transmitting an indication that one or more secondary cells of the set of multiple component carriers are enabled for scheduling uplink control channel resources, transmitting a second message scheduling uplink data channel resources in a first component carrier of the set of multiple component carriers, and receiving, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

An apparatus for wireless communication at a network device is described. The apparatus may include a processor, memory coupled with the processor, and instructions stored in the memory. The instructions may be executable by the processor to cause the apparatus to transmit a first message indicating a set of multiple component carriers are configured for a UE, transmit an indication that one or more secondary cells of the set of multiple component carriers are enabled for scheduling uplink control channel resources, transmit a second message scheduling uplink data channel resources in a first component carrier of the set of multiple component carriers, and receive, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

Another apparatus for wireless communication at a network device is described. The apparatus may include means for transmitting a first message indicating a set of multiple component carriers are configured for a UE, means for transmitting an indication that one or more secondary cells of the set of multiple component carriers are enabled for scheduling uplink control channel resources, means for transmitting a second message scheduling uplink data channel resources in a first component carrier of the set of multiple component carriers, and means for receiving, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

A non-transitory computer-readable medium storing code for wireless communication at a network device is described. The code may include instructions executable by a processor to transmit a first message indicating a set of multiple component carriers are configured for a UE, transmit an indication that one or more secondary cells of the set of multiple component carriers are enabled for scheduling uplink control channel resources, transmit a second message scheduling uplink data channel resources in a first component carrier of the set of multiple component carriers, and receive, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

Some examples of the method, apparatuses, and non-transitory computer-readable medium described herein may further include operations, features, means, or instructions for determining whether to schedule second uplink control channel resources in the first component carrier or the second component carrier based on the combined report and transmitting a third message scheduling the second uplink control channel resources in the first component carrier based on the second parameter indicating an amount of available transmission power for the uplink control channel resources in the second component carrier that may be below a first threshold, a delay associated with scheduling the uplink control channel resources in the second component carrier exceeding a second threshold, or both.

Some examples of the method, apparatuses, and non-transitory computer-readable medium described herein may further include operations, features, means, or instructions for configuring the first component carrier including the uplink data channel resources as a primary cell and the second component carrier as a secondary cell, where the first message may be based on the configuring, allocating the uplink control channel resources for the UE on the secondary cell, where the second message may be based on the allocating, and transmitting a third message scheduling the uplink control channel resources on the second component carrier based on the one or more secondary cells being enabled for scheduling uplink control channel resources.

In some examples of the method, apparatuses, and non-transitory computer-readable medium described herein, the first parameter indicating available transmission power for uplink data transmissions over the primary cell may be based on a data transmission over the uplink data channel resources in the primary cell, and the second parameter indicating available transmission power for uplink control transmissions over the secondary cell may be based on a control transmission over the uplink control channel resources in the secondary cell.

In some examples of the method, apparatuses, and non-transitory computer-readable medium described herein, the combined report further includes a third parameter indicating available transmission power for uplink control transmissions over the primary cell, the third parameter indicating being based on a first virtual data transmission over virtual uplink control channel resources in the primary cell, and a fourth parameter indicating available transmission power for uplink control transmissions over the secondary cell, the fourth parameter indicating being based on a second virtual data transmission over virtual uplink data channel resources in the secondary cell.

Some examples of the method, apparatuses, and non-transitory computer-readable medium described herein may further include operations, features, means, or instructions for configuring the first component carrier including the uplink data channel resources as a secondary cell and the second component carrier as a primary cell, where the first message may be based on the configuring, allocating no communication resources for the UE on the primary cell, where the second message may be based on the allocating, and transmitting a third message scheduling the uplink control channel resources on the first component carrier based on the one or more secondary cells being enabled for scheduling uplink control channel resources.

In some examples of the method, apparatuses, and non-transitory computer-readable medium described herein, the combined report further includes a third parameter indicating available transmission power for uplink data transmissions over the primary cell and the first parameter indicating available transmission power for uplink data transmissions over the secondary cell may be based on a data transmission over the uplink data channel resources in the secondary cell, the second parameter indicating available transmission power for uplink control transmissions over the secondary cell may be based on a virtual control transmission over virtual uplink control channel resources in the secondary cell, and the third parameter indicating may be based on a virtual data transmission over virtual uplink data channel resources in the primary cell.

In some examples of the method, apparatuses, and non-transitory computer-readable medium described herein, the combined report further includes a fourth parameter indicating available transmission power for uplink control transmissions over the primary cell and the fourth parameter indicating may be based on a virtual control transmission over virtual uplink control channel resources in the primary cell.

Some examples of the method, apparatuses, and non-transitory computer-readable medium described herein may further include operations, features, means, or instructions for configuring the first component carrier including the uplink data channel resources as a primary cell and the second component carrier as a secondary cell, where the first message may be based on the configuring, allocating no communication resources for the UE on the secondary cell, where the second message may be based on the allocating, and transmitting a third message scheduling the uplink control channel resources on the first component carrier based on the one or more secondary cells being enabled for scheduling uplink control channel resources.

In some examples of the method, apparatuses, and non-transitory computer-readable medium described herein, the combined report further includes a third parameter indicating available transmission power for uplink control transmissions over the primary cell and the first parameter indicating available transmission power for uplink data transmissions over the primary cell may be based on a data transmission over the uplink data channel resources in the primary cell, the second parameter indicating available transmission power for uplink control transmissions over the primary cell may be based on a virtual control transmission over virtual uplink control channel resources in the primary cell, and the third parameter indicating may be based on a virtual data transmission over virtual uplink data channel resources in the secondary cell.

In some examples of the method, apparatuses, and non-transitory computer-readable medium described herein, the combined report further includes a fourth parameter indicating available transmission power for uplink control transmissions over the secondary cell and the fourth parameter indicating may be based on a second virtual control transmission over virtual uplink control channel resources in the secondary cell.

Some examples of the method, apparatuses, and non-transitory computer-readable medium described herein may further include operations, features, means, or instructions for transmitting, to the UE, a first indication of a first capability for estimating available transmission power for the uplink control channel resources based on an available transmission power for the uplink data channel resources and transmitting, to the UE, a second indication of a second capability for estimating available transmission power for the uplink data channel resources based on an available transmission power for the uplink control channel resources; or both.

DETAILED DESCRIPTION

Figure 1:
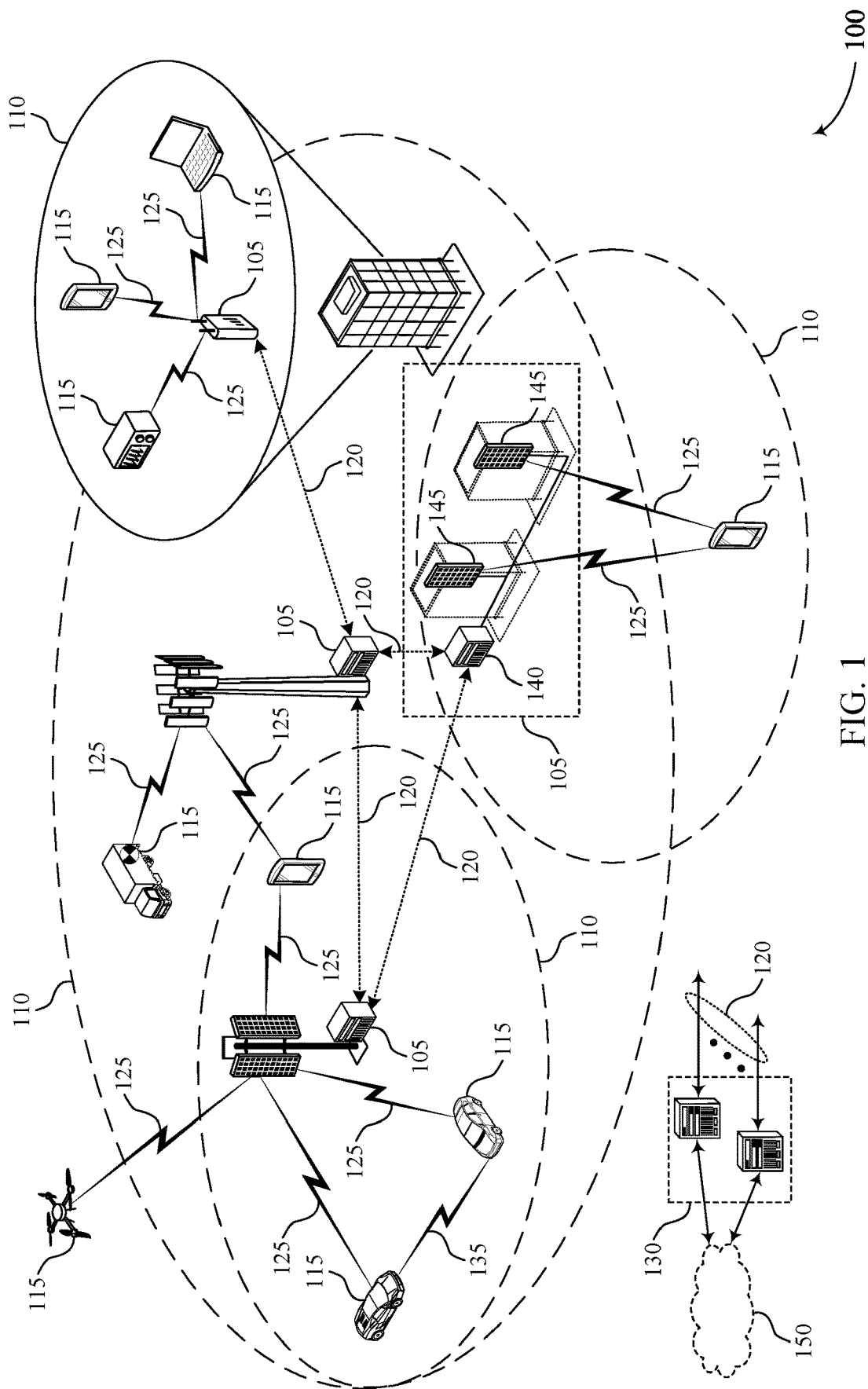
FIG. 1 illustrates an example of a wireless communications system that supports control resource power headroom reporting.

Carrier aggregation may be used to increase a throughput of communications between a network device (e.g., one or more components of a base station) and a user equipment (UE). When carrier aggregation is enabled, a group of component carriers, including a primary component carrier (which may also be referred to as a primary cell) and one or more secondary component carriers (which may also be referred to as secondary cells), may be configured for a UE. A network device may be able to allocate communication resources to the UE on each (or a subset) of the component carriers and to transmit or receive information to or from the UE over the allocated communication resources. In some examples, a network device allocates uplink communication resources on component carriers based on an amount of uplink transmission power at the UE that is available for transmitting over the component carriers (which may also be referred to as power headroom)—e.g., based on an indication of available uplink transmission power for the different component carriers reported by the UE. In some examples, a network device may allocate uplink communication resources over the component carriers that have an amount of available uplink transmission power that exceeds a threshold.

In some examples, a network device may be limited to scheduling communication resources for uplink control transmissions (e.g., uplink control channel resources) on the primary cell. However, limiting uplink control channel resources to the primary cell may delay the transmission of uplink control information. Thus, a network device may be configured to support the scheduling of uplink control channel resources on the primary cell or one of the secondary cells. In some examples, the network device schedules the uplink control channel resources over a cell (e.g., a primary or secondary cells) that reduces a delay for transmitting the uplink control information by a largest amount.

However, scheduling uplink control resources over primary or secondary cells based solely on transmission delay may not take into account whether a UE has transmission power available to transmit the control information over a selected component carrier. Indeed, techniques that support reporting power headroom solely for control transmissions are not yet be established. For example, because prior to being capable of scheduling uplink control resources on either a primary cell or a secondary cell, a UE would report either power headroom for data transmissions over a cell (which may be referred to as a Type 1 report). Or power headroom for combined data and control transmissions over the primary cell (which may be referred to as a Type 2 report)—e.g., as the data and control transmissions may be multiplexed using the data resources. Accordingly, power headroom reports for reporting solely control transmissions on a cell may not be established. Thus, a network device may not consider power headroom for uplink control transmissions when determining which cell is best suited to support an uplink control transmission from the UE, and the UE may exceed a maximum transmission power when performing an uplink control transmission.

To support scheduling of uplink control resources over primary and secondary cells that takes into account power headroom for uplink control transmissions, techniques for reporting power headroom associated with uplink control transmissions (e.g., procedures and signaling mechanisms) are described herein. In some examples, a power headroom report (PHR) that is used to report power headroom for uplink control channel resources (which may be referred to as a Type 4 report, a PUCCH PHR, or a control PHR) in a component carrier may be established. A UE may include the control PHR report in a combined power headroom report to explicitly report power headroom for uplink control transmissions over a component carrier. A combined power headroom report may include multiple PHR reports (e.g., including one or more data PHRs and one or more control PHR for one or more component carriers).

In some examples, a network device may be able to infer power headroom for uplink control channel resources in a cell from a power headroom report received for uplink data channel resources (which may be referred to as a Type 1 report, a PUSCH PHR, or a data PHR) in the cell. In such cases, a UE may not include a control PHR (or may include a reduced quantity of PHRs) in a combined power headroom report. Procedures may be established for a UE to determine a combination of power headroom reports to include in a combined power headroom report that is transmitted to a network device. In some examples, the combination of power headroom reports included in the combined power headroom report may be based on a resource allocation for a UE and an ability of the network device to infer power headroom for uplink control channel resources from a power headroom report received for uplink data channel resources, as described in more detail herein.

A network device may use the information in the power headroom reports (e.g., in combination with latency information) to determine over which component carrier to schedule uplink control channel resources—e.g., the network device may schedule the uplink control channel resources in a component carrier associated with a longer delay if a power headroom value for a component carrier associated with a shorter delay is negative.

Aspects of the disclosure are initially described in the context of wireless communications systems. Aspects of the disclosure are also described in the context of a process flow. Aspects of the disclosure are further illustrated by and described with reference to apparatus diagrams, system diagrams, and flowcharts that relate to control resource power headroom reporting.

FIG. 1 illustrates an example of a wireless communications system 100 that supports control resource power headroom reporting. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Carrier aggregation techniques may be used to increase an amount of information that can be communicated between a network device (e.g., a base station 105, one or more nodes of a disaggregated base station) and a UE 115 within a period of time. In some examples of carrier aggregation, multiple component carriers may be configured for communications between a base station 105 and a UE 115, where concurrent communications may be performed over separate sets of communication resources in the different component carriers. For example, a base station 105 may transmit downlink data information to a UE 115 over a first set of downlink data resources in a first component carrier and a second set of downlink data resources in a second component carrier.

In some examples, a group of component carriers is activated for a UE 115, where one of the component carriers may be referred to as the primary component carrier and the remaining component carriers may be referred to as secondary component carriers. In some examples, the primary component carrier may be referred to as the primary cell or PCell, and the secondary component carriers may be referred to as secondary cells or SCells. In some examples, transmissions of certain types of information (e.g., uplink control channel information and, in some examples, downlink control channel information) may be restricted to the primary cell. In such cases, uplink control information (e.g., HARQ information, CQI, power headroom information, etc.) generated for all of the component carriers in the group of component carriers may be transmitted in an uplink control transmission performed using uplink control channel resources scheduled in the primary cell. In some examples, the group of component carriers may be referred to as an uplink control channel group (which may also be referred to as a PUCCH group). In some examples, multiple groups of component carriers are activated for a UE 115, where each group may include a primary cell and one or more secondary cells.

Power headroom reporting may be used by a network device to improve the scheduling of uplink communication resources for a UE 115. A power headroom report may include an indication of how much transmission power a UE 115 has left for additional uplink transmissions considering how much transmission power is being used by the UE 115 for current uplink transmissions. For example, power headroom for other uplink transmissions may be calculated by subtracting the amount of power being used for an uplink data transmission (which may be represented as $P_{PUSCH}$) from the maximum amount of transmission power supported by the UE 115 for uplink transmissions (which may be represented as $P_{MAX}$).

A power headroom report may include one (e.g., a single) or more power headroom reports for one or more component carriers activated for the UE 115. In such cases, a network device may use the power headroom reports to determine over which component carriers to allocate uplink data resources for the UE 115. In some examples, the network device refrains from scheduling additional uplink data resources on a component carrier based on a corresponding power headroom report including a zero value (indicating there is no available transmission power for transmissions over the component carrier), a negative value (indicating the current transmission power over the component carrier exceeds the available transmission power), or a positive value (indicating the current transmission power for transmissions over the component carrier is lower than the available transmission power) that is below a threshold.

In some examples, the maximum amount of transmission power supported by the UE 115 may be based on an amount of power backoff used by the UE 115 for transmissions, whether a maximum power reduction has been triggered, or both. The power backoff selected by a UE 115 may be based on a linear and non-linear operating range of a power amplifier e.g., the UE 115 may limit a maximum transmission power of a transmission so that the power amplifier does not (or is less likely to) enter the non-linear range during operation. In some examples, a maximum power reduction (MPR) parameter may indicate a reduction of a maximum transmission power of the UE 115 based on modulation techniques used by the UE 115, a resource block assignment for the UE 115, physical channel resources used by the UE 115, or any combination thereof—e.g., to meet emission requirements. In some examples, an additional maximum power reduction (A-MPR) may indicate an additional power reduction for the UE 115 (relative to the maximum transmission power of the UE 115)—e.g., in certain frequency bands or geographic regions. In some examples, a power management maximum power reduction (P-MPR) may indicate an additional power reduction for the UE 115—e.g., based on a proximity of the UE 115 to a user.

In some examples, the UE 115 may determine a maximum transmission power for each component carrier activated for UE 115, where an index of each component carrier may be represented by the variable c. In some examples, the maximum transmission power supported by the UE 115 (e.g., after applying any power backoff or power reduction) may be selected by the UE 115 from a range of possible maximum transmission powers. For example, a lower bound ($P_{CMAX\_L,c}$) of the maximum transmission power and an upper bound ($P_{CMAX\_H,c}$) of the maximum transmission power may be established for the UE 115—e.g., based on parameters provided by a base station 105. In some examples, the lower bound $P_{CMAX\_L,c}$ may be determined based on the following equation:

$$\text{MIN}\left\{ (P_{PwrClass} - \Delta P_{PwrClass}) - \text{MAX}\left( \begin{array}{c} P_{EMAX,c} - \Delta T_{C,c}; \\ MPR_c + A\text{-}MPR_c + \Delta T_{IB,c} + \Delta T_{C,c} + \Delta T_{ProSe} \\ P\text{-}MPR_c \end{array} \right) \right\}$$

And the upper bound $P_{CMAX\_H,c}$ may be determined based on the following equation:

$$\text{MIN}\left\{ \begin{array}{c} P_{EMAX,c}; \\ P_{PwrClass} - \Delta P_{PwrClass} \end{array} \right\}.$$

In such cases, the UE 115 may select (e.g., on a per component carrier basis) a maximum transmission power from within the range of maximum transmission powers. In some examples, the UE 115 selects the maximum transmission power based on considerations that are not available to (e.g., unknown) the base station 105—e.g., a UE 115 may select different maximum transmission power based on a modulation order, waveform, and resource block location between control and data resources. Thus, the base station 105 may be unable to determine the maximum transmission power currently supported by the UE 115.

After selecting one or more maximum transmission powers (e.g., per carrier), the UE 115 may use the selected maximum transmission powers to determine power headroom values for one or more component carriers—e.g., based on subtracting transmission powers allocated to transmissions over the one or more component carrier from respective maximum transmission powers. In some examples, the UE 115 determines separate power headroom reports for different types of transmissions—for example, the UE 115 may determine a power headroom value based on data transmissions, SRS transmission, or combined data and control transmissions. Power headroom reports that are generated based on scheduled transmissions may be referred to as "actual" power headroom reports.

In some examples, a UE 115 may be scheduled to transmit a power headroom report when resources (or resources of a certain type) are not scheduled (or have not been within a relevant time period) in one or more cells associated with the power headroom report. In such cases, the UE 115 may calculate "virtual" power headroom values and report virtual power headroom reports for the one or more cells instead of actual power headroom reports. A virtual power headroom value may be generated by estimating a maximum transmission power for one or more transmission types (e.g., a data channel, a combined data/control channel, or SRS transmission) assuming resources for the one or more transmission types are scheduled in a resource block, as well as assuming that no maximum power reduction will be applied. Thus, the lower bound and upper bound for the maximum power reduction may be equivalent (or nearly equivalent), and a base station 105 may be able to determine the maximum power value used by the UE 115 to generate a virtual power headroom report.

The UE 115 may include the determined power headroom reports (e.g., the actual power headroom reports, virtual power headroom reports, or both) in a combined power headroom report (which may be referred to simply as a power headroom report). In some examples, a UE 115 may transmit the combined power headroom report in a MAC-CE, where the combined power headroom report may include power headroom reports for multiple component carriers. The MAC-CE may include a bitmap for indicating which component carrier is associated with which power headroom report, a field for indicating whether a power headroom report is real or virtual, and a field to indicate whether a MAC entity at the UE 115 has applied power backoff—e.g., due to power management.

A power headroom report may include multiple types of power headroom. For example, a power headroom report may include a Type 1 power headroom that indicates, for a cell, the difference between the maximum transmission power for a UE 115 and the estimated transmission power for transmitting an uplink shared channel transmission by the UE 115 (which may also be referred to as a PUSCH PHR or data PHR). A Type 2 power headroom that indicates, for a cell, the difference between the maximum transmission power of a UE 115 and the estimated transmission power for transmitting a combined uplink shared channel transmission and uplink control channel transmission by the UE 115 (which may also be referred to as a PUSCH/PUCCH PHR or a combined data/control PHR). In some examples, a Type 2 headroom report may be used to indicate power headroom for combined data and control transmissions over a primary cell used by another MAC entity—e.g., an LTE MAC entity for a UE 115 that is configured in a E-UTRAN/New Radio Dual Connectivity (EN-DC) or New Radio/E-UTRAN Dual Connectivity (NE-DC) mode. And a Type 3 power headroom that indicates, for a cell, the difference between the maximum transmission power of a UE 115 and the estimated transmission power for transmitting an SRS transmission by the UE 115 (which may also be referred to as an SRS PHR). In some examples, a UE 115 is configured to report separate power headroom values for each cell configured for the UE 115.

In some examples, a network device (e.g., a base station 105, one or more nodes of a disaggregated base station) may be limited to scheduling uplink control channel resources in a primary cell. Also, in some examples, a network device may not support simultaneous transmissions of uplink control information and uplink data information over separate component carriers. When simultaneous transmissions are not supported, if uplink data channel resources are scheduled on one component carrier at a same time as uplink control channel resources on another component carrier, the uplink control information scheduled to be transmitted over the uplink control channel resources may instead be multiplexed with the data scheduled to be transmitted over the uplink data channel resources. The multiplexed uplink data and uplink control information may then be transmitted over the uplink data channel resources. In either case, a power headroom report that indicates, for a cell, the difference between the maximum transmission power for a UE 115 and the estimated transmission power for uplink transmissions may not be used by the network device or UE 115. In such cases, such a power headroom report may be irrelevant. That is, for network devices that are limited to scheduling control channel resources on primary cells, the network device may be forced to schedule uplink control resources on a primary cell regardless of the power headroom for uplink control transmissions on the primary cell. In such cases, a single PHR report for data transmissions over the primary cell may be used to indicate a power headroom at a UE 115. Similarly, for wireless networks that do not support simultaneous uplink data and control transmissions over primary and secondary cells, the network device may be configured to transmit both the control information and data over the data channel resources, and the power headroom for uplink control transmissions on the cell that includes the control channel resources may be irrelevant—e.g., as that cell may be unused.

Restricting transmissions of uplink control information for the component carriers in an uplink control channel group to uplink control channel resources in a primary cell may cause excessive delays to be introduced in the reporting of uplink control information for the one or more component carriers. For example, if the primary cell uses time-division multiplexing techniques, an uplink control channel resource may not occur until multiple subframes after a set of uplink control information for one or more component carriers is generated and ready to be transmitted—even though an uplink control resource could otherwise be scheduled sooner on a secondary cell. To reduce a latency associated with transmitting uplink control information over primary cells, a network device (e.g., a base station 105, one or more nodes of a disaggregated base station) may support a communication mode (which may be referred to as a carrier switch mode) that enables uplink control channel resources to be scheduled on secondary cells or primary cells in a control channel resource group—e.g., when latency will be improved.

However, scheduling uplink control resources over primary or secondary cells based solely on transmission delay may not take into account whether a UE 115 has transmission power available to transmit the control information over a component carrier. Also, techniques that support reporting power headroom solely for control transmissions may not be established. Thus, a network device may not consider power headroom when determining which cell is best suited to support an uplink control transmission from the UE 115, and the UE 115 may exceed a maximum transmission power when performing an uplink control transmission.

To support scheduling of uplink control resources over primary and secondary cells that takes into account power headroom for uplink control transmissions, techniques for reporting power headroom associated with uplink control transmissions (e.g., procedures and signaling mechanisms) may be established. In some examples, a power headroom report that is used to report power headroom for uplink control channel resources (which may be referred to as a Type 4 report, a PUCCH PHR, or a control PHR) in a component carrier may be established. A Type 4 report may be used to report power headroom exclusively for control transmissions over a component carrier, and thus may provide power headroom information not communicated by a Type 1 (used to communicate power headroom for combined data and control transmissions over a carrier), Type 2 (used to communicate power headroom for exclusively data transmissions over a carrier), or Type 3 report (used to communicate power headroom for exclusively SRS transmissions over a carrier). A UE 115 may include the control PHR report in a combined power headroom report to explicitly report power headroom for uplink control transmissions over a component carrier.

In some examples, a network device may be able to infer power headroom for uplink control channel resources in a cell from a power headroom report received for uplink data channel resources (which may be referred to as a Type 1 report, a PUSCH PHR, or a data PHR) in the cell. In such cases, a UE 115 may not include a control PHR (or may include a reduced quantity of PHRs) in a combined power headroom report. Procedures may be established for a UE 115 to determine a combination of power headroom reports to include in a combined power headroom report that is transmitted to a network device. In some examples, the combination of power headroom reports included in the combined power headroom report may be based on a resource allocation for a UE 115 and an ability of the network device to infer power headroom for uplink control channel resources from a power headroom report received for uplink data channel resources, as described in more detail herein.

A network device may use the information in the power headroom reports (e.g., in combination with latency information) to determine over which component carrier to schedule uplink control channel resources—e.g., the network device may schedule the uplink control channel resources in a component carrier associated with a longer delay if a power headroom for a component carrier associated with a shorter delay is negative.

Figure 2A:
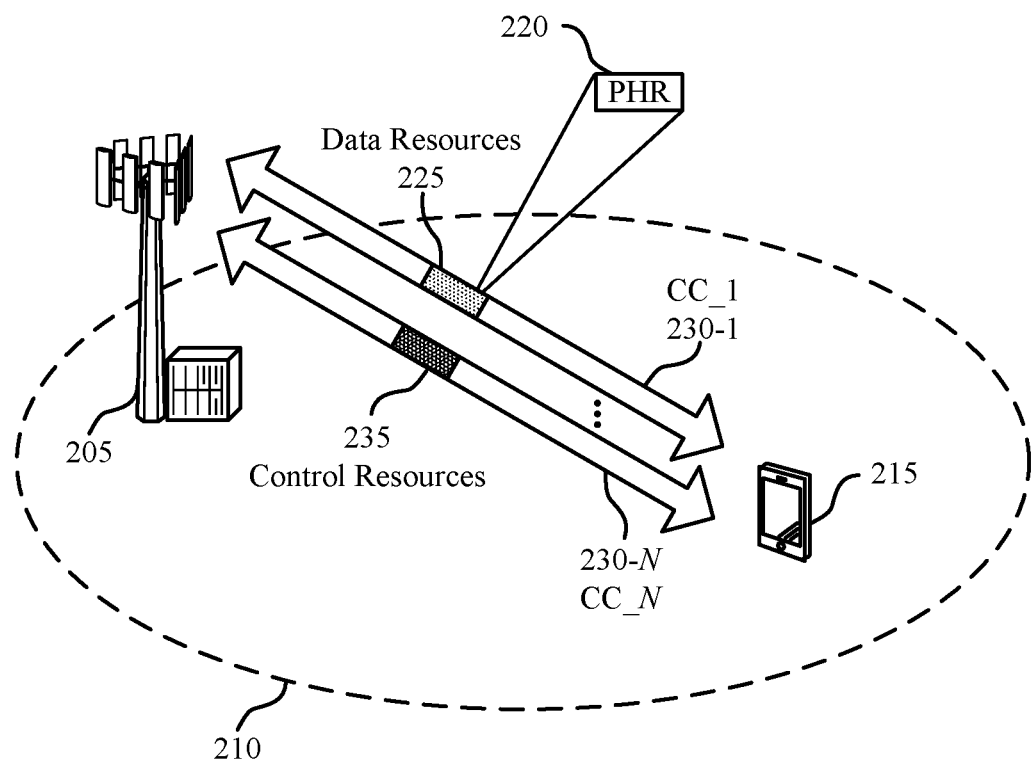
FIG. 2A illustrates an example of a wireless communications subsystem that supports control resource power headroom reporting.

FIG. 2A illustrates an example of a wireless communications subsystem that supports control resource power headroom reporting.

Subsystem 200 depicts base station 205 and UE 215, which may be examples of a base station (or network device) and UE described with reference to FIG. 1. Base station 205 and UE 215 may communicate with one another within coverage area 210 and over component carriers 230, as described herein.

In some examples, base station 205 schedules, for UE 215, uplink data resources 225 over first component carrier 230-1 and uplink control resources 235 over Nth component carrier 230-N. Uplink data resources 225 may include PUSCH resources, and uplink control resources 235 may include PUCCH resources. In some examples, control resources may be scheduled on first component carrier 230-1 instead of uplink data resources 225, and data resources may be scheduled on Nth component carrier 230-N instead of uplink control resources 235. In some examples, no communication resources may be scheduled over Nth component carrier 230-N, and uplink data resources 225 may remain scheduled over first component carrier 230-1. In some examples, data resources may be scheduled on Nth component carrier 230-N instead of uplink control resources 235, and no communication resources may be scheduled over first component carrier 230-1.

In some examples, component carriers 230 may be included in a control channel group. In some cases, first component carrier 230-1 may be a primary cell of the control channel group, and Nth component carrier 230-N may be a secondary cell of the control channel group. In some cases, Nth component carrier 230-N may be a primary cell of the control channel group, and first component carrier 230-1 may be a secondary cell of the control channel group.

UE 215 may be configured to determine power headroom (e.g., which may be referred to as an actual power headroom report) based on actual resources, power headroom based on virtual resources, or both. UE 215 may determine a virtual control PHR based on a virtual control transmission over a reference control channel. In some examples, the determined virtual control PHR may be based on the reference control channel transmission being performed using a set of reference parameters. The reference parameters may include a quantity of resource blocks (e.g., one resource block) used for the reference transmission, a format used for the control channel (e.g., PUCCH format 0 or 1), a reference duration of the PUCCH transmission (e.g., two OFDM symbols for PUCCH format 0 or 14 OFDM symbols for PUCCH format 1), a reference numerology (e.g., 15 KHz subcarrier spacing), a reference open loop power control parameter ($P_{O\_PUCCH}$), a reference pathloss parameter (PUCCH-PathlossReferenceRS), a power control adjustment state index for the control channel, or any combination thereof.

In some examples, UE 215 may calculate actual power control for a control channel $P_{PUCCH,b,f,c}(i, q_u, q_d, 1)$ based on the minimum of 1) $P_{CMAX,f,c}(i)$ and 2) $P_{O\_PUCCH,b,f,c}(q_u) + 10\ \log_{10}(2^{\mu} \cdot M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i,l)$.

In some examples, UE 215 may calculate a virtual PHR based on subtracting a virtual power control value $P_{PUCCH,b,f,c}(i, 0,0,0)$ from the maximum transmission power value $P_{CMAX,f,c}(i)$, as follows:

Virtual PHR=$P_{CMAX,f,c}(i) - P_{PUCCH,b,f,c}(i,0,0,0) = P_{CMAX,f,c}(i) - P_{O\_PUCCH,b,f,c}(0) + PL_{b,f,c}(0)$.

$P_{CMAX,f,c}(i)$ may be computed assuming MPR is equal to 0 dB, A-MPR is equal to 0 dB, P-MPR is equal to 0 dB, and $\Delta T_C$ is equal to 0 dB. Also, $P_{O\_PUCCH,b,f,c}$ may be set to $P_{O\_PUCCH,b,f,c}(0)$, which may correspond to a first entry in a set of open loop power control parameters for UE 215

(which may be represented as $P_{O\_UE\_PUCCH}$) Also, µ in the actual PHR equation may be set to zero assuming a subcarrier spacing of 15 KHz is used. Also, assuming a single resource block control channel is used, $M_{RB,b,f,c}^{PUCCH}(i)$ may be equal to one, and thus, $10 \log_{10}(2^{\mu} \cdot M_{RB,b,f,c}^{PUCCH}(i))$ may be equal to zero. Additionally, for the downlink pathloss measurement, UE 215 may assume $q_d$ is equal to zero, where $q_d$ may represent the PUCCH-PathlossReferenceRS-ID. UE 215 may also assume that $\Delta_{F\_PUCCH}(F)$ is equal to zero. Also, based on assuming either PUCCH format 0 or 1 is used, UE 215 may assume that $\Delta_{TF,b,f,c}(i)$ is equal to zero, where the reference duration may be equal to two OFDM symbols if PUCCH format 0 is used or 14 OFDM symbols if PUCCH format 1 is used. UE 215 may also assume the accumulated power control command is zero, and thus, that $g_{b,f,c}(i,l)$ is equal to zero, where the power control adjustment state index l is assumed to be zero.

In some examples, base station 205 may be able to infer power headroom for control resources based on a power headroom report received for data resources (e.g., a data PHR), and vice versa. In some examples, base station 205 may be able to infer power headroom for control resources based on a power headroom report generated by UE 215 for actual data resources (e.g., uplink data resources 225) or virtual data resources, and vice versa. When inferring power headroom based on an actual power headroom report, base station 205 may assume that UE 215 has selected a maximum transmission power that is equivalent to an upper bound of a range of maximum transmission powers that may be selected by UE 215.

In some examples, base station 205 may be able to infer power headroom for control resources based on a power headroom report generated by UE 215 for virtual data resources. When inferring power headroom based on a virtual power headroom report, base station 205 may determine the maximum transmission power of UE 215 based on determining that UE 215 selected the maximum transmission power used to generate the virtual power headroom report without applying any maximum power reductions. In some examples, base station 205 may not be able to infer power headroom for control resources based on a power headroom report generated by UE 215 for either actual data resources or virtual data resources. In some examples, UE 215 may determine that base station 205 is unable to infer power headroom for one type of communication resources based on a power headroom report for another type of communication resources if no indication regarding a capability of base station 205 to do so is received at UE 215—regardless of whether base station 205 is capable of inferring power headroom information.

UE 215 may prepare combined PHR 220 to report power headroom for uplink data transmissions, uplink control transmission, or both. In some examples, UE 215 may prepare combined PHR 220 based on uplink data resources 225 scheduled on first component carrier 230-1 and uplink control resources 235 scheduled on Nth component carrier 230-N. UE 215 may also prepare combined PHR 220 based on whether first component carrier 230-1 or Nth component carrier 230-N are the primary cell. UE 215 may further prepare combined PHR 220 based on a capability of base station 205 to infer power headroom for a control channel from a power headroom report transmitted for a data channel, and vice versa. UE 215 may transmit combined PHR 220 to base station 205 over uplink data resources 225.

Figure 2B:
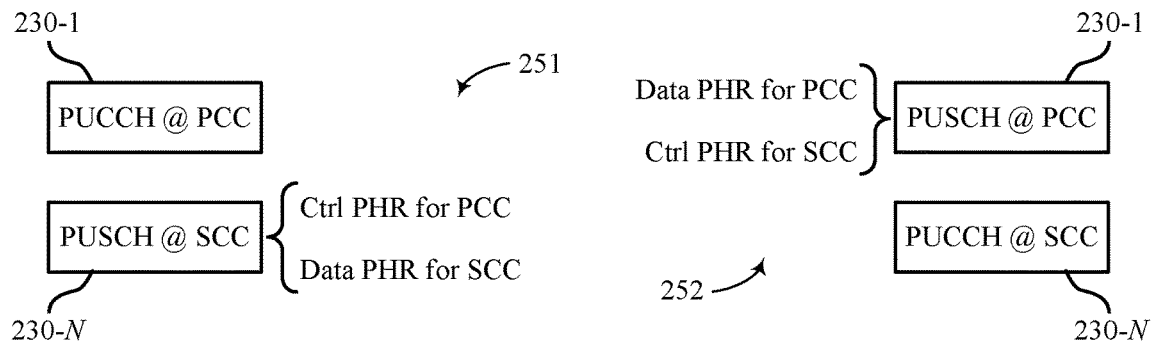
FIGS. 2B through 2D illustrate example configurations for power headroom reporting that support control resource power headroom reporting.

In a first example (which may correspond to the second configuration 252 for power headroom reporting shown in FIG. 2B), base station 205 may infer power headroom for uplink control transmissions based on an actual or virtual power headroom report received for uplink data transmissions. Also, first component carrier 230-1 may be a primary cell and Nth component carrier 230-N may be a secondary cell. And a mode that enables scheduling control resources on primary or secondary cells (which may be referred to as a carrier switch mode) may be enabled. In some examples, control resources are scheduled only on secondary cells after the carrier switch mode is enabled. In other examples, the control resources may be scheduled on either primary cells or secondary cells after the carrier switch mode is enabled e.g., based on delay and power headroom parameters. As depicted in FIG. 2A, base station 205 may schedule uplink data resources 225 for UE 215 over first component carrier 230-1 and uplink control resources 235 for UE 215 over Nth component carrier 230-N. UE 215 may generate combined PHR 220 to include a data PHR for first component carrier 230-1 and a control PHR for Nth component carrier 230-N.

UE 215 may generate the data PHR for first component carrier 230-1 based on uplink data resources 225 and the control PHR for Nth component carrier 230-N based on uplink control resources 235.

UE 215 may transmit combined PHR 220 to base station 205 using uplink data resources 225. Base station 205 may use the data PHR for first component carrier 230-1 to determine a power headroom for uplink control transmissions over first component carrier 230-1. Also, base station 205 may use the control PHR for Nth component carrier 230-N to determine a power headroom for uplink data transmissions over Nth component carrier 230-N.

In a second example (which may correspond to the first configuration 251 for power headroom reporting shown in FIG. 2B), base station 205 may infer power headroom for uplink control transmissions based on an actual or virtual power headroom report received for uplink data transmissions. Also, first component carrier 230-1 may be a primary cell and Nth component carrier 230-N may be a secondary cell. And a carrier switch mode that enables scheduling control resources on primary or secondary cells may be disabled. In this example, base station 205 may schedule control resources for UE 215 over first component carrier 230-1 and data resources for UE 215 over Nth component carrier 230-N. UE 215 may generate combined PHR 220 to include a control PHR for first component carrier 230-1 and a data PHR for Nth component carrier 230-N.

UE 215 may generate the control PHR for first component carrier 230-1 based on the control resources scheduled on first component carrier 230-1 and the data PHR for Nth component carrier 230-N based on the data resources scheduled on Nth component carrier 230-N.

UE 215 may transmit combined PHR 220 to base station 205 using the data resources scheduled on Nth component carrier 230-N. Base station 205 may use the data PHR for Nth component carrier 230-N to determine a power headroom for uplink control transmissions over Nth component carrier 230-N. Also, base station 205 may use the control PHR for first component carrier 230-1 to determine a power headroom for uplink data transmissions over first component carrier 230-1.

Figure 2C:
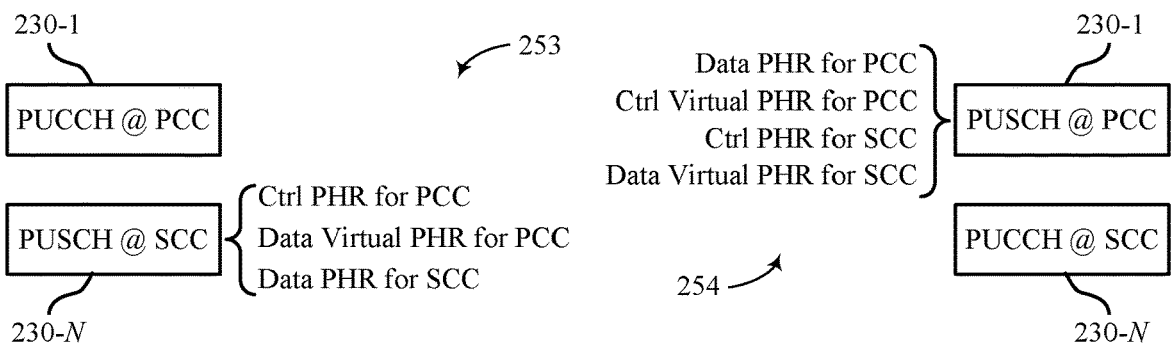
Figure 2C:
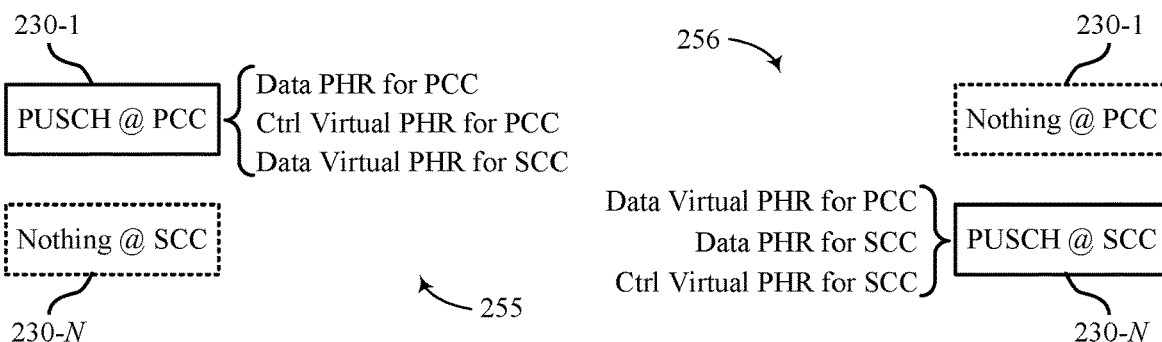
Figure 2C:
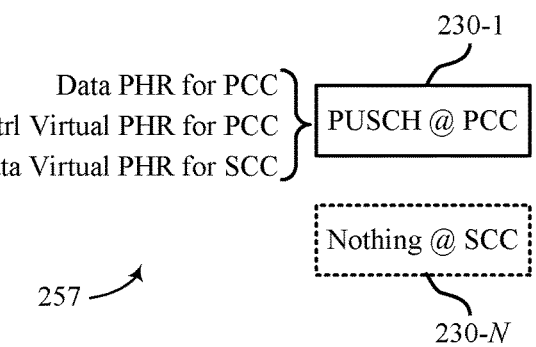

In a third example (which may correspond to the fourth configuration 254 for power headroom reporting shown in FIG. 2C), base station 205 may infer power headroom for uplink control transmissions based on a virtual power headroom report received for uplink data transmissions. Also, first component carrier 230-1 may be a primary cell and Nth component carrier 230-N may be a secondary cell. And a carrier switch mode that enables scheduling control resources on primary or secondary cells may be enabled. In this example, base station 205 may schedule uplink data resources 225 for UE 215 over first component carrier 230-1 and uplink control resources 235 for UE 215 over Nth component carrier 230-N, as depicted in FIG. 2A. UE 215 may generate combined PHR 220 to include a data PHR and control virtual PHR for first component carrier 230-1, and a control PHR and data virtual PHR for Nth component carrier 230-N.

UE 215 may generate the data PHR for first component carrier 230-1 based on uplink data resources 225; the control virtual PHR based on virtual control resources on first component carrier 230-1; the control PHR for Nth component carrier 230-N based on uplink control resources 235; and the data virtual PHR based on virtual data resources on Nth component carrier 230-N.

UE 215 may transmit combined PHR 220 to base station 205 using uplink data resources 225. Thus, UE 215 may include each type of PHR in combined PHR 220, and base station 205 may refrain from inferring one type of PHR from another. UE 215 may similarly generate combined PHR 220 when base station 205 is unable to infer power headroom for uplink control transmissions.

In a fourth example (which may correspond to the third configuration 253 for power headroom reporting shown in FIG. 2C), base station 205 may infer power headroom for uplink control transmissions based on a virtual power headroom report received for uplink data transmissions. Also, first component carrier 230-1 may be a primary cell and Nth component carrier 230-N may be a secondary cell. And a carrier switch mode that enables scheduling control resources on primary or secondary cells may be disabled. In this example, base station 205 may schedule control resources for UE 215 over first component carrier 230-1 and data resources for UE 215 over Nth component carrier 230-N. UE 215 may generate combined PHR 220 to include a control PHR and data virtual PHR for first component carrier 230-1 and a data PHR for Nth component carrier 230-N.

UE 215 may generate the control PHR for first component carrier 230-1 based on the control resources scheduled on first component carrier 230-1; the data virtual PHR for first component carrier 230-1 based on virtual data resources on first component carrier 230-1; and the data PHR for Nth component carrier 230-N based on the data resources scheduled on Nth component carrier 230-N.

UE 215 may transmit combined PHR 220 to base station 205 using the data resources scheduled on Nth component carrier 230-N. Though UE 215 may not include each type of PHR in combined PHR 220, base station 205 may refrain from inferring a control PHR for Nth component carrier 230-N since the carrier switch mode is disabled. In some examples, UE 215 may solely include a data PHR for first component carrier 230-1 in combined PHR 220. UE 215 may similarly generate combined PHR 220 when base station 205 is unable to infer power headroom for uplink control transmissions.

In a fifth example (which may correspond to the fifth configuration 255 for power headroom reporting shown in FIG. 2C), base station 205 may infer power headroom for uplink control transmissions based on a virtual power headroom report received for uplink data transmissions. Also, first component carrier 230-1 may be a primary cell and Nth component carrier 230-N may be a secondary cell. And a carrier switch mode may be disabled. In this example, base station 205 may schedule uplink data resources 225 for UE 215 over first component carrier 230-1 and no communication resources may be scheduled over Nth component carrier 230-N. UE 215 may generate combined PHR 220 to include a data PHR and a control virtual PHR for first component carrier 230-1 and a data virtual PHR for Nth component carrier 230-N.

UE 215 may generate the data PHR for first component carrier 230-1 based on uplink data resources 225; the control virtual PHR for first component carrier 230-1 based on virtual control resources on first component carrier 230-1; and the data virtual PHR for Nth component carrier 230-N based on virtual data resources on Nth component carrier 230-N.

UE 215 may transmit combined PHR 220 to base station 205 using uplink data resources 225. Though UE 215 may not include each type of PHR in combined PHR 220, base station 205 may refrain from inferring a control PHR for Nth component carrier 230-N since the carrier switch mode is disabled. UE 215 may similarly generate combined PHR 220 when base station 205 is unable to infer power headroom for uplink control transmissions.

In a sixth example (which may correspond to the sixth configuration 256 for power headroom reporting shown in FIG. 2C), base station 205 may infer power headroom for uplink control transmissions based on a virtual power headroom report received for uplink data transmissions. Also, first component carrier 230-1 may be a primary cell and Nth component carrier 230-N may be a secondary cell. And a carrier switch mode may be enabled. In this example, base station 205 may schedule no communication resources for UE 215 over first component carrier 230-1 and data resources may be scheduled for UE 215 over Nth component carrier 230-N. UE 215 may generate combined PHR 220 to include a data virtual PHR for first component carrier 230-1 and a data PHR and control virtual PHR for Nth component carrier 230-N.

UE 215 may generate the data virtual PHR for first component carrier 230-1 based on virtual data resources on first component carrier 230-1; the data PHR for Nth component carrier 230-N based on the data resources scheduled on Nth component carrier 230-N; and the control virtual PHR based on virtual control resources on Nth component carrier 230-N.

UE 215 may transmit combined PHR 220 to base station 205 using uplink data resources 225. Base station 205 may use the data virtual PHR for first component carrier 230-1 to determine a power headroom for uplink control transmissions over first component carrier 230-1.

In a seventh example (which may correspond to the seventh configuration 257 for power headroom reporting shown in FIG. 2C), base station 205 may infer power headroom for uplink control transmissions based on a virtual power headroom report received for uplink data transmissions. Also, first component carrier 230-1 may be a primary cell and Nth component carrier 230-N may be a secondary cell. And a carrier switch mode may be enabled. In this example, base station 205 may schedule uplink data resources 225 for UE 215 over first component carrier 230-1 and no communication resources may be scheduled for UE 215 over Nth component carrier 230-N. UE 215 may generate combined PHR 220 to include a data PHR and a control virtual PHR for first component carrier 230-1 and a data virtual PHR for Nth component carrier 230-N.

UE 215 may generate the data PHR for first component carrier 230-1 based on uplink data resources 225; the control virtual PHR for first component carrier 230-1 based on virtual control resources on first component carrier 230-1;

and the data virtual PHR for Nth component carrier 230-N based on virtual data resources on Nth component carrier 230-N.

UE 215 may transmit combined PHR 220 to base station 205 using uplink data resources 225. Base station 205 may use the data virtual PHR for Nth component carrier 230-N to determine a power headroom for uplink control transmissions over Nth component carrier 230-N.

Figure 2D:
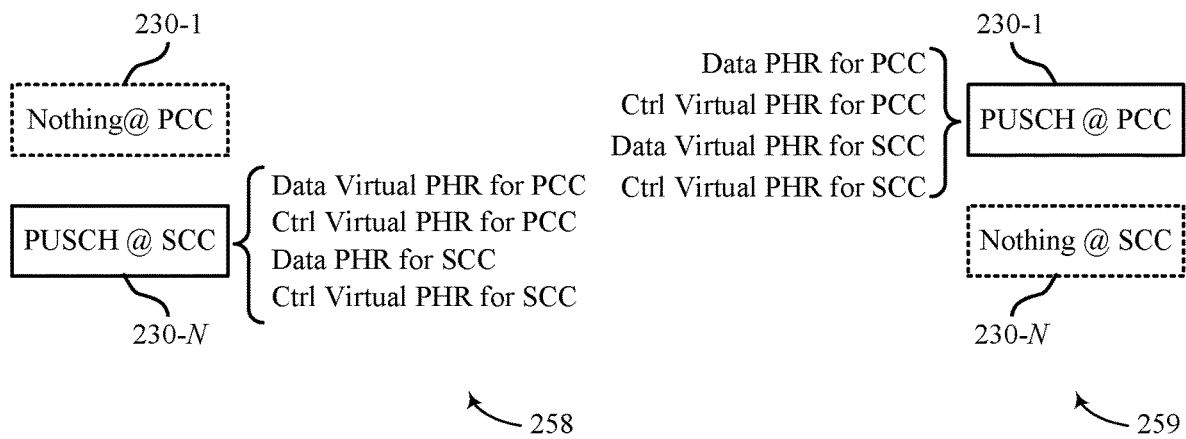

In an eighth example (which may correspond to the eighth configuration 258 for power headroom reporting shown in FIG. 2D), base station 205 may not infer power headroom for uplink control transmissions. Also, first component carrier 230-1 may be a primary cell and Nth component carrier 230-N may be a secondary cell. And a carrier switch mode may be enabled. In this example, base station 205 may schedule no communication resources for UE 215 over first component carrier 230-1 and data resources may be scheduled for UE 215 over Nth component carrier 230-N. UE 215 may generate combined PHR 220 to include a data virtual PHR and a control virtual PHR for first component carrier 230-1 and a data PHR and control virtual PHR for Nth component carrier 230-N. Thus, UE 215 may include each type of PHR in combined PHR 220 for base station 205.

UE 215 may generate the data virtual PHR for first component carrier 230-1 based on virtual data resources over first component carrier 230-1; the control virtual PHR for first component carrier 230-1 based on virtual control resources on first component carrier 230-1; the data PHR for Nth component carrier 230-N based on the data resources scheduled on Nth component carrier 230-N; and the control virtual PHR based on virtual control resources on Nth component carrier 230-N. UE 215 may transmit combined PHR 220 to base station 205 using uplink data resources 225.

In a ninth example (which may correspond to the ninth configuration 259 for power headroom reporting shown in FIG. 2D), base station 205 may not infer power headroom for uplink control transmissions. Also, first component carrier 230-1 may be a primary cell and Nth component carrier 230-N may be a secondary cell. And a carrier switch mode may be enabled. In this example, base station 205 may schedule uplink data resources 225 for UE 215 over first component carrier 230-1 and no communication resources may be scheduled for UE 215 over Nth component carrier 230-N. UE 215 may generate combined PHR 220 to include a data PHR and a control virtual PHR for first component carrier 230-1 and a data virtual PHR and a control virtual PHR for Nth component carrier 230-N. Thus, UE 215 may include each type of PHR in combined PHR 220 for base station 205.

UE 215 may generate the data PHR for first component carrier 230-1 based on uplink data resources 225; the control virtual PHR for first component carrier 230-1 based on virtual control resources on first component carrier 230-1; the data virtual PHR for Nth component carrier 230-N based on virtual data resources on Nth component carrier 230-N; and the control virtual PHR based on virtual control resources on Nth component carrier 230-N. UE 215 may transmit combined PHR 220 to base station 205 using uplink data resources 225.

In each of the above examples, UE 215 may generate combined PHR 220 so that base station 205 is either provided with power headroom information for uplink control transmission and uplink data transmissions for each component carrier 230. Or so that base station 205 is provided with power headroom information for enough uplink control transmissions and uplink data transmissions for the component carriers to determine (e.g., infer) uplink control transmission and uplink data transmissions for each component carrier 230. UE 215 may generate enough power headroom information for base station 205 to determine this power headroom information even when the carrier switch mode is disabled e.g., so that base station 205 will have the power headroom information in the event that the carrier switch mode is enabled.

Also, in each of the above examples, a mode that enables UE 215 to simultaneously perform a control transmission over one component carrier and a data transmission over another component carrier (which may be referred to as a simultaneous PUCCH/PUSCH mode) may be enabled. In some examples, when a carrier switch mode is enabled and control resources are scheduled on first carrier 230-1, UE 215 may transmit a single data PHR to base station 205. In such cases, UE 215 may multiplex data and control transmissions over first carrier 230-1.

Figure 3:
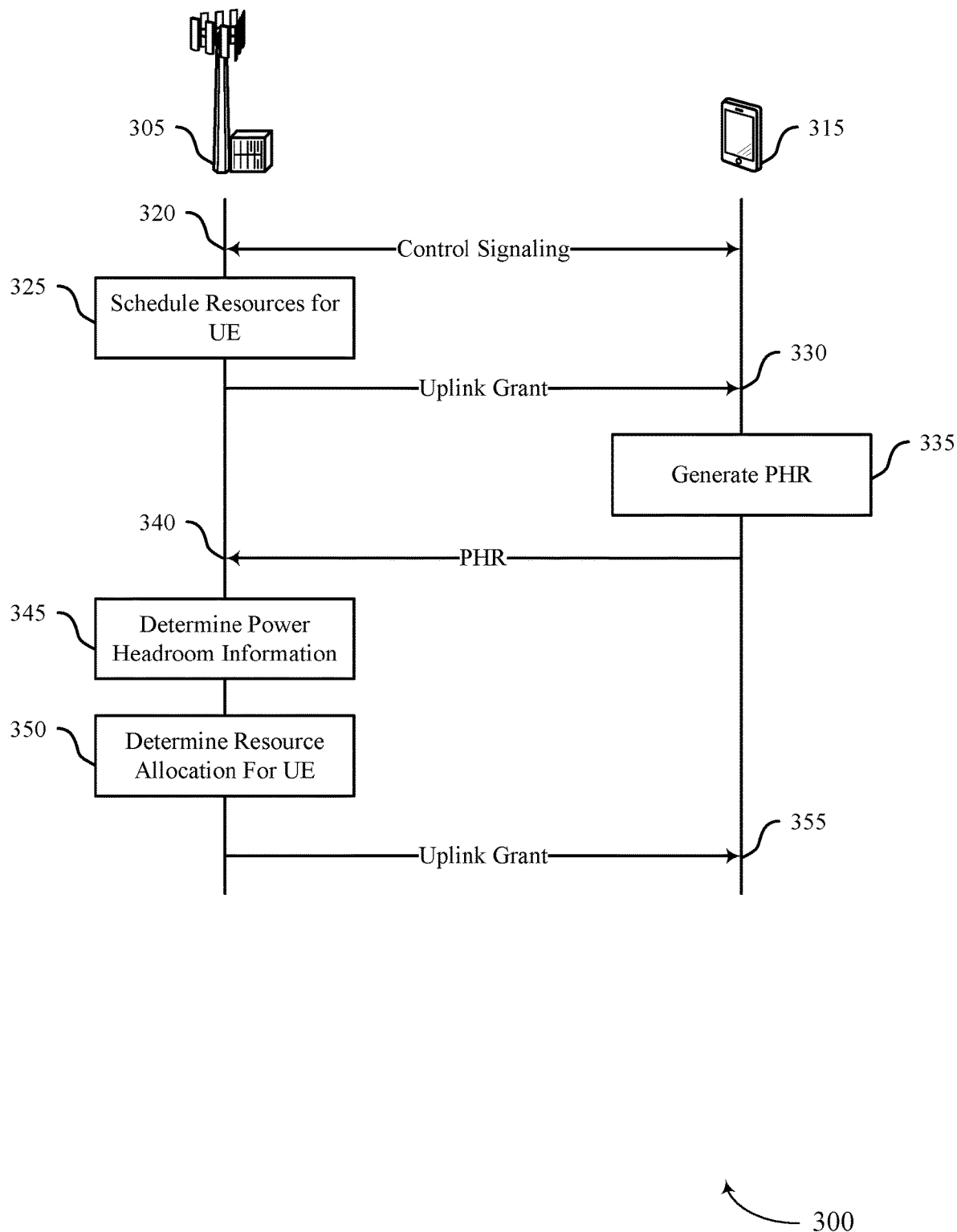
FIG. 3 illustrates an example of a set of operations that supports control resource power headroom reporting.

FIG. 3 illustrates an example of a set of operations that supports control resource power headroom reporting.

Process flow 300 may be performed by base station 305 and UE 315, which may be examples of a base station (or network device) and UE described above with reference to FIGS. 1 and 2. In some examples, process flow 300 illustrates an exemplary sequence of operations performed to support control resource power headroom reporting. For example, process flow 300 depicts operations for UE 315 to generate and transmit PHR to base station 305 and for base station 305 to schedule resources for UE 315 based on the PHR.

It should be understood that one or more of the operations described in process flow 300 may be performed earlier or later in the process, omitted, replaced, supplemented, or performed in combination with another operation. Also, additional operations described herein that are not included in process flow 300 may be included.

At arrow 320, base station 305 and UE 315 may exchange control signaling (e.g., RRC signaling). In some examples, base station 305 and UE 315 may indicate to one another a capability to support scheduling uplink control resources on secondary cells. In some examples, the base station 305 may include an indication that a mode associated with scheduling uplink control resources on secondary cells (e.g., a "carrier switch mode") is activated—e.g., base station 305 may deactivate or activate this mode using subsequent RRC, MAC layer, or PDCCH signaling. In some examples, base station 305 and UE 315 may indicate to one another a capability to support concurrent communication over uplink control resources in a first cell and over uplink data resources in a second cell. In some examples, the base station 305 may include an indication that a mode associated with concurrent control and data communication over multiple cells (e.g., a "simultaneous transmission mode") is activated—e.g., base station 305 may deactivate or activate this mode using subsequent RRC, MAC layer, or PDCCH signaling.

In some examples, base station 305 may indicate a power headroom reporting schedule to UE 315. In some examples, base station 305 may indicate to UE 315 a capability of base station to infer power headroom for communication resources (e.g., control resources or data resources) from a power headroom report received for other communication resources (e.g., data resources or control resources). In a first example, base station 305 may indicate to UE 315 a capability to infer power headroom for communication resources based on a received headroom report for scheduled communication resources, a received headroom report for virtual communication resources, or both. In a second example, base station 305 may indicate to UE 315 a capability to infer power headroom for communication resources based on a received headroom report for virtual communication resources. In a third example, base station 305 may indicate to UE 315 an inability to infer power headroom for communication resources. In a fourth example, base station 305 may not transmit a capability associated with inferring power headroom for communication resources, and UE 315 may determine that base station 305 is unable to infer power headroom for communication resources based on not receiving an indication of the capability.

At block 325, base station 305 may schedule communication resources for UE 315. In some examples, base station 305 schedules uplink data resources in a first component carrier (e.g., a primary cell or secondary cell) and uplink control resources in a second component carrier (e.g., a secondary cell or primary cell). In some examples, base station 305 schedules uplink data resources in one component carrier (e.g., a primary or secondary cell).

At arrow 330, base station 305 may transmit an uplink grant to UE 315. The uplink grant may indicate a location of communication resources scheduled by base station 305 for UE 315. In some examples, the uplink grant may also indicate whether a carrier switch mode, a simultaneous transmission mode, or both are activated or deactivated. UE 315 may identify a resource allocation based on the uplink grant and, in some examples, whether the carrier switch mode or simultaneous transmission mode are activated.

At block 335, UE 315 may generate a power headroom report based on the allocated communication resources. In some examples, the power headroom report may be further generated based on an ability of base station 305 to infer power headroom for other communication resources based on a received power headroom report for another communication resource.

In some examples, base station 305 may be capable of inferring communication resources from a power headroom report (e.g., an actual or a virtual power headroom report) for another communication resource. In a first example, if UE 315 determines that control resources are scheduled for UE 315 on a primary cell, data resources are scheduled for UE 315 on a secondary cell, and carrier switching is disabled, UE 315 may generate a power headroom report including a control PHR for the primary cell and a data PHR for the secondary cell. In a second example, if UE 315 determines that data resources are scheduled for UE 315 on a primary cell, control resources are scheduled for UE 315 on a secondary cell, and carrier switching is enabled, UE 315 may generate a power headroom report including a data PHR for the primary cell and a control PHR for the secondary cell.

In some examples, base station 305 may be capable of inferring communication resources from a virtual power headroom report for another communication resource. In a first example, if UE 315 determines that control resources are scheduled for UE 315 on a primary cell, data resources are scheduled for UE 315 on a secondary cell, and carrier switching is disabled, UE 315 may generate a power headroom report including a control PHR and a data virtual PHR for the primary cell and a data PHR for the secondary cell. In a second example, if UE 315 determines that data resources are scheduled for UE 315 on a primary cell, control resources are scheduled for UE 315 on a secondary cell, and carrier switching is enabled, UE 315 may generate a power headroom report including a data PHR and a control virtual PHR for the primary cell and a control PHR and a data virtual PHR for the secondary cell.

In a third example, if UE 315 determines that data resources are scheduled for UE 315 on a primary cell, no communication resources are scheduled for UE 315 on a secondary cell, and carrier switching is disabled, UE 315 may generate a power headroom report including a data PHR and a control virtual PHR for the primary cell and a data virtual PHR for the secondary cell. In a fourth example, if UE 315 determines that no communications resources are scheduled for UE 315 on a primary cell, data resources are scheduled for UE 315 on a secondary cell, and carrier switching is enabled, UE 315 may generate a power headroom report including a data virtual PHR for the primary cell and a data PHR and a control virtual PHR for the secondary cell. In a fifth example, if UE 315 determines that data resources are scheduled for UE 315 on a primary cell, no communication resources are scheduled for UE 315 on a secondary cell, and carrier switching is enabled, UE 315 may generate a power headroom report including a data PHR and a control virtual PHR for the primary cell and a data virtual PHR for the secondary cell.

In some examples, base station 305 may be incapable of inferring communication resources from a power headroom report for another communication resource. In a first example, if UE 315 determines that control resources are scheduled for UE 315 on a primary cell, data resources are scheduled for UE 315 on a secondary cell, and carrier switching is disabled, UE 315 may generate a power headroom report including a control PHR and a data virtual PHR for the primary cell and a data PHR for the secondary cell. In a second example, if UE 315 determines that data resources are scheduled for UE 315 on a primary cell, control resources are scheduled for UE 315 on a secondary cell, and carrier switching is enabled, UE 315 may generate a power headroom report including a data PHR and a control virtual PHR for the primary cell and a control PHR and a data virtual PHR for the secondary cell.

In a third example, if UE 315 determines that data resources are scheduled for UE 315 on a primary cell, no communication resources are scheduled for UE 315 on a secondary cell, and carrier switching is disabled, UE 315 may generate a power headroom report including a data PHR and a control virtual PHR for the primary cell and a data virtual PHR for the secondary cell. In a fourth example, if UE 315 determines that no communications resources are scheduled for UE 315 on a primary cell, data resources are scheduled for UE 315 on a secondary cell, and carrier switching is enabled, UE 315 may generate a power headroom report including a data virtual PHR and a control virtual PHR for the primary cell and a data PHR and a control virtual PHR for the secondary cell. In a fifth example, if UE 315 determines that data resources are scheduled for UE 315 on a primary cell, no communication resources are scheduled for UE 315 on a secondary cell, and carrier switching is enabled, UE 315 may generate a power headroom report including a data PHR and a control virtual PHR for the primary cell and a data virtual PHR and a control virtual PHR for the secondary cell.

In some examples, when carrier switching is enabled and PUSCH and PUCCH resources are scheduled on the primary cell, UE 315 may generate a power headroom report including one of a data PHR (e.g., a Type 1 report) or a combined data and control PHR (e.g., a Type 2 report) for the primary cell. UE 315 may generate a power headroom report including a data PHR if base station 305 is able to infer the control PHR from the data PHR. Also, UE 315 may generate the power headroom report based on the combined data and control PHR if UE 315 multiplexes the uplink data with the uplink control data in an uplink transmission using the scheduled PUSCH resources. When carrier switching is enabled, PUSCH resources are scheduled on the primary cell, and PUCCH resources are scheduled on the secondary cell, UE 315 may generate a power headroom report including at least a data PHR for the primary cell and a control PHR for the secondary cell. Base station 305 may use the control PHR to determine whether to schedule subsequent PUCCH resources for UE 315 on the secondary cell.

In each example, UE 315 may generate a power headroom report that includes power headroom information for enough of the communication resources that may be scheduled for UE 315 over each component carrier such that base station 305 may determine power headroom information for each type of communication resource that may be scheduled for UE 315 over each component carrier. Although described in the context of two component carriers, UE 315 may similarly generate a power headroom report that reports power headroom for more than two component carriers. An example combined power headroom report that includes (1) a bitmap to indicate which component carriers power headroom is being reported for (using $C_1$ to $C_7$); (2) an indication of whether a power backoff is being applied (using the P fields); (3) an indication of whether the corresponding power headroom report is actual or virtual (using the V fields); (4) reserved fields denoted by the R fields; and (5) power headroom reports is shown in Table 1.

TABLE 1

| $C_7$ | $C_6$ | $C_5$ | $C_4$ | $C_3$ | $C_2$ | $C_1$ | R |
|---|---|---|---|---|---|---|---|
| P | V | | | PH (Type 1, PCell) | | | |
| R | R | | | $P_{CMAX,f,c}$ 1 | | | |
| P | V | | | PH (Type 4, PCell) | | | |
| R | R | | | $P_{CMAX,f,c}$ 2 | | | |
| P | V | | | PH (Type 4, SCell) | | | |
| R | R | | | $P_{CMAX,f,c}$ 3 | | | |
| P | V | | | PH (Type 2, SpCell of other MAC entity) | | | |
| R | R | | | $P_{CMAX,f,c}$ 4 | | | |
| ... | ... | | | ... | | | |
| P | V | | | PH (Type X, Serving Cell 1) | | | |
| R | R | | | $P_{CMAX,f,c}$ m | | | |

At arrow 340, UE 315 may transmit the generated power headroom report to base station 305. UE 315 may transmit the generated power headroom report over uplink data resources scheduled by base station 305.

At block 345, base station 305 may determine, for multiple component carriers configured for UE 315, power headroom information for different types of uplink transmissions over the component carriers. In some examples, base station 305 may determine that there is no available transmission power for uplink control transmissions by UE 315 over a first secondary cell, but that there is available transmission power for uplink control transmissions by UE 315 over a second secondary cell. In some examples, base station 305 may determine that there is a larger amount of available transmission power for uplink control transmissions by UE 315 over a first secondary cell than over a second secondary cell. In some examples, base station 305 may determine that there is a larger amount of available transmission power for uplink control transmissions by UE 315 over a primary cell than any secondary cell—e.g., base station 305 may determine that there is no available transmission power for uplink control transmissions on any of the secondary cells.

At block 350, base station 305 may determine a resource allocation for UE 315 based on the determined power headroom information. In some examples, base station 305 determines a resource allocation for uplink control resources for UE 315 based on the power headroom information. For example, base station 305 may schedule the uplink control resources over a component carrier having a largest amount of available transmission power for uplink control transmission.

Base station 305 may also determine the resource allocation based on a delay associated with scheduling uplink control resources in different component carriers. In some examples, base station 305 may be configured to schedule the uplink control channel resources in a first component carrier that does not have the largest amount of available transmission power for uplink control transmissions based on determining that a delay associated with scheduling the uplink control resources in the first component carrier is smaller than (e.g., by a threshold amount) a delay associated with scheduling the uplink control resources in the component carrier associated with the largest amount of available transmission power. For example, base station 305 may schedule the uplink control resources in a first carrier having 2 dB of available transmission power instead of a second component carrier having 4 dB of available transmission power based on determining that the uplink control resources may be scheduled in the first component carrier more than 2 ms earlier than if the uplink control resources are scheduled in the second component carrier.

At arrow 355, base station 305 may transmit a second uplink grant to UE 315 that indicates the resource allocation for UE 315.

Figure 4:
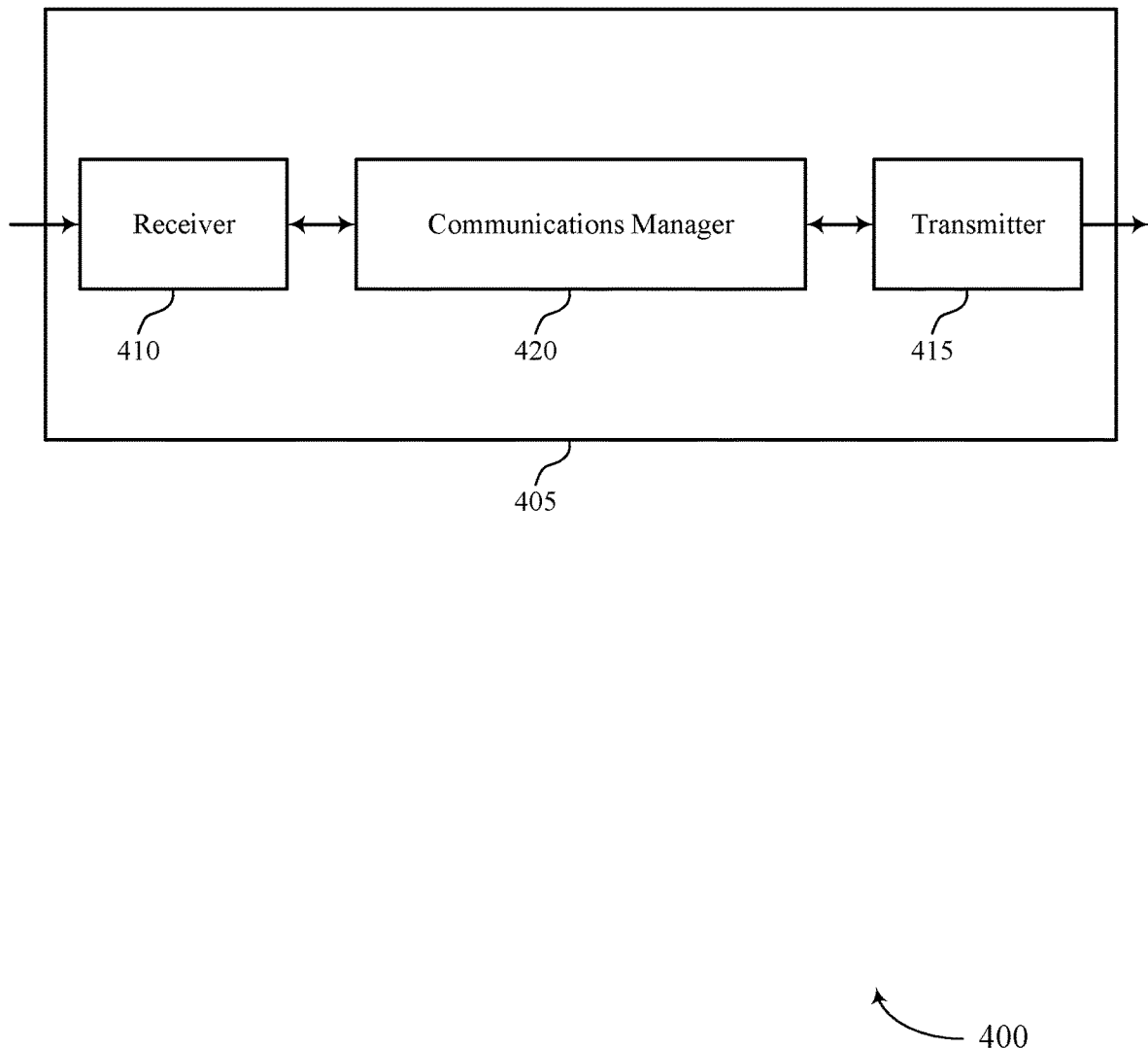
FIGS. 4 and 5 show block diagrams of devices that support control resource power headroom reporting.

FIG. 4 shows a block diagram 400 of a device 405 that supports control resource power headroom reporting. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to control resource power headroom reporting). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to control resource power headroom reporting). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of control resource power headroom reporting as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving (e.g., from receiver 410) a first message indicating a set of multiple component carriers are configured for the UE. The communications manager 420 may be configured as or otherwise support a means for receiving (e.g., from receiver 410) a second message scheduling uplink data channel resources of a first component carrier of the set of multiple component carriers. The communications manager 420 may be configured as or otherwise support a means for transmitting (e.g., via transmitter 415), over the uplink data channel resources, a combined report including a first report of available transmission power for uplink data transmissions over the first component carrier and a second report that is associated with available transmission power for uplink control channel resources over a second component carrier of the set of multiple component carriers.

In some examples disclosed herein, the communications manager 420 may be configured as or otherwise support a means for receiving (e.g., from receiver 410) a first message indicating a set of multiple component carriers are configured for the UE. The communications manager 420 may be configured as or otherwise support a means for receiving (e.g., from receiver 410) an indication that one or more secondary cells of the set of multiple component carriers are enabled for scheduling uplink control channel resources. The communications manager 420 may be configured as or otherwise support a means for receiving (e.g., from receiver 410) a second message scheduling uplink data channel resources of a first component carrier of the set of multiple component carriers. The communications manager 420 may be configured as or otherwise support a means for transmitting (e.g., via transmitter 415), over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reducing a latency associated with scheduling uplink control resources while considering the available transmission power for uplink control resources in a set of component carriers. By transmitting a single report when uplink control channels are scheduled on the first component carrier, overhead associated with transmitting a power headroom report may be reduced.

Figure 5:
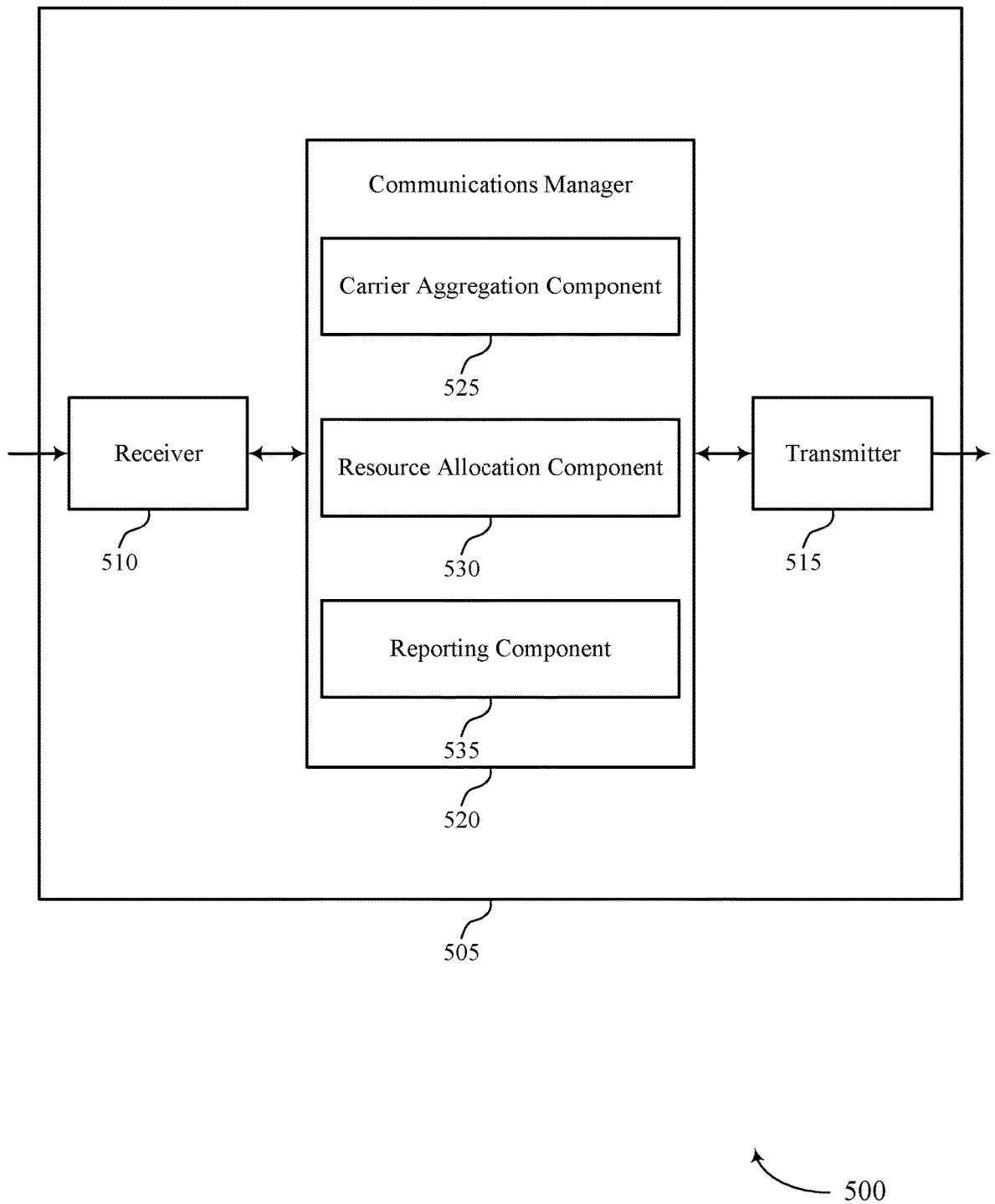

FIG. 5 shows a block diagram 500 of a device 505 that supports control resource power headroom reporting. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to control resource power headroom reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to control resource power headroom reporting). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of control resource power headroom reporting as described herein. For example, the communications manager 520 may include a carrier aggregation component 525, a resource allocation component 530, a reporting component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The carrier aggregation component 525 may be configured as or otherwise support a means for receiving (e.g., from receiver 510) a first message indicating a set of multiple component carriers are configured for the UE. The resource allocation component 530 may be configured as or otherwise support a means for receiving (e.g., from receiver 510) a second message scheduling uplink data channel resources of a first component carrier of the set of multiple component carriers. The reporting component 535 may be configured as or otherwise support a means for transmitting (e.g., via transmitter 515), over the uplink data channel resources, a combined report including a first report of available transmission power for uplink data transmissions over the first component carrier and a second report that is associated with available transmission power for uplink control channel resources over a second component carrier of the set of multiple component carriers.

In some examples disclosed herein, the carrier aggregation component 525 may be configured as or otherwise support a means for receiving (e.g., from receiver 510) a first message indicating a set of multiple component carriers are configured for the UE. The resource allocation component 530 may be configured as or otherwise support a means for receiving (e.g., from receiver 510) an indication that one or more secondary cells of the set of multiple component carriers are enabled for scheduling uplink control channel resources. The resource allocation component 530 may be configured as or otherwise support a means for receiving (e.g., from receiver 510) a second message scheduling uplink data channel resources of a first component carrier of the set of multiple component carriers. The reporting component 535 may be configured as or otherwise support a means for transmitting (e.g., via transmitter 510), over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

Figure 6:
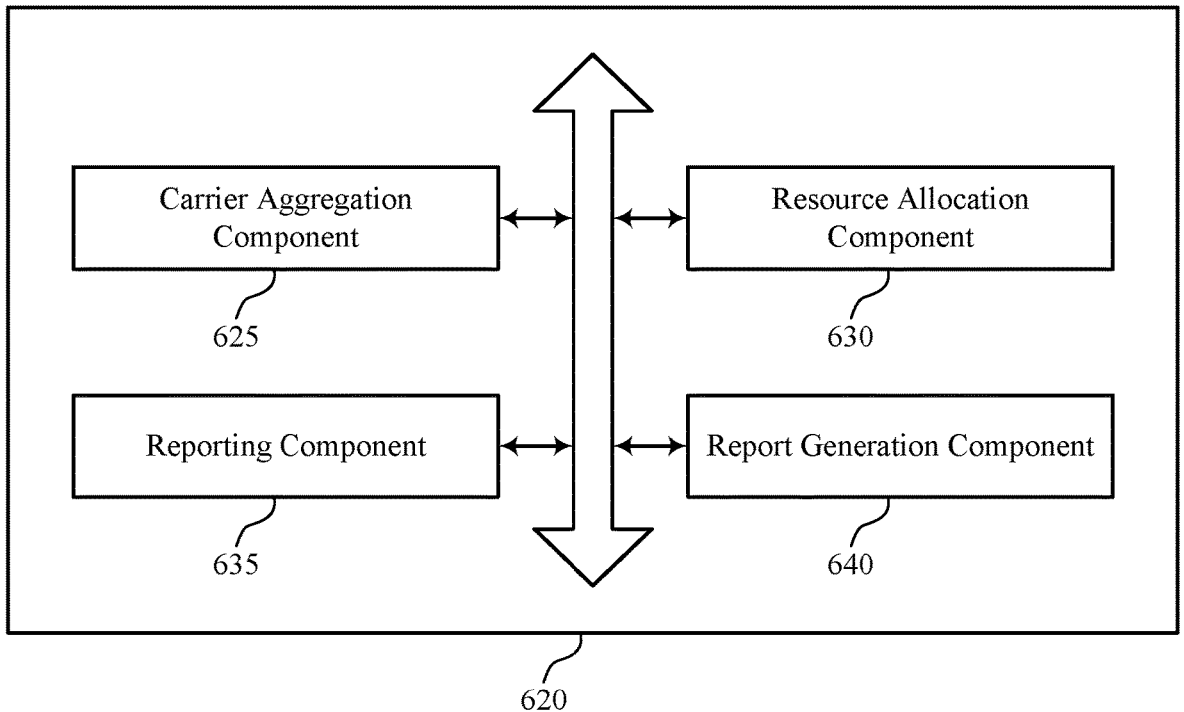
FIG. 6 shows a block diagram of a communications manager that supports control resource power headroom reporting.

FIG. 6 shows a block diagram 600 of a communications manager 620 that supports control resource power headroom reporting. The communications manager 620 may be an example of aspects of a communications manager 420, a communications manager 520, or both, as described herein. The communications manager 620, or various components thereof, may be an example of means for performing various aspects of control resource power headroom reporting as described herein. For example, the communications manager 620 may include a carrier aggregation component 625, a resource allocation component 630, a reporting component 635, a report generation component 640, or any combination thereof. Each of these components may communicate, directly or indirectly, with one another (e.g., via one or more buses).

The communications manager 620 may support wireless communication at a UE in accordance with examples as disclosed herein. The carrier aggregation component 625 may be configured as or otherwise support a means for receiving a first message indicating a set of multiple component carriers are configured for the UE. The resource allocation component 630 may be configured as or otherwise support a means for receiving a second message scheduling uplink data channel resources of a first component carrier of the set of multiple component carriers. The reporting component 635 may be configured as or otherwise support a means for transmitting, over the uplink data channel resources, a combined report including a first report of available transmission power for uplink data transmissions over the first component carrier and a second report that is associated with available transmission power for uplink control channel resources over a second component carrier of the set of multiple component carriers.

In some examples, the carrier aggregation component 625 may be configured as or otherwise support a means for determining that the first component carrier including the uplink data channel resources is a secondary cell and the second component carrier is a primary cell based on the first message, and that the uplink control channel resources are scheduled for the primary cell based on the second message.

In some examples, the report generation component 640 may be configured as or otherwise support a means for determining the first report of available transmission power for uplink data transmissions over the secondary cell based on a data transmission over the uplink data channel resources in the secondary cell. In some examples, the report generation component 640 may be configured as or otherwise support a means for determining the second report that is associated with available transmission power for uplink control transmissions over the primary cell based on a control transmission over the uplink control channel resources in the primary cell.

In some examples, an estimate of available transmission power for uplink data transmissions over the primary cell is obtainable from the second report.

In some examples, to support transmitting the combined report, the reporting component 635 may be configured as or otherwise support a means for transmitting a third report of available transmission power for uplink data transmissions over the primary cell, the third report being determined based on a virtual data transmission over virtual data channel resources in the primary cell.

In some examples, the resource allocation component 630 may be configured as or otherwise support a means for receiving a third message configuring a mode that enables uplink control channel resources to be scheduled on one or more secondary cells of the set of multiple component carriers. In some examples, the carrier aggregation component 625 may be configured as or otherwise support a means for determining, based on activation of the mode, that the first component carrier including the uplink data channel resources is a primary cell and the second component carrier is a secondary cell based on the first message and that the uplink control channel resources are scheduled for the secondary cell based on the second message.

In some examples, the report generation component 640 may be configured as or otherwise support a means for determining the first report of available transmission power for uplink data transmissions over the primary cell based on a data transmission over the uplink data channel resources in the primary cell. In some examples, the report generation component 640 may be configured as or otherwise support a means for determining the second report that is associated with available transmission power for uplink control transmissions over the secondary cell based on a control transmission over the uplink control channel resources in the secondary cell.

In some examples, a first estimate of available transmission power for uplink control transmissions over the primary cell is obtainable from the first report, and a second estimate of available transmission power for uplink data transmissions over the secondary cell is obtainable from the second report.

In some examples, to support transmitting the combined report, the reporting component 635 may be configured as or otherwise support a means for transmitting, based on the mode being activated, a third report of available transmission power for uplink control transmissions over the primary cell, the third report being determined based on a first virtual data transmission over virtual control channel resources in the primary cell, and a fourth report of available transmission power for uplink control transmissions over the secondary cell, the fourth report being determined based on a second virtual data transmission over virtual data channel resources in the secondary cell.

In some examples, the report generation component 640 may be configured as or otherwise support a means for determining the third report based at least in part on a quantity of resource blocks associated with the virtual control transmission, a format associated with the virtual uplink control channel, a duration of the virtual control transmission, a subcarrier spacing associated with the virtual uplink control channel, an open loop power control parameter associated with the uplink control channel, a path loss associated with the virtual uplink control channel, a power control adjustment state index associated with the virtual uplink control channel, or any combination thereof.

In some examples, the carrier aggregation component 625 may be configured as or otherwise support a means for determining that the first component carrier including the uplink data channel resources is a primary cell and the second component carrier is a secondary cell based on the first message, and that communication resources are not scheduled for the secondary cell based on the second message.

In some examples, to support transmitting the combined report, the reporting component 635 may be configured as or otherwise support a means for transmitting a third report of available transmission power for uplink control transmissions over the primary cell, where the first report of available transmission power for uplink data transmissions over the primary cell is determined based on a data transmission over the uplink data channel resources in the primary cell, the second report that is associated with available transmission power for uplink control transmissions over the secondary cell is determined based on a virtual data transmission over virtual uplink data channel resources in the secondary cell, and the third report is determined based on a virtual control transmission over virtual control channel resources in the primary cell.

In some examples, the resource allocation component 630 may be configured as or otherwise support a means for receiving a third message configuring a mode that enables uplink control channel resources to be scheduled on one or more secondary cells of the set of multiple component carriers. In some examples, the carrier aggregation component 625 may be configured as or otherwise support a means for determining, based on activation of the mode, that the first component carrier including the uplink data channel resources is a secondary cell and the second component carrier is a primary cell based on the first message and that communication resources are not scheduled for the primary cell based on the second message.

In some examples, to support transmitting the combined report, the reporting component 635 may be configured as or otherwise support a means for transmitting, based on the mode being activated, a third report of available transmission power for uplink data transmissions over the primary cell, where the first report of available transmission power for uplink data transmissions over the secondary cell is determined based on a data transmission over the uplink data channel resources in the secondary cell, the second report that is associated with available transmission power for uplink control transmissions over the secondary cell is determined based on a virtual control transmission over virtual uplink control channel resources in the secondary cell, and the third report is determined based on a virtual data transmission over virtual data channel resources in the primary cell.

In some examples, an estimate of available transmission power for uplink control transmissions over the primary cell is obtainable from the third report.

In some examples, to support transmitting the combined report, the reporting component 635 may be configured as or otherwise support a means for transmitting, based on the mode being activated, a fourth report of available transmission power for uplink control transmissions over the primary cell, where the fourth report is determined based on a second virtual data transmission over virtual data channel resources in the primary cell.

In some examples, the resource allocation component 630 may be configured as or otherwise support a means for receiving a third message configuring a mode that enables uplink control channel resources to be scheduled on one or more secondary cells of the set of multiple component carriers. In some examples, the carrier aggregation component 625 may be configured as or otherwise support a means for determining, based on activation of the mode, that the first component carrier including the uplink data channel resources is a primary cell and the second component carrier is a secondary cell based on the first message and communication resources are not scheduled for the secondary cell based on the second message.

In some examples, to support transmitting the combined report, the reporting component 635 may be configured as or otherwise support a means for transmitting, based on the mode being activated, a third report of available transmission power for uplink control transmissions over the primary cell, where the first report of available transmission power for uplink data transmissions over the primary cell is determined based on a data transmission over the uplink data channel resources in the primary cell, the second report that is associated with available transmission power for uplink control transmissions over the primary cell is determined based on a virtual control transmission over virtual uplink control channel resources in the primary cell, and the third report is determined based on a virtual data transmission over virtual data channel resources in the secondary cell.

In some examples, an estimate of available transmission power for uplink control transmissions over the secondary cell is obtainable from the third report.

In some examples, to support transmitting the combined report, the reporting component 635 may be configured as or otherwise support a means for transmitting, based on the mode being activated, a fourth report of available transmission power for uplink control transmissions over the secondary cell, where the fourth report is determined based on a second virtual control transmission over virtual control channel resources in the secondary cell.

In some examples disclosed herein, the carrier aggregation component 625 may be configured as or otherwise support a means for receiving a first message indicating a set of multiple component carriers are configured for the UE. The resource allocation component 630 may be configured as or otherwise support a means for receiving an indication that one or more secondary cells of the set of multiple component carriers are enabled for scheduling uplink control channel resources. In some examples, the resource allocation component 630 may be configured as or otherwise support a means for receiving a second message scheduling uplink data channel resources of a first component carrier of the set of multiple component carriers. The reporting component 635 may be configured as or otherwise support a means for transmitting, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

In some examples, the resource allocation component 630 may be configured as or otherwise support a means for receiving a third message scheduling the uplink control channel resources on the second component carrier based on the one or more secondary cells being enabled for scheduling uplink control channel resources. In some examples, the resource allocation component 630 may be configured as or otherwise support a means for determining that the first component carrier including the uplink data channel resources is a primary cell and the second component carrier is a secondary cell based on the first message and that the uplink control channel resources are scheduled for the secondary cell based on the third message.

In some examples, the report generation component 640 may be configured as or otherwise support a means for determining the first parameter indicating available transmission power for uplink data transmissions over the primary cell based on a data transmission over the uplink data channel resources in the primary cell. In some examples, the report generation component 640 may be configured as or otherwise support a means for determining the second parameter indicating available transmission power for uplink control transmissions over the secondary cell based on a control transmission over the uplink control channel resources in the secondary cell.

In some examples, the combined report further includes a third parameter indicating available transmission power for uplink control transmissions over the primary cell, the third parameter indicating being determined based on a virtual control transmission over virtual uplink control channel resources in the primary cell, and a fourth parameter indicating available transmission power for uplink data transmissions over the secondary cell, the fourth parameter indicating being determined based on a virtual data transmission over virtual uplink data channel resources in the secondary cell.

In some examples, the report generation component 640 may be configured as or otherwise support a means for determining the third parameter based on a quantity of resource blocks associated with the virtual control transmission, a format associated with a virtual uplink control channel, a duration of the virtual control transmission, a subcarrier spacing associated with the virtual uplink control channel, an open loop power control parameter associated with the virtual uplink control channel, a path loss associated with the virtual uplink control channel, a power control adjustment state index associated with the virtual uplink control channel, or any combination thereof.

In some examples, the resource allocation component 630 may be configured as or otherwise support a means for receiving a third message scheduling the uplink control channel resources on the first component carrier based on the one or more secondary cells being enabled for scheduling uplink control channel resources. In some examples, the resource allocation component 630 may be configured as or otherwise support a means for determining that the first component carrier including the uplink data channel resources is a secondary cell and the second component carrier is a primary cell based on the first message and that communication resources are not scheduled for the primary cell based on the second message and the third message.

In some examples, the combined report further includes a third parameter indicating available transmission power for uplink data transmissions over the primary cell. In some examples, the first parameter indicating available transmission power for uplink data transmissions over the secondary cell is determined based on a data transmission over the uplink data channel resources in the secondary cell, the second parameter indicating available transmission power for uplink control transmissions over the secondary cell is determined based on a virtual control transmission over virtual uplink control channel resources in the secondary cell, and the third parameter indicating is determined based on a virtual data transmission over virtual uplink data channel resources in the primary cell.

In some examples, the combined report further includes a fourth parameter indicating available transmission power for uplink control transmissions over the primary cell. In some examples, the fourth parameter indicating is determined based on a virtual control transmission over virtual uplink control channel resources in the primary cell.

In some examples, the resource allocation component 630 may be configured as or otherwise support a means for receiving a third message scheduling the uplink control channel resources on the first component carrier based on the one or more secondary cells being enabled for scheduling uplink control channel resources. In some examples, the resource allocation component 630 may be configured as or otherwise support a means for determining, based on the carrier switching being configured, that the first component carrier including the uplink data channel resources is a primary cell and the second component carrier is a secondary cell based on the first message and communication resources are not scheduled for the secondary cell based on the second message and the third message.

In some examples, the combined report further includes a third parameter indicating available transmission power for uplink control transmissions over the primary cell. In some examples, the first parameter indicating available transmission power for uplink data transmissions over the primary cell is determined based on a data transmission over the uplink data channel resources in the primary cell, the second parameter indicating available transmission power for the uplink control transmissions over the primary cell is determined based on a virtual control transmission over virtual uplink control channel resources in the primary cell, and the third parameter indicating is determined based on a virtual data transmission over virtual uplink data channel resources in the secondary cell.

In some examples, the combined report further includes a fourth parameter indicating available transmission power for uplink control transmissions over the secondary cell. In some examples, the fourth parameter indicating is determined based on a second virtual control transmission over virtual uplink control channel resources in the secondary cell.

Figure 7:
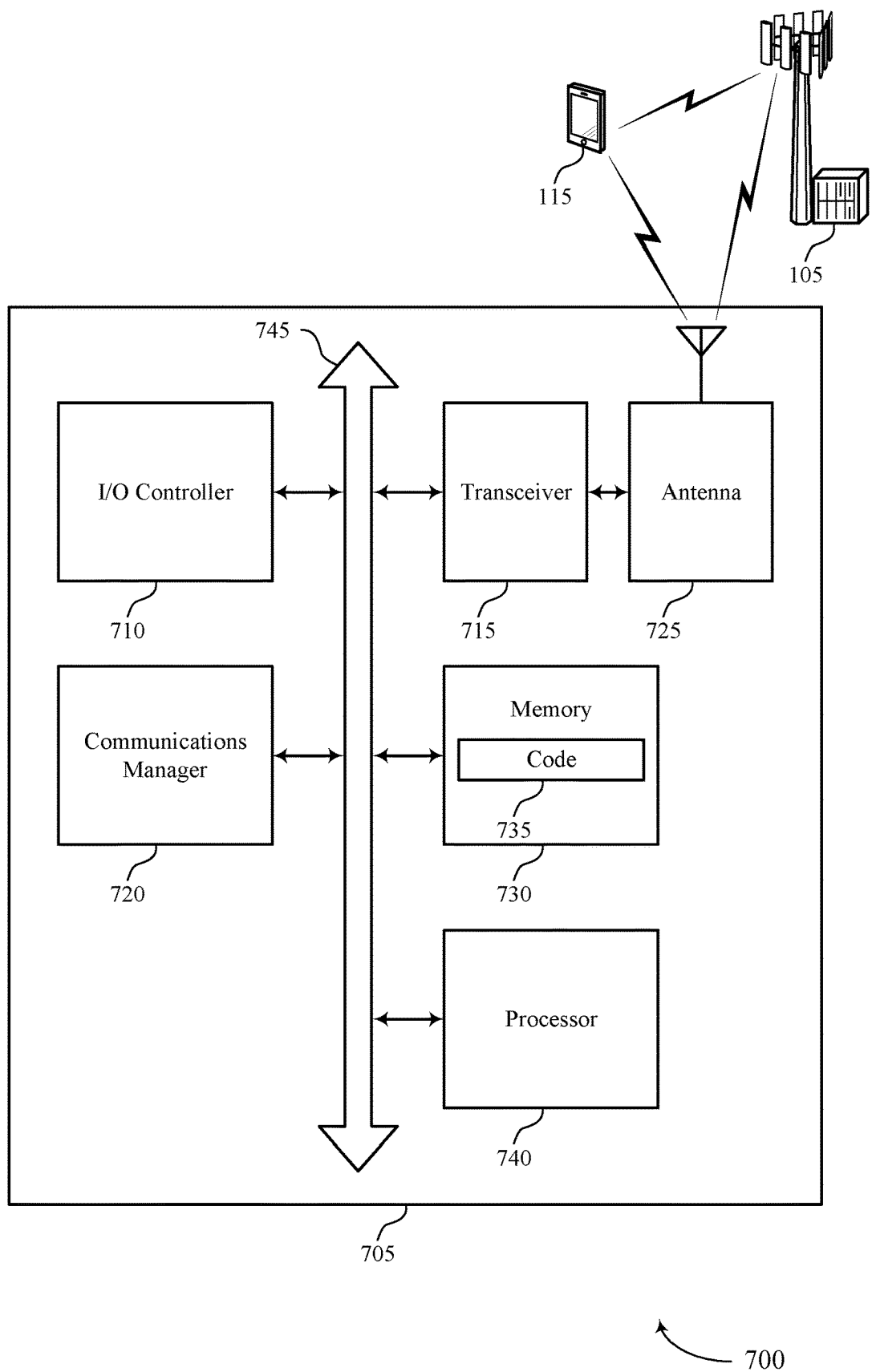
FIG. 7 shows a diagram of a system including a device that supports control resource power headroom reporting.

FIG. 7 shows a diagram of a system 700 including a device 705 that supports control resource power headroom reporting. The device 705 may be an example of or include the components of a device 405, a device 505, or a UE 115 as described herein. The device 705 may communicate wirelessly with one or more devices (e.g., base stations 105, UEs 115, or any combination thereof). The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting control resource power headroom reporting). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving (e.g., from transceiver 715) a first message indicating a set of multiple component carriers are configured for the UE. The communications manager 720 may be configured as or otherwise support a means for receiving (e.g., from transceiver 715) a second message scheduling uplink data channel resources of a first component carrier of the set of multiple component carriers. The communications manager 720 may be configured as or otherwise support a means for transmitting (e.g., via transceiver 715), over the uplink data channel resources, a combined report including a first report of available transmission power for uplink data transmissions over the first component carrier and a second report that is associated with available transmission power for uplink control channel resources over a second component carrier of the set of multiple component carriers.

In some examples disclosed herein, the communications manager 720 may be configured as or otherwise support a means for receiving (e.g., from transceiver 715) a first message indicating a set of multiple component carriers are configured for the UE. The communications manager 720 may be configured as or otherwise support a means for receiving (e.g., from transceiver 715) an indication that one or more secondary cells of the set of multiple component carriers are enabled for scheduling uplink control channel resources. The communications manager 720 may be configured as or otherwise support a means for receiving (e.g., from transceiver 715) a second message scheduling uplink data channel resources of a first component carrier of the set of multiple component carriers. The communications manager 720 may be configured as or otherwise support a means for transmitting (e.g., via transceiver 715), over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of control resource power headroom reporting as described herein, or the processor 740 and the memory 730 may be otherwise configured to perform or support such operations.

Figure 8:
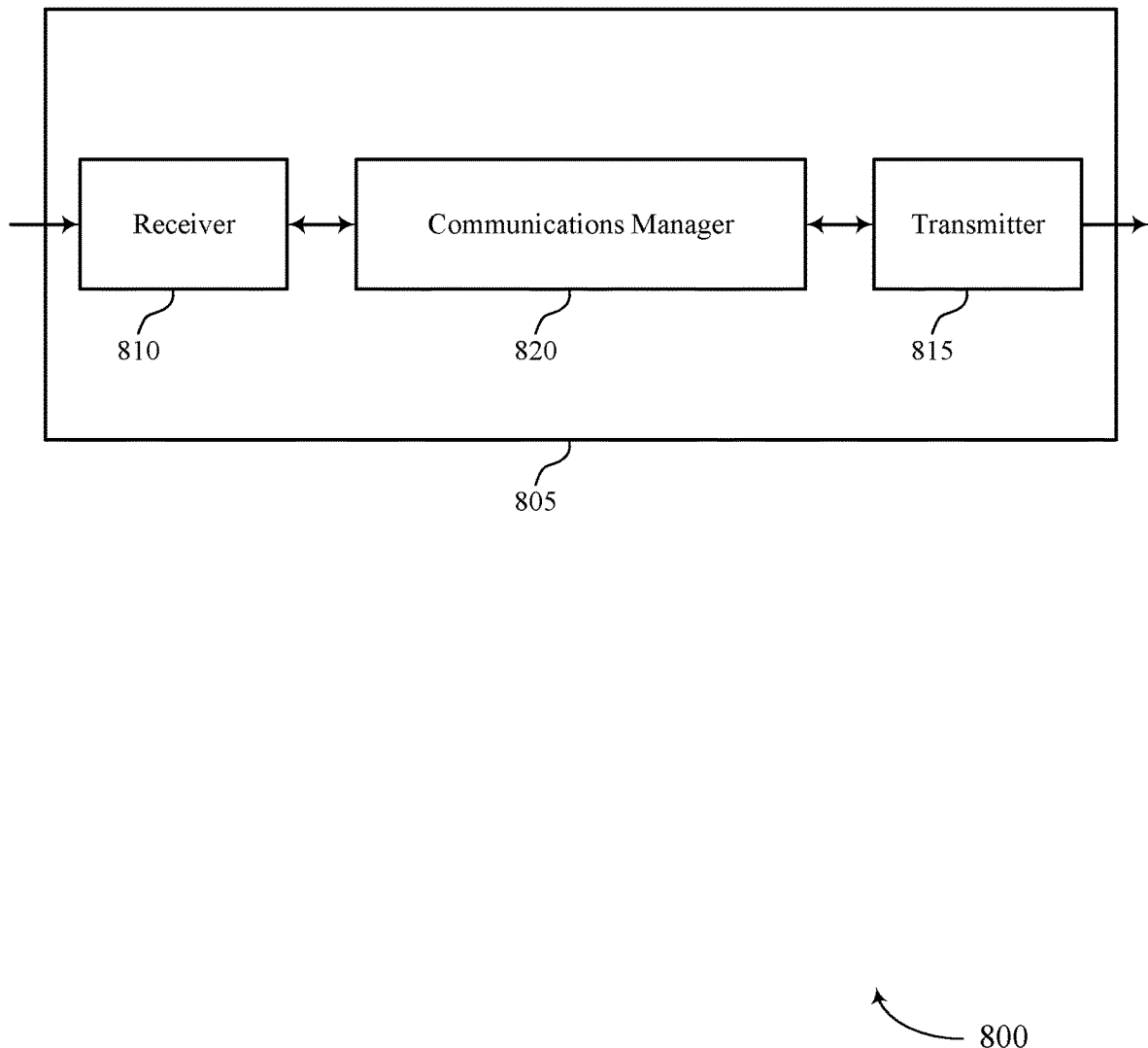
FIGS. 8 and 9 show block diagrams of devices that support control resource power headroom reporting.

FIG. 8 shows a block diagram 800 of a device 805 that supports control resource power headroom reporting. The device 805 may be an example of aspects of a device that communicates with a UE (e.g., a network device) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to control resource power headroom reporting). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to control resource power headroom reporting). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of control resource power headroom reporting as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a device (e.g., network device) in communication with a UE in accordance with examples as disclosed herein. For example, the communications manager 820 may be configured as or otherwise support a means for transmitting (e.g., via transmitter 815) a first message indicating a set of multiple component carriers are configured for a UE. The communications manager 820 may be configured as or otherwise support a means for transmitting (e.g., via transmitter 815) a second message scheduling uplink data channel resources in a first component carrier of the set of multiple component carriers. The communications manager 820 may be configured as or otherwise support a means for receiving (e.g., from receiver 810), over the uplink data channel resources, a combined report including a first report of available transmission power for uplink data transmissions over the first component carrier and a second report that is associated with available transmission power for uplink control channel resources over a second component carrier of the set of multiple component carriers.

In some examples disclosed herein, the communications manager 820 may be configured as or otherwise support a means for transmitting (e.g., via transmitter 815) a first message indicating a set of multiple component carriers are configured for a UE. The communications manager 820 may be configured as or otherwise support a means for transmitting (e.g., via transmitter 815) an indication that one or more secondary cells of the set of multiple component carriers are enabled for scheduling uplink control channel resources. The communications manager 820 may be configured as or otherwise support a means for transmitting (e.g., via transmitter 815) a second message scheduling uplink data channel resources in a first component carrier of the set of multiple component carriers. The communications manager 820 may be configured as or otherwise support a means for receiving (e.g., from receiver 810), over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reducing a latency associated with scheduling uplink control resources while considering the available transmission power for uplink control resources in a set of component carriers.

Figure 9:
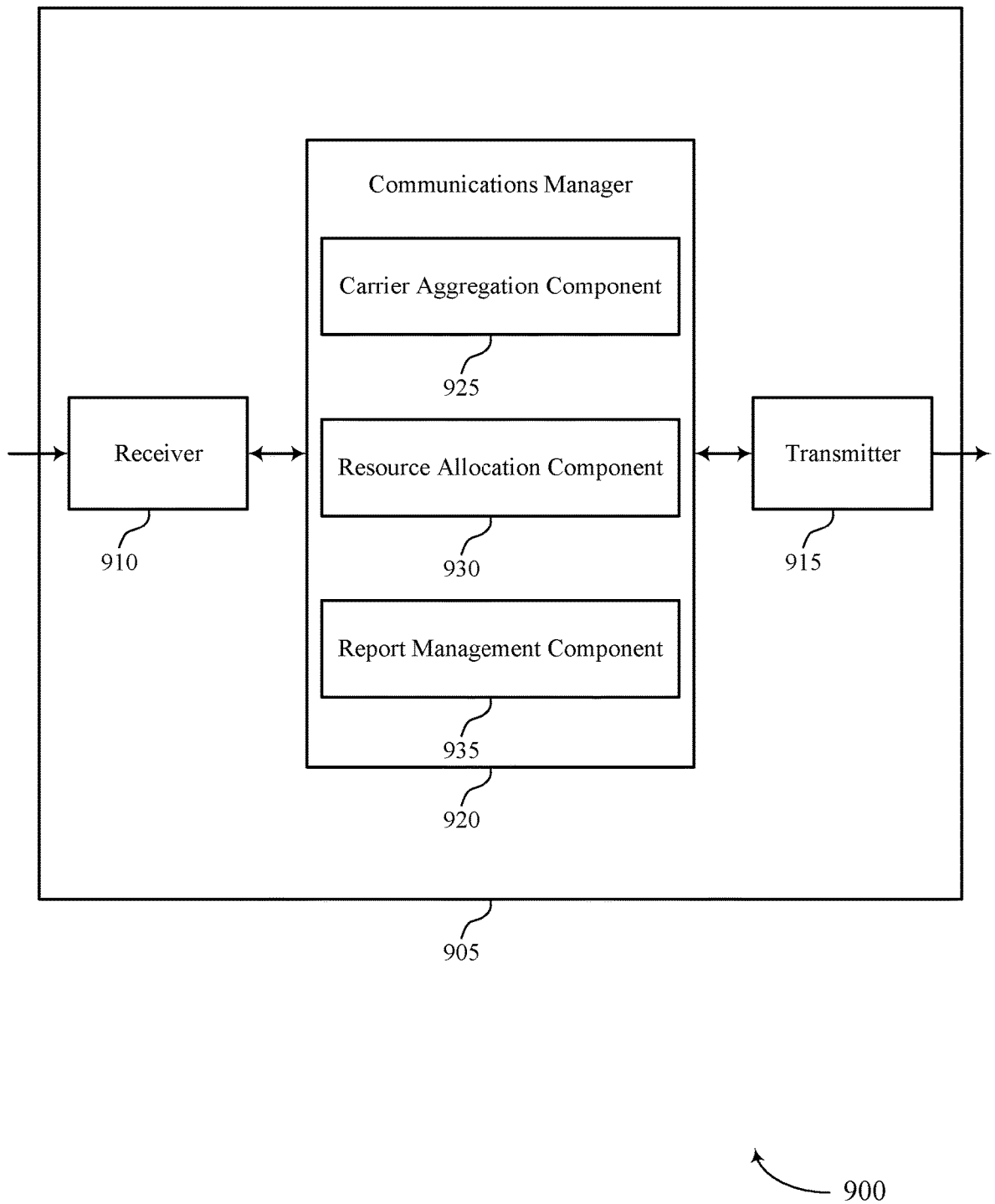

FIG. 9 shows a block diagram 900 of a device 905 that supports control resource power headroom reporting. The device 905 may be an example of aspects of a device 805 or a network device as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to control resource power headroom reporting). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to control resource power headroom reporting). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of control resource power headroom reporting as described herein. For example, the communications manager 920 may include a carrier aggregation component 925, a resource allocation component 930, a report management component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a device (e.g., network device) in communication with a UE in accordance with examples as disclosed herein. The carrier aggregation component 925 may be configured as or otherwise support a means for transmitting (e.g., via transmitter 915) a first message indicating a set of multiple component carriers are configured for a UE. The resource allocation component 930 may be configured as or otherwise support a means for transmitting (e.g., via transmitter 915) a second message scheduling uplink data channel resources in a first component carrier of the set of multiple component carriers. The report management component 935 may be configured as or otherwise support a means for receiving (e.g., from receiver 910), over the uplink data channel resources, a combined report including a first report of available transmission power for uplink data transmissions over the first component carrier and a second report that is associated with available transmission power for uplink control channel resources over a second component carrier of the set of multiple component carriers.

In some examples disclosed herein, the communications manager 920 may support wireless communication at a device (e.g., network device) in communication with a UE in accordance with examples as disclosed herein. The carrier aggregation component 925 may be configured as or otherwise support a means for transmitting (e.g., via transmitter 815) a first message indicating a set of multiple component carriers are configured for a UE. The resource allocation component 930 may be configured as or otherwise support a means for transmitting (e.g., via transmitter 815) an indication that one or more secondary cells of the set of multiple component carriers are enabled for scheduling uplink control channel resources. The resource allocation component 930 may be configured as or otherwise support a means for transmitting (e.g., via transmitter 815) a second message scheduling uplink data channel resources in a first component carrier of the set of multiple component carriers. The report management component 935 may be configured as or otherwise support a means for receiving (e.g., from receiver 815), over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

Figure 10:
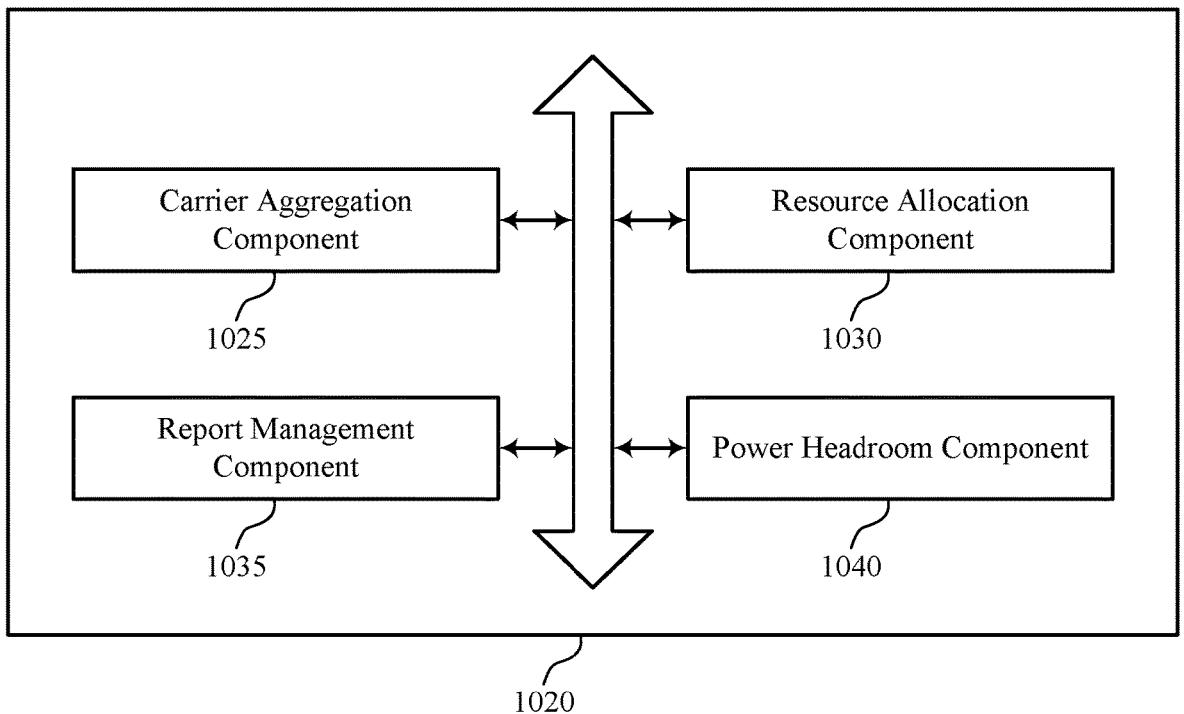
FIG. 10 shows a block diagram of a communications manager that supports control resource power headroom reporting.

FIG. 10 shows a block diagram 1000 of a communications manager 1020 that supports control resource power headroom reporting. The communications manager 1020 may be an example of aspects of a communications manager 820, a communications manager 920, or both, as described herein. The communications manager 1020, or various components thereof, may be an example of means for performing various aspects of control resource power headroom reporting as described herein. For example, the communications manager 1020 may include a carrier aggregation component 1025, a resource allocation component 1030, a report management component 1035, a power headroom component 1040, or any combination thereof. Each of these components may communicate, directly or indirectly, with one another (e.g., via one or more buses).

The communications manager 1020 may support wireless communication at a device in communication with a UE (e.g., a base station) in accordance with examples as disclosed herein. The carrier aggregation component 1025 may be configured as or otherwise support a means for transmitting a first message indicating a set of multiple component carriers are configured for a UE. The resource allocation component 1030 may be configured as or otherwise support a means for transmitting a second message scheduling uplink data channel resources in a first component carrier of the set of multiple component carriers. The report management component 1035 may be configured as or otherwise support a means for receiving, over the uplink data channel resources, a combined report including a first report of available transmission power for uplink data transmissions over the first component carrier and a second report that is associated with available transmission power for uplink control channel resources over a second component carrier of the set of multiple component carriers.

In some examples, the power headroom component 1040 may be configured as or otherwise support a means for transmitting, to the UE, a first indication of a first capability for estimating available transmission power for uplink control channel resources based on an available transmission power for uplink data channel resources. In some examples, the power headroom component 1040 may be configured as or otherwise support a means for transmitting, to the UE, a second indication of a second capability for estimating available transmission power for uplink data channel resources based on an available transmission power for uplink control channel resources; or both.

In some examples, the resource allocation component 1030 may be configured as or otherwise support a means for determining whether to schedule second uplink control channel resources in the first component carrier or the second component carrier based on the combined report. In some examples, the resource allocation component 1030 may be configured as or otherwise support a means for transmitting a third message scheduling the second uplink control channel resources in the first component carrier based on the second report indicating an amount of available transmission power for uplink control channel resources in the second component carrier that is below a first threshold, a delay associated with scheduling uplink control channel resources in the second component carrier exceeding a second threshold, or both.

In some examples, the carrier aggregation component 1025 may be configured as or otherwise support a means for configuring the first component carrier as a secondary cell and the second component carrier as a primary cell, where the first message is based on the configuring. In some examples, the resource allocation component 1030 may be configured as or otherwise support a means for allocating the uplink control channel resources for the UE on the primary cell, where the second message is based on the allocating.

In some examples, the first report of available transmission power for uplink data transmissions over the secondary cell is based on a data transmission over the uplink data channel resources in the secondary cell, and the second report that is associated with available transmission power for uplink control transmissions over the primary cell is based on a control transmission over the uplink control channel resources in the primary cell.

In some examples, the power headroom component 1040 may be configured as or otherwise support a means for estimating, based on the second report, available transmission power for uplink data transmissions over the primary cell.

In some examples, to support receiving the combined report, the report management component 1035 may be configured as or otherwise support a means for receiving a third report of available transmission power for uplink data transmissions over the primary cell, the third report being based on a virtual data transmission over virtual data channel resources in the primary cell.

In some examples, the carrier aggregation component 1025 may be configured as or otherwise support a means for configuring the first component carrier including the uplink data channel resources as a primary cell and the second component carrier as a secondary cell, where the first message is based on the configuring. In some examples, the resource allocation component 1030 may be configured as or otherwise support a means for allocating the uplink control channel resources for the UE on the secondary cell, where the second message is based on the allocating. In some examples, the resource allocation component 1030 may be configured as or otherwise support a means for transmitting a third message configuring a mode that enables uplink control channel resources to be scheduled on one or more secondary cells of the set of multiple component carriers.

In some examples, the first report of available transmission power for uplink data transmissions over the primary cell is based on a data transmission over the uplink data channel resources in the primary cell, and the second report that is associated with available transmission power for uplink control transmissions over the secondary cell is based on a control transmission over the uplink control channel resources in the secondary cell.

In some examples, the power headroom component 1040 may be configured as or otherwise support a means for estimating, based on the first report, available transmission power for uplink control transmissions over the primary cell. In some examples, the power headroom component 1040 may be configured as or otherwise support a means for estimating, based on the second report, available transmission power for uplink data transmissions over the secondary cell.

In some examples, to support receiving the combined report, the report management component 1035 may be configured as or otherwise support a means for receiving, based on the mode being activated, a third report of available transmission power for uplink control transmissions over the primary cell, the third report being based on a first virtual data transmission over virtual control channel resources in the primary cell, and a fourth report of available transmission power for uplink control transmissions over the secondary cell, the fourth report being based on a second virtual data transmission over virtual data channel resources in the secondary cell.

In some examples, the carrier aggregation component 1025 may be configured as or otherwise support a means for configuring the first component carrier including the uplink data channel resources as a primary cell and the second component carrier as a secondary cell, where the first message is based on the configuring. In some examples, the resource allocation component 1030 may be configured as or otherwise support a means for allocating no communication resources for the UE on the secondary cell, where the second message is based on the allocating.

In some examples, to support receiving the combined report, the report management component 1035 may be configured as or otherwise support a means for receiving a third report of available transmission power for uplink control transmissions over the primary cell, where the first report of available transmission power for uplink data transmissions over the primary cell is based on a data transmission over the uplink data channel resources in the primary cell, the second report that is associated with available transmission power for uplink control transmissions over the secondary cell is based on a virtual data transmission over virtual uplink data channel resources in the secondary cell, and the third report is based on a virtual control transmission over virtual control channel resources in the primary cell.

In some examples, the carrier aggregation component 1025 may be configured as or otherwise support a means for configuring the first component carrier including the uplink data channel resources as a secondary cell and the second component carrier as a primary cell, where the first message is based on the configuring. In some examples, the resource allocation component 1030 may be configured as or otherwise support a means for allocating no communication resources for the UE on the primary cell, where the second message is based on the allocating. In some examples, the resource allocation component 1030 may be configured as or otherwise support a means for transmitting a third message configuring a mode that enables uplink control channel resources to be scheduled on one or more secondary cells of the set of multiple component carriers.

In some examples, to support receiving the combined report, the report management component 1035 may be configured as or otherwise support a means for receiving, based on the mode being activated, a third report of available transmission power for uplink data transmissions over the primary cell, where the first report of available transmission power for uplink data transmissions over the secondary cell is based on a data transmission over the uplink data channel resources in the secondary cell, the second report that is associated with available transmission power for uplink control transmissions over the secondary cell is based on a virtual control transmission over virtual uplink control channel resources in the secondary cell, and the third report is based on a virtual data transmission over virtual data channel resources in the primary cell.

In some examples, the power headroom component 1040 may be configured as or otherwise support a means for estimating, based on the third report, available transmission power for uplink control transmissions over the primary cell.

In some examples, to support receiving the combined report, the report management component 1035 may be configured as or otherwise support a means for receiving, based on the mode being activated, a fourth report of available transmission power for uplink control transmissions over the primary cell, where the fourth report is based on a second virtual data transmission over virtual data channel resources in the primary cell.

In some examples, the carrier aggregation component 1025 may be configured as or otherwise support a means for configuring the first component carrier including the uplink data channel resources as a primary cell and the second component carrier as a secondary cell, where the first message is based on the configuring. In some examples, the resource allocation component 1030 may be configured as or otherwise support a means for allocating no communication resources for the UE on the secondary cell, where the second message is based on the allocating. In some examples, the resource allocation component 1030 may be configured as or otherwise support a means for transmitting a third message configuring a mode that enables uplink control channel resources to be scheduled on one or more secondary cells of the set of multiple component carriers.

In some examples, to support receiving the combined report, the report management component 1035 may be configured as or otherwise support a means for receiving, based on the mode being activated, a third report of available transmission power for uplink control transmissions over the primary cell, where the first report of available transmission power for uplink data transmissions over the primary cell is based on a data transmission over the uplink data channel resources in the primary cell, the second report that is associated with available transmission power for uplink control transmissions over the primary cell is based on a virtual control transmission over virtual uplink control channel resources in the primary cell, and the third report is based on a virtual data transmission over virtual data channel resources in the secondary cell.

In some examples, the power headroom component 1040 may be configured as or otherwise support a means for estimating, based on the third report, available transmission power for uplink control transmissions over the secondary cell.

In some examples, to support receiving the combined report, the report management component 1035 may be configured as or otherwise support a means for receiving, based on the mode being activated, a fourth report of available transmission power for uplink control transmissions over the secondary cell, where the fourth report is based on a second virtual control transmission over virtual control channel resources in the secondary cell.

In some examples disclosed herein, the communications manager 1020 may support wireless communication at a device in communication with a UE (e.g., a base station) in accordance with examples as disclosed herein. The carrier aggregation component 1025 may be configured as or otherwise support a means for transmitting a first message indicating a set of multiple component carriers are configured for a UE. The resource allocation component 1030 may be configured as or otherwise support a means for transmitting an indication that one or more secondary cells of the set of multiple component carriers are enabled for scheduling uplink control channel resources. In some examples, the resource allocation component 1030 may be configured as or otherwise support a means for transmitting a second message scheduling uplink data channel resources in a first component carrier of the set of multiple component carriers. The report management component 1035 may be configured as or otherwise support a means for receiving, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

In some examples, the resource allocation component 1030 may be configured as or otherwise support a means for determining whether to schedule second uplink control channel resources in the first component carrier or the second component carrier based on the combined report. In some examples, the resource allocation component 1030 may be configured as or otherwise support a means for transmitting a third message scheduling the second uplink control channel resources in the first component carrier based on the second parameter indicating an amount of available transmission power for the uplink control channel resources in the second component carrier that is below a first threshold, a delay associated with scheduling the uplink control channel resources in the second component carrier exceeding a second threshold, or both.

In some examples, the resource allocation component 1030 may be configured as or otherwise support a means for configuring the first component carrier including the uplink data channel resources as a primary cell and the second component carrier as a secondary cell, where the first message is based on the configuring. In some examples, the resource allocation component 1030 may be configured as or otherwise support a means for allocating the uplink control channel resources for the UE on the secondary cell, where the second message is based on the allocating. In some examples, the resource allocation component 1030 may be configured as or otherwise support a means for transmitting a third message scheduling the uplink control channel resources on the second component carrier based on the one or more secondary cells being enabled for scheduling uplink control channel resources.

In some examples, the first parameter indicating available transmission power for uplink data transmissions over the primary cell is based on a data transmission over the uplink data channel resources in the primary cell, and the second parameter indicating available transmission power for uplink control transmissions over the secondary cell is based on a control transmission over the uplink control channel resources in the secondary cell.

In some examples, the combined report further includes a third parameter indicating available transmission power for uplink control transmissions over the primary cell, the third parameter indicating being based on a first virtual data transmission over virtual uplink control channel resources in the primary cell, and a fourth parameter indicating available transmission power for uplink control transmissions over the secondary cell, the fourth parameter indicating being based on a second virtual data transmission over virtual uplink data channel resources in the secondary cell.

In some examples, the resource allocation component 1030 may be configured as or otherwise support a means for configuring the first component carrier including the uplink data channel resources as a secondary cell and the second component carrier as a primary cell, where the first message is based on the configuring. In some examples, the resource allocation component 1030 may be configured as or otherwise support a means for allocating no communication resources for the UE on the primary cell, where the second message is based on the allocating. In some examples, the resource allocation component 1030 may be configured as or otherwise support a means for transmitting a third message scheduling the uplink control channel resources on the first component carrier based on the one or more secondary cells being enabled for scheduling uplink control channel resources.

In some examples, the combined report further includes a third parameter indicating available transmission power for uplink data transmissions over the primary cell. In some examples, the first parameter indicating available transmission power for uplink data transmissions over the secondary cell is based on a data transmission over the uplink data channel resources in the secondary cell, the second parameter indicating available transmission power for uplink control transmissions over the secondary cell is based on a virtual control transmission over virtual uplink control channel resources in the secondary cell, and the third parameter indicating is based on a virtual data transmission over virtual uplink data channel resources in the primary cell.

In some examples, the combined report further includes a fourth parameter indicating available transmission power for uplink control transmissions over the primary cell. In some examples, the fourth parameter indicating is based on a virtual control transmission over virtual uplink control channel resources in the primary cell.

In some examples, the resource allocation component 1030 may be configured as or otherwise support a means for configuring the first component carrier including the uplink data channel resources as a primary cell and the second component carrier as a secondary cell, where the first message is based on the configuring. In some examples, the resource allocation component 1030 may be configured as or otherwise support a means for allocating no communication resources for the UE on the secondary cell, where the second message is based on the allocating. In some examples, the resource allocation component 1030 may be configured as or otherwise support a means for transmitting a third message scheduling the uplink control channel resources on the first component carrier based on the one or more secondary cells being enabled for scheduling uplink control channel resources.

In some examples, the combined report further includes a third parameter indicating available transmission power for uplink control transmissions over the primary cell. In some examples, the first parameter indicating available transmission power for uplink data transmissions over the primary cell is based on a data transmission over the uplink data channel resources in the primary cell, the second parameter indicating available transmission power for uplink control transmissions over the primary cell is based on a virtual control transmission over virtual uplink control channel resources in the primary cell, and the third parameter indicating is based on a virtual data transmission over virtual uplink data channel resources in the secondary cell.

In some examples, the combined report further includes a fourth parameter indicating available transmission power for uplink control transmissions over the secondary cell. In some examples, the fourth parameter indicating is based on a second virtual control transmission over virtual uplink control channel resources in the secondary cell.

In some examples, the power headroom component 1040 may be configured as or otherwise support a means for transmitting, to the UE, a first indication of a first capability for estimating available transmission power for the uplink control channel resources based on an available transmission power for the uplink data channel resources. In some examples, the power headroom component 1040 may be configured as or otherwise support a means for transmitting, to the UE, a second indication of a second capability for estimating available transmission power for the uplink data channel resources based on an available transmission power for the uplink control channel resources; or both.

Figure 11:
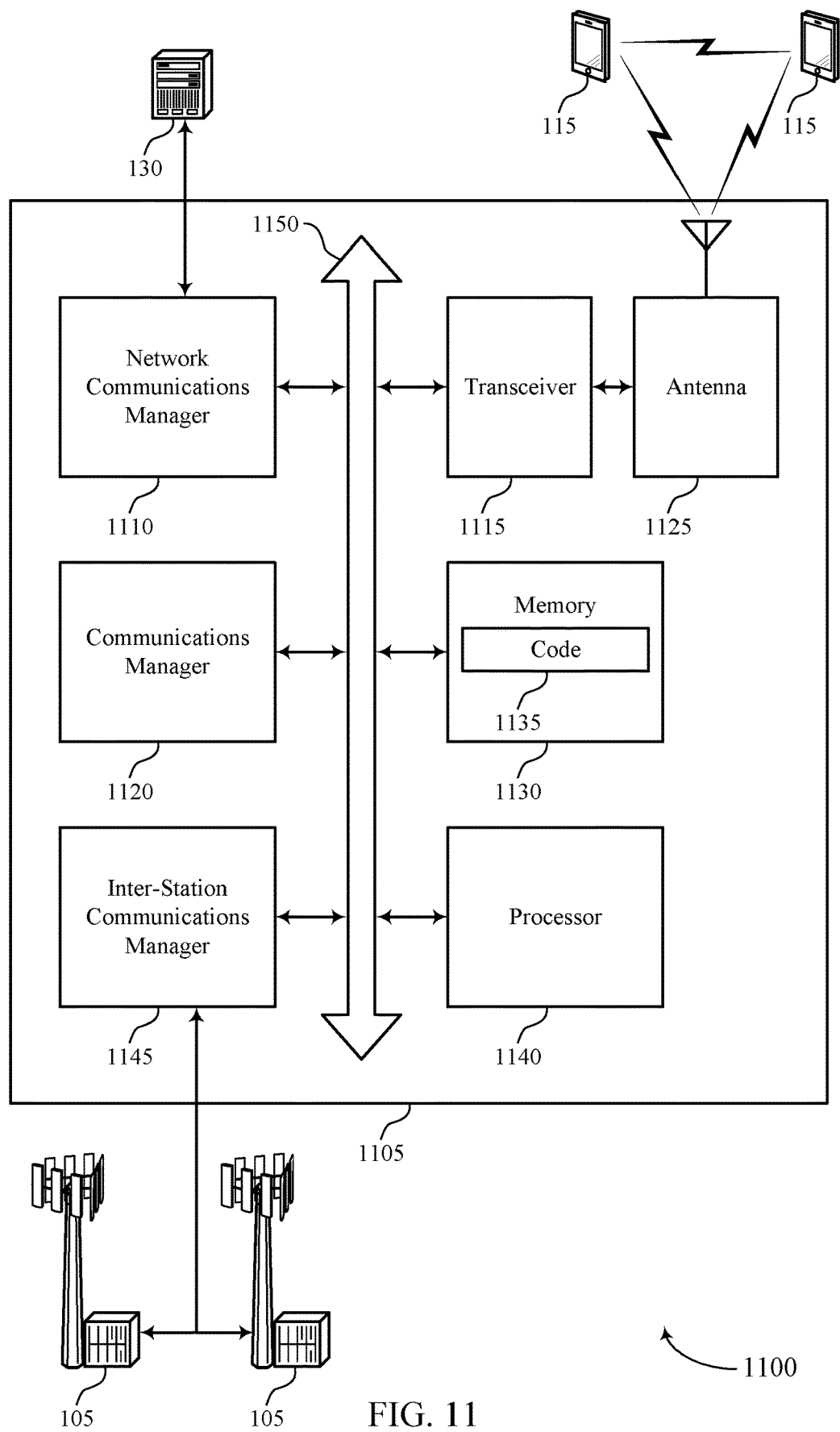
FIG. 11 shows a diagram of a system including a device that supports control resource power headroom reporting.

FIG. 11 shows a diagram of a system 1100 including a device 1105 that supports control resource power headroom reporting. The device 1105 may be an example of or include the components of a device 805, a device 905, or a network device as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting control resource power headroom reporting). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a device (e.g., network device) in communication with a UE in accordance with examples as disclosed herein. For example, the communications manager 1120 may be configured as or otherwise support a means for transmitting (e.g., via transceiver 1115) a first message indicating a set of multiple component carriers are configured for a UE. The communications manager 1120 may be configured as or otherwise support a means for transmitting (e.g., via transceiver 1115) a second message scheduling uplink data channel resources in a first component carrier of the set of multiple component carriers. The communications manager 1120 may be configured as or otherwise support a means for receiving (e.g., via transceiver 1115), over the uplink data channel resources, a combined report including a first report of available transmission power for uplink data transmissions over the first component carrier and a second report that is associated with available transmission power for uplink control channel resources over a second component carrier of the set of multiple component carriers.

In some examples disclosed herein, the communications manager 1120 may be configured as or otherwise support a means for transmitting (e.g., via transceiver 1115) a first message indicating a set of multiple component carriers are configured for a UE. The communications manager 1120 may be configured as or otherwise support a means for transmitting (e.g., via transceiver 1115) an indication that one or more secondary cells of the set of multiple component carriers are enabled for scheduling uplink control channel resources. The communications manager 1120 may be configured as or otherwise support a means for transmitting (e.g., via transceiver 1115) a second message scheduling uplink data channel resources in a first component carrier of the set of multiple component carriers. The communications manager 1120 may be configured as or otherwise support a means for receiving (e.g., via transceiver 1115), over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of control resource power headroom reporting as described herein, or the processor 1140 and the memory 1130 may be otherwise configured to perform or support such operations.

Figure 12:
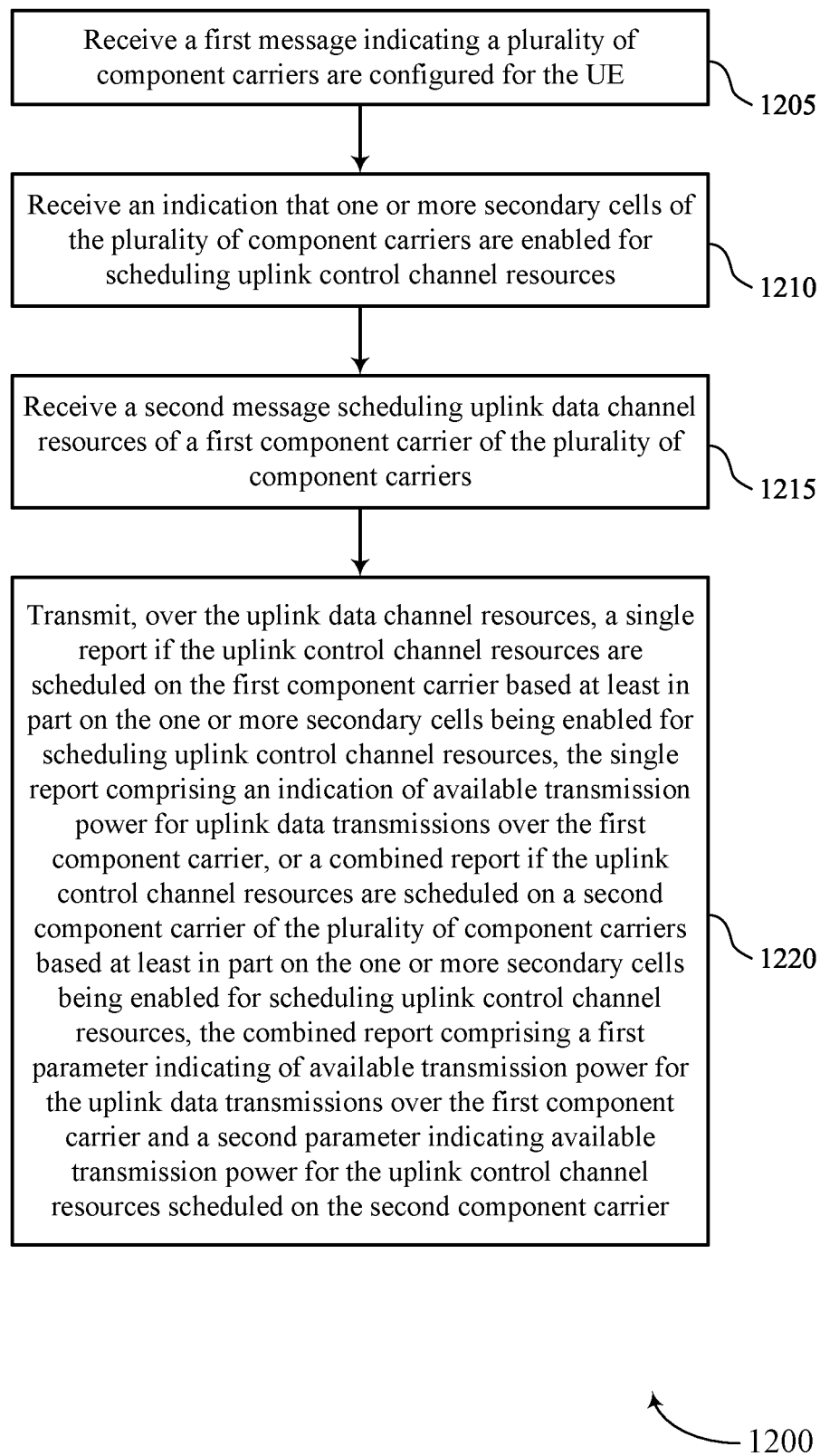
FIGS. 12 and 13 show flowcharts illustrating methods that support control resource power headroom reporting.

FIG. 12 shows a flowchart illustrating a method 1200 that supports control resource power headroom reporting. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a first message indicating a set of multiple component carriers are configured for the UE. The operations of 1205 may be performed in accordance with examples as disclosed herein. In some examples, aspects of the operations of 1205 may be performed by a carrier aggregation component 625 as described with reference to FIG. 6.

At 1210, the method may include receiving an indication that one or more secondary cells of the set of multiple component carriers are enabled for scheduling uplink control channel resources. The operations of 1210 may be performed in accordance with examples as disclosed herein. In some examples, aspects of the operations of 1210 may be performed by a resource allocation component 630 as described with reference to FIG. 6.

At 1215, the method may include receiving a second message scheduling uplink data channel resources of a first component carrier of the set of multiple component carriers. The operations of 1215 may be performed in accordance with examples as disclosed herein. In some examples, aspects of the operations of 1215 may be performed by a resource allocation component 630 as described with reference to FIG. 6.

At 1220, the method may include transmitting, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier. The operations of 1220 may be performed in accordance with examples as disclosed herein. In some examples, aspects of the operations of 1220 may be performed by a reporting component 635 as described with reference to FIG. 6.

Figure 13:
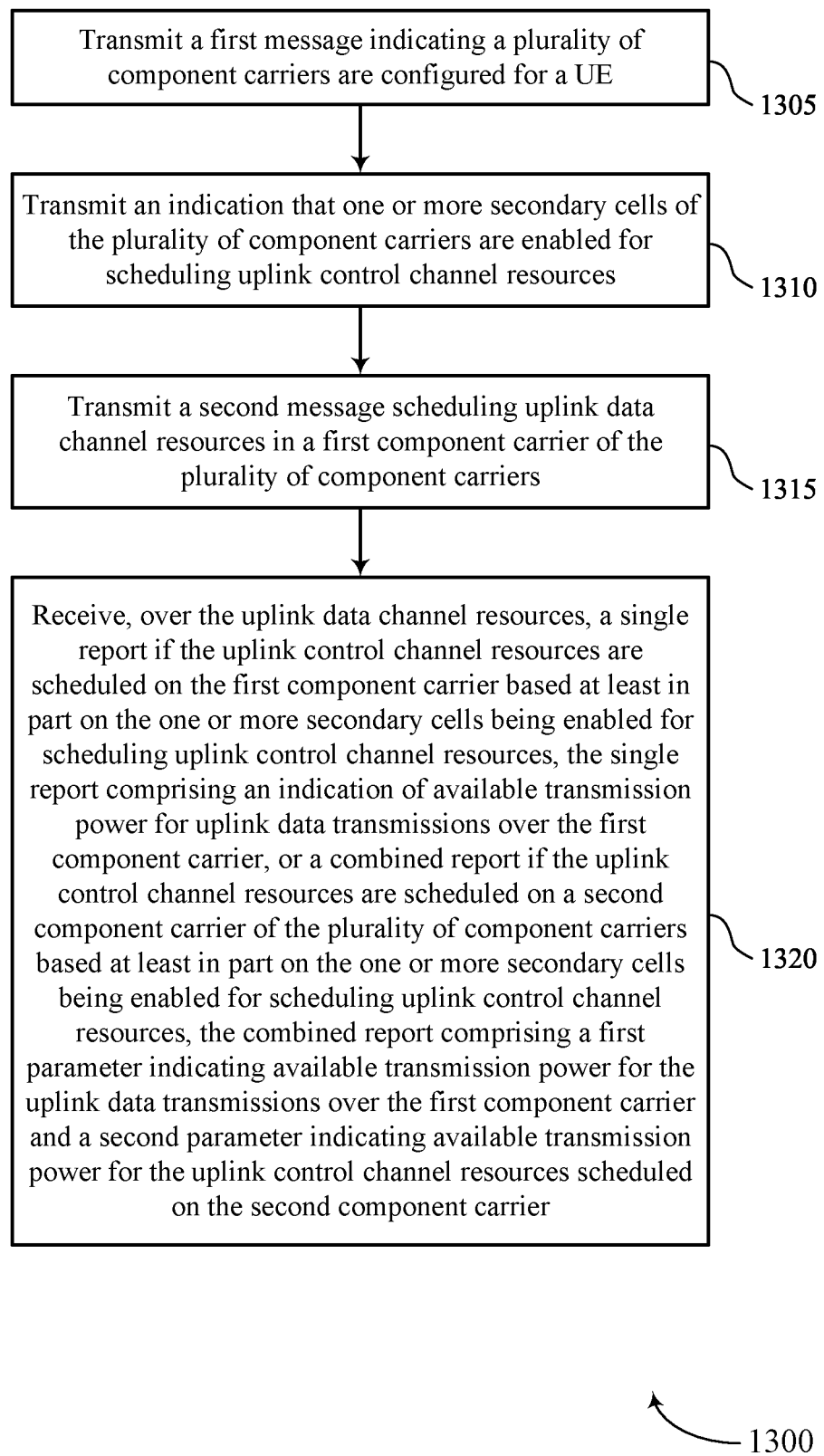

FIG. 13 shows a flowchart illustrating a method 1300 that supports control resource power headroom reporting. The operations of the method 1300 may be implemented by a device (e.g., network device) in communication with a UE or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1305, the method may include transmitting a first message indicating a set of multiple component carriers are configured for a UE. The operations of 1305 may be performed in accordance with examples as disclosed herein. In some examples, aspects of the operations of 1305 may be performed by a carrier aggregation component 1025 as described with reference to FIG. 10.

At 1310, the method may include transmitting an indication that one or more secondary cells of the set of multiple component carriers are enabled for scheduling uplink control channel resources. The operations of 1310 may be performed in accordance with examples as disclosed herein. In some examples, aspects of the operations of 1310 may be performed by a resource allocation component 1030 as described with reference to FIG. 10.

At 1315, the method may include transmitting a second message scheduling uplink data channel resources in a first component carrier of the set of multiple component carriers. The operations of 1315 may be performed in accordance with examples as disclosed herein. In some examples, aspects of the operations of 1315 may be performed by a resource allocation component 1030 as described with reference to FIG. 10.

At 1320, the method may include receiving, over the uplink data channel resources, a single report if the uplink control channel resources are scheduled on the first component carrier based on the one or more secondary cells being enabled for scheduling uplink control channel resources, the single report including an indication of available transmission power for uplink data transmissions over the first component carrier, or a combined report if the uplink control channel resources are scheduled on a second component carrier of the set of multiple component carriers based on the one or more secondary cells being enabled for scheduling uplink control channel resources, the combined report including a first parameter indicating available transmission power for the uplink data transmissions over the first component carrier and a second parameter indicating available transmission power for the uplink control channel resources scheduled on the second component carrier. The operations of 1320 may be performed in accordance with examples as disclosed herein. In some examples, aspects of the operations of 1320 may be performed by a report management component 1035 as described with reference to FIG. 10.

The following provides an overview of aspects of the present disclosure:

Aspect 1: A method for wireless communication at a UE, comprising: receiving a first message indicating a plurality of component carriers are configured for the UE; receiving a second message scheduling uplink data channel resources of a first component carrier of the plurality of component carriers; and transmitting, over the uplink data channel resources, a combined report comprising a first report of available transmission power for uplink data transmissions over the first component carrier and a second report that is associated with available transmission power for uplink control channel resources over a second component carrier of the plurality of component carriers.

Aspect 2: The method of aspect 1, further comprising: determining that the first component carrier comprising the uplink data channel resources is a secondary cell and the second component carrier is a primary cell based at least in part on the first message, and that the uplink control channel resources are scheduled for the primary cell based at least in part on the second message.

Aspect 3: The method of aspect 2, further comprising: determining the first report of available transmission power for uplink data transmissions over the secondary cell based at least in part on a data transmission over the uplink data channel resources in the secondary cell, and determining the second report that is associated with available transmission power for uplink control transmissions over the primary cell based at least in part on a control transmission over the uplink control channel resources in the primary cell.

Aspect 4: The method of aspect 3, wherein an estimate of available transmission power for uplink data transmissions over the primary cell is obtainable from the second report.

Aspect 5: The method of any of aspects 3 through 4, wherein transmitting the combined report comprises: transmitting a third report of available transmission power for uplink data transmissions over the primary cell, the third report being determined based at least in part on a virtual data transmission over virtual data channel resources in the primary cell.

Aspect 6: The method of any of aspects 1, further comprising: receiving a third message configuring a mode that enables uplink control channel resources to be scheduled on one or more secondary cells of the plurality of component carriers; and determining, based at least in part on activation of the mode, that the first component carrier comprising the uplink data channel resources is a primary cell and the second component carrier is a secondary cell based at least in part on the first message and that the uplink control channel resources are scheduled for the secondary cell based at least in part on the second message.

Aspect 7: The method of aspect 6, further comprising: determining the first report of available transmission power for uplink data transmissions over the primary cell based at least in part on a data transmission over the uplink data channel resources in the primary cell, and determining the second report that is associated with available transmission power for uplink control transmissions over the secondary cell based at least in part on a control transmission over the uplink control channel resources in the secondary cell.

Aspect 8: The method of aspect 7, wherein a first estimate of available transmission power for uplink control transmissions over the primary cell is obtainable from the first report, and a second estimate of available transmission power for uplink data transmissions over the secondary cell is obtainable from the second report.

Aspect 9: The method of any of aspects 7 through 8, wherein transmitting the combined report further comprises: transmitting, based at least in part on the mode being activated, a third report of available transmission power for uplink control transmissions over the primary cell, the third report being determined based at least in part on a first virtual data transmission over virtual control channel resources in the primary cell, and a fourth report of available transmission power for uplink control transmissions over the secondary cell, the fourth report being determined based at least in part on a second virtual data transmission over virtual data channel resources in the secondary cell.

Aspect 10: The method of any of aspects 1, further comprising: determining the third report based at least in part on a quantity of resource blocks associated with the virtual control transmission, a format associated with the virtual uplink control channel, a duration of the virtual control transmission, a subcarrier spacing associated with the virtual uplink control channel, an open loop power control parameter associated with the uplink control channel, a path loss associated with the virtual uplink control channel, a power control adjustment state index associated with the virtual uplink control channel, or any combination thereof.

Aspect 11: The method of any of aspects 1, further comprising: determining that the first component carrier comprising the uplink data channel resources is a primary cell and the second component carrier is a secondary cell based at least in part on the first message, and that communication resources are not scheduled for the secondary cell based at least in part on the second message.

Aspect 12: The method of aspect 11, wherein transmitting the combined report further comprises: transmitting a third report of available transmission power for uplink control transmissions over the primary cell, wherein the first report of available transmission power for uplink data transmissions over the primary cell is determined based at least in part on a data transmission over the uplink data channel resources in the primary cell, the second report that is associated with available transmission power for uplink control transmissions over the secondary cell is determined based at least in part on a virtual data transmission over virtual uplink data channel resources in the secondary cell, and the third report is determined based at least in part on a virtual control transmission over virtual control channel resources in the primary cell.

Aspect 13: The method of any of aspects 1, further comprising: receiving a third message configuring a mode that enables uplink control channel resources to be scheduled on one or more secondary cells of the plurality of component carriers; and determining, based at least in part on activation of the mode, that the first component carrier comprising the uplink data channel resources is a secondary cell and the second component carrier is a primary cell based at least in part on the first message and that communication resources are not scheduled for the primary cell based at least in part on the second message.

Aspect 14: The method of aspect 13, wherein transmitting the combined report further comprises: transmitting, based at least in part on the mode being activated, a third report of available transmission power for uplink data transmissions over the primary cell, wherein the first report of available transmission power for uplink data transmissions over the secondary cell is determined based at least in part on a data transmission over the uplink data channel resources in the secondary cell, the second report that is associated with available transmission power for uplink control transmissions over the secondary cell is determined based at least in part on a virtual control transmission over virtual uplink control channel resources in the secondary cell, and the third report is determined based at least in part on a virtual data transmission over virtual data channel resources in the primary cell.

Aspect 15: The method of aspect 14, wherein an estimate of available transmission power for uplink control transmissions over the primary cell is obtainable from the third report.

Aspect 16: The method of any of aspects 14 through 15, wherein transmitting the combined report further comprises: transmitting, based at least in part on the mode being activated, a fourth report of available transmission power for uplink control transmissions over the primary cell, wherein the fourth report is determined based at least in part on a second virtual data transmission over virtual data channel resources in the primary cell.

Aspect 17: The method of any of aspects 1, further comprising: receiving a third message configuring a mode that enables uplink control channel resources to be scheduled on one or more secondary cells of the plurality of component carriers; and determining, based at least in part on activation of the mode, that the first component carrier comprising the uplink data channel resources is a primary cell and the second component carrier is a secondary cell based at least in part on the first message and communication resources are not scheduled for the secondary cell based at least in part on the second message.

Aspect 18: The method of aspect 17, wherein transmitting the combined report further comprises: transmitting, based at least in part on the mode being activated, a third report of available transmission power for uplink control transmissions over the primary cell, wherein the first report of available transmission power for uplink data transmissions over the primary cell is determined based at least in part on a data transmission over the uplink data channel resources in the primary cell, the second report that is associated with available transmission power for uplink control transmissions over the primary cell is determined based at least in part on a virtual control transmission over virtual uplink control channel resources in the primary cell, and the third report is determined based at least in part on a virtual data transmission over virtual data channel resources in the secondary cell.

Aspect 19: The method of aspect 18, wherein an estimate of available transmission power for uplink control transmissions over the secondary cell is obtainable from the third report.

Aspect 20: The method of any of aspects 18 through 19, wherein transmitting the combined report further comprises: transmitting, based at least in part on the mode being activated, a fourth report of available transmission power for uplink control transmissions over the secondary cell, wherein the fourth report is determined based at least in part on a second virtual control transmission over virtual control channel resources in the secondary cell.

Aspect 21: A method for wireless communication at a network device in communication with a UE, comprising: transmitting a first message indicating a plurality of component carriers are configured for a UE; transmitting a second message scheduling uplink data channel resources in a first component carrier of the plurality of component carriers; and receiving, over the uplink data channel resources, a combined report comprising a first report of available transmission power for uplink data transmissions over the first component carrier and a second report that is associated with available transmission power for uplink control channel resources over a second component carrier of the plurality of component carriers.

Aspect 22: The method of aspect 21, further comprising: transmitting, to the UE, a first indication of a first capability for estimating available transmission power for uplink control channel resources based at least in part on an available transmission power for uplink data channel resources; transmitting, to the UE, a second indication of a second capability for estimating available transmission power for uplink data channel resources based at least in part on an available transmission power for uplink control channel resources; or both.

Aspect 23: The method of any of aspects 21 through 22, further comprising: determining whether to schedule second uplink control channel resources in the first component carrier or the second component carrier based at least in part on the combined report; and transmitting a third message scheduling the second uplink control channel resources in the first component carrier based at least in part on the second report indicating an amount of available transmission power for uplink control channel resources in the second component carrier that is below a first threshold, a delay associated with scheduling uplink control channel resources in the second component carrier exceeding a second threshold, or both.

Aspect 24: The method of any of aspects 21, further comprising: configuring the first component carrier as a secondary cell and the second component carrier as a primary cell, wherein the first message is based at least in part on the configuring; and allocating the uplink control channel resources for the UE on the primary cell, wherein the second message is based at least in part on the allocating.

Aspect 25: The method of aspect 24, wherein the first report of available transmission power for uplink data transmissions over the secondary cell is based at least in part on a data transmission over the uplink data channel resources in the secondary cell, and the second report that is associated with available transmission power for uplink control transmissions over the primary cell is based at least in part on a control transmission over the uplink control channel resources in the primary cell.

Aspect 26: The method of aspect 25, further comprising: estimating, based at least in part on the second report, available transmission power for uplink data transmissions over the primary cell.

Aspect 27: The method of any of aspects 25 through 26, wherein receiving the combined report comprises: receiving a third report of available transmission power for uplink data transmissions over the primary cell, the third report being based at least in part on a virtual data transmission over virtual data channel resources in the primary cell.

Aspect 28: The method of any of aspects 21, further comprising: configuring the first component carrier comprising the uplink data channel resources as a primary cell and the second component carrier as a secondary cell, wherein the first message is based at least in part on the configuring; allocating the uplink control channel resources for the UE on the secondary cell, wherein the second message is based at least in part on the allocating; and transmitting a third message configuring a mode that enables uplink control channel resources to be scheduled on one or more secondary cells of the plurality of component carriers.

Aspect 29: The method of aspect 28, wherein the first report of available transmission power for uplink data transmissions over the primary cell is based at least in part on a data transmission over the uplink data channel resources in the primary cell, and the second report that is associated with available transmission power for uplink control transmissions over the secondary cell is based at least in part on a control transmission over the uplink control channel resources in the secondary cell.

Aspect 30: The method of aspect 29, further comprising: estimating, based at least in part on the first report, available transmission power for uplink control transmissions over the primary cell; and estimating, based at least in part on the second report, available transmission power for uplink data transmissions over the secondary cell.

Aspect 31: The method of any of aspects 29 through 30, wherein receiving the combined report further comprises: receiving, based at least in part on the mode being activated, a third report of available transmission power for uplink control transmissions over the primary cell, the third report being based at least in part on a first virtual data transmission over virtual control channel resources in the primary cell, and a fourth report of available transmission power for uplink control transmissions over the secondary cell, the fourth report being based at least in part on a second virtual data transmission over virtual data channel resources in the secondary cell.

Aspect 32: The method of any of aspects 21, further comprising: configuring the first component carrier comprising the uplink data channel resources as a primary cell and the second component carrier as a secondary cell, wherein the first message is based at least in part on the configuring; and allocating no communication resources for the UE on the secondary cell, wherein the second message is based at least in part on the allocating.

Aspect 33: The method of aspect 32, wherein receiving the combined report further comprises: receiving a third report of available transmission power for uplink control transmissions over the primary cell, wherein the first report of available transmission power for uplink data transmissions over the primary cell is based at least in part on a data transmission over the uplink data channel resources in the primary cell, the second report that is associated with available transmission power for uplink control transmissions over the secondary cell is based at least in part on a virtual data transmission over virtual uplink data channel resources in the secondary cell, and the third report is based at least in part on a virtual control transmission over virtual control channel resources in the primary cell.

Aspect 34: The method of any of aspects 21, further comprising: configuring the first component carrier comprising the uplink data channel resources as a secondary cell and the second component carrier as a primary cell, wherein the first message is based at least in part on the configuring; allocating no communication resources for the UE on the primary cell, wherein the second message is based at least in part on the allocating; and transmitting a third message configuring a mode that enables uplink control channel resources to be scheduled on one or more secondary cells of the plurality of component carriers.

Aspect 35: The method of aspect 34, wherein receiving the combined report further comprises: receiving, based at least in part on the mode being activated, a third report of available transmission power for uplink data transmissions over the primary cell, wherein the first report of available transmission power for uplink data transmissions over the secondary cell is based at least in part on a data transmission over the uplink data channel resources in the secondary cell, the second report that is associated with available transmission power for uplink control transmissions over the secondary cell is based at least in part on a virtual control transmission over virtual uplink control channel resources in the secondary cell, and the third report is based at least in part on a virtual data transmission over virtual data channel resources in the primary cell.

Aspect 36: The method of aspect 35, further comprising: estimating, based at least in part on the third report, available transmission power for uplink control transmissions over the primary cell.

Aspect 37: The method of any of aspects 35 through 36, wherein receiving the combined report further comprises: receiving, based at least in part on the mode being activated, a fourth report of available transmission power for uplink control transmissions over the primary cell, wherein the fourth report is based at least in part on a second virtual data transmission over virtual data channel resources in the primary cell.

Aspect 38: The method of any of aspects 21, further comprising: configuring the first component carrier comprising the uplink data channel resources as a primary cell and the second component carrier as a secondary cell, wherein the first message is based at least in part on the configuring; allocating no communication resources for the UE on the secondary cell, wherein the second message is based at least in part on the allocating; and transmitting a third message configuring a mode that enables uplink control channel resources to be scheduled on one or more secondary cells of the plurality of component carriers.

Aspect 39: The method of aspect 38, wherein receiving the combined report further comprises: receiving, based at least in part on the mode being activated, a third report of available transmission power for uplink control transmissions over the primary cell, wherein the first report of available transmission power for uplink data transmissions over the primary cell is based at least in part on a data transmission over the uplink data channel resources in the primary cell, the second report that is associated with available transmission power for uplink control transmissions over the primary cell is based at least in part on a virtual control transmission over virtual uplink control channel resources in the primary cell, and the third report is based at least in part on a virtual data transmission over virtual data channel resources in the secondary cell.

Aspect 40: The method of aspect 39, further comprising: estimating, based at least in part on the third report, available transmission power for uplink control transmissions over the secondary cell.

Aspect 41: The method of any of aspects 39 through 40, wherein receiving the combined report further comprises: receiving, based at least in part on the mode being activated, a fourth report of available transmission power for uplink control transmissions over the secondary cell, wherein the fourth report is based at least in part on a second virtual control transmission over virtual control channel resources in the secondary cell.

Aspect 42: An apparatus for wireless communication at a UE, comprising a processor; memory coupled with the processor; and instructions stored in the memory and executable by the processor to cause the apparatus to perform a method of any of aspects 1 through 20.

Aspect 43: An apparatus for wireless communication at a UE, comprising at least one means for performing a method of any of aspects 1 through 20.

Aspect 44: A non-transitory computer-readable medium storing code for wireless communication at a UE, the code comprising instructions executable by a processor to perform a method of any of aspects 1 through 20.

Aspect 45: An apparatus for wireless communication at a network device in communication with a UE, comprising a processor; memory coupled with the processor; and instructions stored in the memory and executable by the processor to cause the apparatus to perform a method of any of aspects 21 through 41.

Aspect 46: An apparatus for wireless communication at a network device in communication with a UE, comprising at least one means for performing a method of any of aspects 21 through 41.

Aspect 47: A non-transitory computer-readable medium storing code for wireless communication at a network device in communication with a UE, the code comprising instructions executable by a processor to perform a method of any of aspects 21 through 41.

Aspect 48: A method for wireless communication at a UE, comprising: receiving a first message indicating a plurality of component carriers are configured for the UE; receiving an indication that one or more secondary cells of the plurality of component carriers are enabled for scheduling uplink control channel resources; receiving a second message scheduling uplink data channel resources of a first component carrier of the plurality of component carriers; and transmitting, over the uplink data channel resources, a single report if the uplink control channel resources are scheduled on the first component carrier based at least in part on the one or more secondary cells being enabled for scheduling uplink control channel resources, the single report comprising an indication of available transmission power for uplink data transmissions over the first component carrier, or a combined report if the uplink control channel resources are scheduled on a second component carrier of the plurality of component carriers based at least in part on the one or more secondary cells being enabled for scheduling uplink control channel resources, the combined report comprising a first parameter indicating available transmission power for the uplink data transmissions over the first component carrier and a second parameter indicating available transmission power for the uplink control channel resources scheduled on the second component carrier.

Aspect 49: The method of aspect 48, further comprising: receiving a third message scheduling the uplink control channel resources on the second component carrier based at least in part on the one or more secondary cells being enabled for scheduling uplink control channel resources; and determining that the first component carrier comprising the uplink data channel resources is a primary cell and the second component carrier is a secondary cell based at least in part on the first message and that the uplink control channel resources are scheduled for the secondary cell based at least in part on the third message.

Aspect 50: The method of aspect 49, further comprising: determining the first parameter indicating available transmission power for uplink data transmissions over the primary cell based at least in part on a data transmission over the uplink data channel resources in the primary cell, and determining the second parameter indicating available transmission power for uplink control transmissions over the secondary cell based at least in part on a control transmission over the uplink control channel resources in the secondary cell.

Aspect 51: The method of aspect 50, wherein the combined report further comprises a third parameter indicating available transmission power for uplink control transmissions over the primary cell, the third parameter indicating being determined based at least in part on a virtual control transmission over virtual uplink control channel resources in the primary cell, and a fourth parameter indicating available transmission power for uplink data transmissions over the secondary cell, the fourth parameter indicating being determined based at least in part on a virtual data transmission over virtual uplink data channel resources in the secondary cell.

Aspect 52: The method of aspect 51, further comprising: determining the third parameter based at least in part on a quantity of resource blocks associated with the virtual control transmission, a format associated with a virtual uplink control channel, a duration of the virtual control transmission, a subcarrier spacing associated with the virtual uplink control channel, an open loop power control parameter associated with the virtual uplink control channel, a path loss associated with the virtual uplink control channel, a power control adjustment state index associated with the virtual uplink control channel, or any combination thereof.

Aspect 53: The method of any of aspects 48 through 52, further comprising: receiving a third message scheduling the uplink control channel resources on the first component carrier based at least in part on the one or more secondary cells being enabled for scheduling uplink control channel resources; and determining that the first component carrier comprising the uplink data channel resources is a secondary cell and the second component carrier is a primary cell based at least in part on the first message and that communication resources are not scheduled for the primary cell based at least in part on the second message and the third message.

Aspect 54: The method of aspect 53, wherein the combined report further comprises a third parameter indicating available transmission power for uplink data transmissions over the primary cell, the first parameter indicating available transmission power for uplink data transmissions over the secondary cell is determined based at least in part on a data transmission over the uplink data channel resources in the secondary cell, the second parameter indicating available transmission power for uplink control transmissions over the secondary cell is determined based at least in part on a virtual control transmission over virtual uplink control channel resources in the secondary cell, and the third parameter indicating is determined based at least in part on a virtual data transmission over virtual uplink data channel resources in the primary cell.

Aspect 55: The method of aspect 54, wherein the combined report further comprises a fourth parameter indicating available transmission power for uplink control transmissions over the primary cell, the fourth parameter indicating is determined based at least in part on a virtual control transmission over virtual uplink control channel resources in the primary cell.

Aspect 56: The method of any of aspects 48 through 55, further comprising: receiving a third message scheduling the uplink control channel resources on the first component carrier based at least in part on the one or more secondary cells being enabled for scheduling uplink control channel resources; and determining, based at least in part on the carrier switching being configured, that the first component carrier comprising the uplink data channel resources is a primary cell and the second component carrier is a secondary cell based at least in part on the first message and communication resources are not scheduled for the secondary cell based at least in part on the second message and the third message.

Aspect 57: The method of aspect 56, wherein the combined report further comprises a third parameter indicating available transmission power for uplink control transmissions over the primary cell, the first parameter indicating available transmission power for uplink data transmissions over the primary cell is determined based at least in part on a data transmission over the uplink data channel resources in the primary cell, the second parameter indicating available transmission power for the uplink control transmissions over the primary cell is determined based at least in part on a virtual control transmission over virtual uplink control channel resources in the primary cell, and the third parameter indicating is determined based at least in part on a virtual data transmission over virtual uplink data channel resources in the secondary cell.

Aspect 58: The method of aspect 57, wherein the combined report further comprises a fourth parameter indicating available transmission power for uplink control transmissions over the secondary cell, the fourth parameter indicating is determined based at least in part on a second virtual control transmission over virtual uplink control channel resources in the secondary cell.

Aspect 59: A method for wireless communication at a network device in communication with a UE, comprising: transmitting a first message indicating a plurality of component carriers are configured for a UE; transmitting an indication that one or more secondary cells of the plurality of component carriers are enabled for scheduling uplink control channel resources; transmitting a second message scheduling uplink data channel resources in a first component carrier of the plurality of component carriers; and receiving, over the uplink data channel resources, a single report if the uplink control channel resources are scheduled on the first component carrier based at least in part on the one or more secondary cells being enabled for scheduling uplink control channel resources, the single report comprising an indication of available transmission power for uplink data transmissions over the first component carrier, or a combined report if the uplink control channel resources are scheduled on a second component carrier of the plurality of component carriers based at least in part on the one or more secondary cells being enabled for scheduling uplink control channel resources, the combined report comprising a first parameter indicating available transmission power for the uplink data transmissions over the first component carrier and a second parameter indicating available transmission power for the uplink control channel resources scheduled on the second component carrier.

Aspect 60: The method of aspect 59, further comprising: determining whether to schedule second uplink control channel resources in the first component carrier or the second component carrier based at least in part on the combined report; and transmitting a third message scheduling the second uplink control channel resources in the first component carrier based at least in part on the second parameter indicating an amount of available transmission power for the uplink control channel resources in the second component carrier that is below a first threshold, a delay associated with scheduling the uplink control channel resources in the second component carrier exceeding a second threshold, or both.

Aspect 61: The method of any of aspects 59 through 60, further comprising: configuring the first component carrier comprising the uplink data channel resources as a primary cell and the second component carrier as a secondary cell, wherein the first message is based at least in part on the configuring; allocating the uplink control channel resources for the UE on the secondary cell, wherein the second message is based at least in part on the allocating; and transmitting a third message scheduling the uplink control channel resources on the second component carrier based at least in part on the one or more secondary cells being enabled for scheduling uplink control channel resources.

Aspect 62: The method of aspect 61, wherein the first parameter indicating available transmission power for uplink data transmissions over the primary cell is based at least in part on a data transmission over the uplink data channel resources in the primary cell, and the second parameter indicating available transmission power for uplink control transmissions over the secondary cell is based at least in part on a control transmission over the uplink control channel resources in the secondary cell.

Aspect 63: The method of aspect 62, wherein the combined report further comprises a third parameter indicating available transmission power for uplink control transmissions over the primary cell, the third parameter indicating being based at least in part on a first virtual data transmission over virtual uplink control channel resources in the primary cell, and a fourth parameter indicating available transmission power for uplink control transmissions over the secondary cell, the fourth parameter indicating being based at least in part on a second virtual data transmission over virtual uplink data channel resources in the secondary cell.

Aspect 64: The method of any of aspects 59 through 63, further comprising: configuring the first component carrier comprising the uplink data channel resources as a secondary cell and the second component carrier as a primary cell, wherein the first message is based at least in part on the configuring; allocating no communication resources for the UE on the primary cell, wherein the second message is based at least in part on the allocating; and transmitting a third message scheduling the uplink control channel resources on the first component carrier based at least in part on the one or more secondary cells being enabled for scheduling uplink control channel resources.

Aspect 65: The method of aspect 64, wherein the combined report further comprises a third parameter indicating available transmission power for uplink data transmissions over the primary cell, the first parameter indicating available transmission power for uplink data transmissions over the secondary cell is based at least in part on a data transmission over the uplink data channel resources in the secondary cell, the second parameter indicating available transmission power for uplink control transmissions over the secondary cell is based at least in part on a virtual control transmission over virtual uplink control channel resources in the secondary cell, and the third parameter indicating is based at least in part on a virtual data transmission over virtual uplink data channel resources in the primary cell.

Aspect 66: The method of aspect 65, wherein the combined report further comprises a fourth parameter indicating available transmission power for uplink control transmissions over the primary cell, the fourth parameter indicating is based at least in part on a virtual control transmission over virtual uplink control channel resources in the primary cell.

Aspect 67: The method of any of aspects 59 through 66, further comprising: configuring the first component carrier comprising the uplink data channel resources as a primary cell and the second component carrier as a secondary cell, wherein the first message is based at least in part on the configuring; allocating no communication resources for the UE on the secondary cell, wherein the second message is based at least in part on the allocating; and transmitting a third message scheduling the uplink control channel resources on the first component carrier based at least in part on the one or more secondary cells being enabled for scheduling uplink control channel resources.

Aspect 68: The method of aspect 67, wherein the combined report further comprises a third parameter indicating available transmission power for uplink control transmissions over the primary cell, the first parameter indicating available transmission power for uplink data transmissions over the primary cell is based at least in part on a data transmission over the uplink data channel resources in the primary cell, the second parameter indicating available transmission power for uplink control transmissions over the primary cell is based at least in part on a virtual control transmission over virtual uplink control channel resources in the primary cell, and the third parameter indicating is based at least in part on a virtual data transmission over virtual uplink data channel resources in the secondary cell.

Aspect 69: The method of aspect 68, wherein the combined report further comprises a fourth parameter indicating available transmission power for uplink control transmissions over the secondary cell, the fourth parameter indicating is based at least in part on a second virtual control transmission over virtual uplink control channel resources in the secondary cell.

Aspect 70: The method of any of aspects 59 through 69, further comprising: transmitting, to the UE, a first indication of a first capability for estimating available transmission power for the uplink control channel resources based at least in part on an available transmission power for the uplink data channel resources; transmitting, to the UE, a second indication of a second capability for estimating available transmission power for the uplink data channel resources based at least in part on an available transmission power for the uplink control channel resources; or both.

Aspect 71: An apparatus for wireless communication at a UE, comprising a processor; memory coupled with the processor; and instructions stored in the memory and executable by the processor to cause the apparatus to perform a method of any of aspects 48 through 58.

Aspect 72: An apparatus for wireless communication at a UE, comprising at least one means for performing a method of any of aspects 48 through 58.

Aspect 73: A non-transitory computer-readable medium storing code for wireless communication at a UE, the code comprising instructions executable by a processor to perform a method of any of aspects 48 through 58.

Aspect 74: An apparatus for wireless communication at a network device in communication with a UE, comprising a processor; memory coupled with the processor; and instructions stored in the memory and executable by the processor to cause the apparatus to perform a method of any of aspects 59 through 70.

Aspect 75: An apparatus for wireless communication at a network device in communication with a UE, comprising at least one means for performing a method of any of aspects 59 through 70.

Aspect 76: A non-transitory computer-readable medium storing code for wireless communication at a network device in communication with a UE, the code comprising instructions executable by a processor to perform a method of any of aspects 59 through 70.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a memory; and
   a processor coupled to the memory and configured to cause the apparatus to:
     receive a first message indicating a plurality of component carriers are configured for the UE;
     receive an indication that one or more secondary cells of the plurality of component carriers are enabled for scheduling uplink control channel resources;
     receive a second message scheduling uplink data channel resources of a first component carrier of the plurality of component carriers; and
     transmit, over the uplink data channel resources, either:
       a single report if the uplink control channel resources are scheduled on the first component carrier based at least in part on the one or more secondary cells being enabled for scheduling uplink control channel resources, the single report comprising an indication of available transmission power for uplink data transmissions over the first component carrier, or
       a combined report if the uplink control channel resources are scheduled on a second component carrier of the plurality of component carriers based at least in part on the one or more secondary cells being enabled for scheduling uplink control channel resources, the combined report comprising a first parameter indicating available transmission power for the uplink data transmissions over the first component carrier and a second parameter indicating available transmission power for the uplink control channel resources scheduled on the second component carrier.

2. The apparatus of claim 1, wherein the processor is further configured to cause the apparatus to:
   receive a third message scheduling the uplink control channel resources on the second component carrier based at least in part on the one or more secondary cells being enabled for scheduling uplink control channel resources; and
   determine that the first component carrier comprising the uplink data channel resources is a primary cell and the second component carrier is a secondary cell based at least in part on the first message and that the uplink control channel resources are scheduled for the secondary cell based at least in part on the third message.

3. The apparatus of claim 2, wherein the combined report is transmitted and the processor is further configured to cause the apparatus to:

determine the first parameter indicating available transmission power for uplink data transmissions over the primary cell based at least in part on a data transmission over the uplink data channel resources in the primary cell, and determine the second parameter indicating available transmission power for uplink control transmissions over the secondary cell based at least in part on a control transmission over the uplink control channel resources in the secondary cell.

4. The apparatus of claim 3, wherein the combined report is transmitted and further comprises:

a third parameter indicating available transmission power for uplink control transmissions over the primary cell, the third parameter indicating being determined based at least in part on a virtual control transmission over virtual uplink control channel resources in the primary cell, and a fourth parameter indicating available transmission power for uplink data transmissions over the secondary cell, the fourth parameter indicating being determined based at least in part on a virtual data transmission over virtual uplink data channel resources in the secondary cell.

5. The apparatus of claim 4, wherein the processor is further configured to cause the apparatus to:

determine the third parameter based at least in part on a quantity of resource blocks associated with the virtual control transmission, a format associated with a virtual uplink control channel, a duration of the virtual control transmission, a subcarrier spacing associated with the virtual uplink control channel, an open loop power control parameter associated with the virtual uplink control channel, a path loss associated with the virtual uplink control channel, a power control adjustment state index associated with the virtual uplink control channel, or any combination thereof.

6. The apparatus of claim 1, wherein the processor is further configured to cause the apparatus to:

receive a third message scheduling the uplink control channel resources on the first component carrier based at least in part on the one or more secondary cells being enabled for scheduling uplink control channel resources; and determine that the first component carrier comprising the uplink data channel resources is a secondary cell and the second component carrier is a primary cell based at least in part on the first message and that communication resources are not scheduled for the primary cell based at least in part on the second message and the third message.

7. The apparatus of claim 6, wherein the combined report is transmitted and further comprises:

a third parameter indicating available transmission power for uplink data transmissions over the primary cell, wherein:

the first parameter indicating available transmission power for uplink data transmissions over the secondary cell is determined based at least in part on a data transmission over the uplink data channel resources in the secondary cell, the second parameter indicating available transmission power for uplink control transmissions over the secondary cell is determined based at least in part on a virtual control transmission over virtual uplink control channel resources in the secondary cell, and the third parameter indicating is determined based at least in part on a virtual data transmission over virtual uplink data channel resources in the primary cell.

8. The apparatus of claim 7, wherein the combined report further comprises:

a fourth parameter indicating available transmission power for uplink control transmissions over the primary cell, wherein:

the fourth parameter indicating is determined based at least in part on a virtual control transmission over virtual uplink control channel resources in the primary cell.

9. The apparatus of claim 1, wherein the processor is further configured to cause the apparatus to:

receive a third message scheduling the uplink control channel resources on the first component carrier based at least in part on the one or more secondary cells being enabled for scheduling uplink control channel resources; and determine that the first component carrier comprising the uplink data channel resources is a primary cell and the second component carrier is a secondary cell based at least in part on the first message and communication resources are not scheduled for the secondary cell based at least in part on the second message and the third message.

10. The apparatus of claim 9, wherein the combined report is transmitted and further comprises:

a third parameter indicating available transmission power for uplink control transmissions over the primary cell, wherein:

the first parameter indicating available transmission power for uplink data transmissions over the primary cell is determined based at least in part on a data transmission over the uplink data channel resources in the primary cell, the second parameter indicating available transmission power for the uplink control transmissions over the primary cell is determined based at least in part on a virtual control transmission over virtual uplink control channel resources in the primary cell, and the third parameter indicating is determined based at least in part on a virtual data transmission over virtual uplink data channel resources in the secondary cell.

11. The apparatus of claim 10, wherein the combined report is transmitted and further comprises:

a fourth parameter indicating available transmission power for uplink control transmissions over the secondary cell, wherein:

the fourth parameter indicating is determined based at least in part on a second virtual control transmission over virtual uplink control channel resources in the secondary cell.

12. An apparatus for wireless communication at a network device in communication with a user equipment (UE), comprising:

memory; and a processor coupled to the memory and configured to cause the apparatus to:

transmit a first message indicating a plurality of component carriers are configured for the UE;

transmit an indication that one or more secondary cells of the plurality of component carriers are enabled for scheduling uplink control channel resources;

transmit a second message scheduling uplink data channel resources in a first component carrier of the plurality of component carriers; and receive, over the uplink data channel resources, either:
- a single report if the uplink control channel resources are scheduled on the first component carrier based at least in part on the one or more secondary cells being enabled for scheduling uplink control channel resources, the single report comprising an indication of available transmission power for uplink data transmissions over the first component carrier, or
- a combined report if the uplink control channel resources are scheduled on a second component carrier of the plurality of component carriers based at least in part on the one or more secondary cells being enabled for scheduling uplink control channel resources, the combined report comprising a first parameter indicating available transmission power for the uplink data transmissions over the first component carrier and a second parameter indicating available transmission power for the uplink control channel resources scheduled on the second component carrier.

13. The apparatus of claim 12, wherein the combined report is transmitted and the processor is further configured to cause the apparatus to:
determine whether to schedule second uplink control channel resources in the first component carrier or the second component carrier based at least in part on the combined report; and
transmit a third message scheduling the second uplink control channel resources in the first component carrier based at least in part on the second parameter indicating an amount of available transmission power for the uplink control channel resources in the second component carrier that is below a first threshold, a delay associated with scheduling the uplink control channel resources in the second component carrier exceeding a second threshold, or both.

14. The apparatus of claim 12, wherein the processor is further configured to cause the apparatus to:
configure the first component carrier comprising the uplink data channel resources as a primary cell and the second component carrier as a secondary cell, wherein the first message is based at least in part on the configuring;
allocate the uplink control channel resources for the UE on the secondary cell, wherein the second message is based at least in part on the allocating; and
transmit a third message scheduling the uplink control channel resources on the second component carrier based at least in part on the one or more secondary cells being enabled for scheduling uplink control channel resources.

15. The apparatus of claim 14, wherein the combined report is transmitted, and wherein:
the first parameter indicating available transmission power for uplink data transmissions over the primary cell is based at least in part on a data transmission over the uplink data channel resources in the primary cell, and
the second parameter indicating available transmission power for uplink control transmissions over the secondary cell is based at least in part on a control transmission over the uplink control channel resources in the secondary cell.

16. The apparatus of claim 15, wherein the combined report is transmitted and further comprises:
a third parameter indicating available transmission power for uplink control transmissions over the primary cell, the third parameter indicating being based at least in part on a first virtual data transmission over virtual uplink control channel resources in the primary cell, and
a fourth parameter indicating available transmission power for uplink control transmissions over the secondary cell, the fourth parameter indicating being based at least in part on a second virtual data transmission over virtual uplink data channel resources in the secondary cell.

17. The apparatus of claim 12, wherein the processor is further configured to cause the apparatus to:
configure the first component carrier comprising the uplink data channel resources as a secondary cell and the second component carrier as a primary cell, wherein the first message is based at least in part on the configuring;
allocate no communication resources for the UE on the primary cell, wherein the second message is based at least in part on the allocating; and
transmit a third message scheduling the uplink control channel resources on the first component carrier based at least in part on the one or more secondary cells being enabled for scheduling uplink control channel resources.

18. The apparatus of claim 17, wherein the combined report is transmitted and further comprises:
a third parameter indicating available transmission power for uplink data transmissions over the primary cell, wherein:
the first parameter indicating available transmission power for uplink data transmissions over the secondary cell is based at least in part on a data transmission over the uplink data channel resources in the secondary cell,
the second parameter indicating available transmission power for uplink control transmissions over the secondary cell is based at least in part on a virtual control transmission over virtual uplink control channel resources in the secondary cell, and
the third parameter indicating is based at least in part on a virtual data transmission over virtual uplink data channel resources in the primary cell.

19. The apparatus of claim 18, wherein the combined report is transmitted and further comprises:
a fourth parameter indicating available transmission power for uplink control transmissions over the primary cell, wherein:
the fourth parameter indicating is based at least in part on a virtual control transmission over virtual uplink control channel resources in the primary cell.

20. The apparatus of claim 12, wherein the processor is further configured to cause the apparatus to:
configure the first component carrier comprising the uplink data channel resources as a primary cell and the second component carrier as a secondary cell, wherein the first message is based at least in part on the configuring;
allocate no communication resources for the UE on the secondary cell, wherein the second message is based at least in part on the allocating; and
transmit a third message scheduling the uplink control channel resources on the first component carrier based at least in part on the one or more secondary cells being enabled for scheduling uplink control channel resources.

21. The apparatus of claim 20, wherein the combined report is transmitted and further comprises:
a third parameter indicating available transmission power for uplink control transmissions over the primary cell, wherein:
the first parameter indicating available transmission power for uplink data transmissions over the primary cell is based at least in part on a data transmission over the uplink data channel resources in the primary cell,
the second parameter indicating available transmission power for uplink control transmissions over the primary cell is based at least in part on a virtual control transmission over virtual uplink control channel resources in the primary cell, and
the third parameter indicating is based at least in part on a virtual data transmission over virtual uplink data channel resources in the secondary cell.

22. The apparatus of claim 21, wherein the combined report is transmitted and further comprises:
a fourth parameter indicating available transmission power for uplink control transmissions over the secondary cell, wherein:
the fourth parameter indicating is based at least in part on a second virtual control transmission over virtual uplink control channel resources in the secondary cell.

23. The apparatus of claim 12, wherein the processor is further configured to cause the apparatus to:
transmit, to the UE, a first indication of a first capability for estimating available transmission power for the uplink control channel resources based at least in part on an available transmission power for the uplink data channel resources;
transmit, to the UE, a second indication of a second capability for estimating available transmission power for the uplink data channel resources based at least in part on an available transmission power for the uplink control channel resources; or
both.

24. A method for wireless communication at a user equipment (UE), comprising:
receiving a first message indicating a plurality of component carriers are configured for the UE;
receiving an indication that one or more secondary cells of the plurality of component carriers are enabled for scheduling uplink control channel resources;
receiving a second message scheduling uplink data channel resources of a first component carrier of the plurality of component carriers; and
transmitting, over the uplink data channel resources, either:
a single report if the uplink control channel resources are scheduled on the first component carrier based at least in part on the one or more secondary cells being enabled for scheduling uplink control channel resources, the single report comprising an indication of available transmission power for uplink data transmissions over the first component carrier, or
a combined report if the uplink control channel resources are scheduled on a second component carrier of the plurality of component carriers based at least in part on the one or more secondary cells being enabled for scheduling uplink control channel resources, the combined report comprising a first parameter indicating available transmission power for the uplink data transmissions over the first component carrier and a second parameter indicating available transmission power for the uplink control channel resources scheduled on the second component carrier.

25. The method of claim 24, further comprising:
receiving a third message scheduling the uplink control channel resources on the second component carrier based at least in part on the one or more secondary cells being enabled for scheduling uplink control channel resources; and
determining that the first component carrier comprising the uplink data channel resources is a primary cell and the second component carrier is a secondary cell based at least in part on the first message and that the uplink control channel resources are scheduled for the secondary cell based at least in part on the third message.

26. The method of claim 25, wherein the combined report is transmitted, the method further comprising:
determining the first parameter indicating available transmission power for uplink data transmissions over the primary cell based at least in part on a data transmission over the uplink data channel resources in the primary cell, and
determining the second parameter indicating available transmission power for uplink control transmissions over the secondary cell based at least in part on a control transmission over the uplink control channel resources in the secondary cell.

27. The method of claim 26, wherein the combined report further comprises:
a third parameter indicating available transmission power for uplink control transmissions over the primary cell, the third parameter indicating being determined based at least in part on a virtual control transmission over virtual uplink control channel resources in the primary cell, and
a fourth parameter indicating available transmission power for uplink data transmissions over the secondary cell, the fourth parameter indicating being determined based at least in part on a virtual data transmission over virtual uplink data channel resources in the secondary cell.

28. The method of claim 27, further comprising:
determining the third parameter based at least in part on a quantity of resource blocks associated with the virtual control transmission, a format associated with a virtual uplink control channel, a duration of the virtual control transmission, a subcarrier spacing associated with the virtual uplink control channel, an open loop power control parameter associated with the virtual uplink control channel, a path loss associated with the virtual uplink control channel, a power control adjustment state index associated with the virtual uplink control channel, or any combination thereof.

29. A method for wireless communication at a network device in communication with a user equipment (UE), comprising:
transmitting a first message indicating a plurality of component carriers are configured for the UE;
transmitting an indication that one or more secondary cells of the plurality of component carriers are enabled for scheduling uplink control channel resources;
transmitting a second message scheduling uplink data channel resources in a first component carrier of the plurality of component carriers; and receiving, over the uplink data channel resources, either:
- a single report if the uplink control channel resources are scheduled on the first component carrier based at least in part on the one or more secondary cells being enabled for scheduling uplink control channel resources, the single report comprising an indication of available transmission power for uplink data transmissions over the first component carrier, or
- a combined report if the uplink control channel resources are scheduled on a second component carrier of the plurality of component carriers based at least in part on the one or more secondary cells being enabled for scheduling uplink control channel resources, the combined report comprising a first parameter indicating available transmission power for the uplink data transmissions over the first component carrier and a second parameter indicating available transmission power for the uplink control channel resources scheduled on the second component carrier.

30. The method of claim 29, wherein the combined report is transmitted, the method further comprising:

determining whether to schedule second uplink control channel resources in the first component carrier or the second component carrier based at least in part on the combined report; and transmitting a third message scheduling the second uplink control channel resources in the first component carrier based at least in part on the second parameter indicating an amount of available transmission power for the uplink control channel resources in the second component carrier that is below a first threshold, a delay associated with scheduling the uplink control channel resources in the second component carrier exceeding a second threshold, or both.

* * * * *